(12) United States Patent
Bettin

(10) Patent No.: US 9,051,021 B2
(45) Date of Patent: Jun. 9, 2015

(54) COMPACT, COLLAPSIBLE BICYCLE

(71) Applicant: Karsten Bettin, Hannover (DE)

(72) Inventor: Karsten Bettin, Hannover (DE)

( * ) Notice: Subject to any disclaimer, the term of this patent is extended or adjusted under 35 U.S.C. 154(b) by 0 days.

(21) Appl. No.: 14/350,071

(22) PCT Filed: Oct. 16, 2012

(86) PCT No.: PCT/DE2012/100321
§ 371 (c)(1),
(2) Date: Apr. 6, 2014

(87) PCT Pub. No.: WO2013/056702
PCT Pub. Date: Apr. 25, 2013

(65) Prior Publication Data
US 2014/0225346 A1  Aug. 14, 2014

(30) Foreign Application Priority Data

Oct. 17, 2011 (DE) .......................... 10 2011 054 538
Nov. 28, 2011 (DE) .......................... 10 2011 055 748
Nov. 28, 2011 (DE) .......................... 10 2011 122 836

(51) Int. Cl.
*B62K 15/00* (2006.01)
*B62K 19/32* (2006.01)
*B62K 25/00* (2006.01)

(52) U.S. Cl.
CPC ............. *B62K 15/008* (2013.01); *B62K 19/32* (2013.01); *B62K 25/005* (2013.01); *B62K 2015/003* (2013.01)

(58) Field of Classification Search
CPC ..... B62K 15/00; B62K 15/006; B62K 15/008
USPC ................................................ 280/278, 287
See application file for complete search history.

(56) References Cited

U.S. PATENT DOCUMENTS 1,381,281 A  6/1921  Clark
3,419,283 A  12/1968 Newland
(Continued)

FOREIGN PATENT DOCUMENTS

CN   2043597    8/1989
DE    138824    3/1903
(Continued)

OTHER PUBLICATIONS

Jmgobillard, MicroSlider 02, "The MicroSlider in action" Video uploaded to Youtube on Feb. 3, 2008 and retrieved from http://www.youtube.com/watch?v=LUeyhv0hhZw on Apr. 22, 2014.
(Continued)

*Primary Examiner* — Joseph Rocca
*Assistant Examiner* — Michael Stabley
(74) *Attorney, Agent, or Firm* — Smartpat PLC; Axel Nix

(57) ABSTRACT

The invention relates to a compact, foldable bike with small wheels and a bicycle drive for driving the rear wheel, comprising a traction mechanism or a spur-gear transmission, driven by a crank, the distance of the bottom-bracket axle to the rear-wheel axle being larger than half the outer diameter of the rear wheel. The bicycle exhibits a front frame part and a rear frame part that are rotatably connected to each other by a folding hinge that is aligned at right angles to the ground plane, whereby the front frame part, the rear frame part, and a front-wheel fork, in the folded state, seen laterally, form the sides of a triangle having the following characteristic combination of features: The bicycle is ridden while standing up, the driving wheel and the output wheel of the bicycle drive are arranged on the same side of the bicycle frame and the steering tube exhibits a lower and an upper steering tube, that in the folded state of the bicycle are folded-in laterally beside the front wheel. With this combination of features, a particularly compact folding size is achieved for the folding bicycle.

24 Claims, 42 Drawing Sheets

(56) References Cited

U.S. PATENT DOCUMENTS

| | | | |
|---|---|---|---|
| 3,979,136 A | 9/1976 | Lassiere | |
| 3,990,717 A | 11/1976 | Best | |
| 4,111,447 A | 9/1978 | Ishida | |
| 4,132,428 A | 1/1979 | Lassiere | |
| 4,389,055 A | 6/1983 | Cockburn | |
| 4,598,923 A | 7/1986 | Csizmadia | |
| 4,718,688 A | 1/1988 | Sanders | |
| 4,824,130 A | 4/1989 | Chiu | |
| 4,844,494 A | 7/1989 | Blanchard | |
| 4,895,386 A | 1/1990 | Hellestam et al. | |
| 5,186,482 A | 2/1993 | Sapper | |
| 5,785,338 A | 7/1998 | Chang | |
| 6,032,971 A | 3/2000 | Herder | |
| 6,196,566 B1 | 3/2001 | Zhang | |
| 6,267,401 B1* | 7/2001 | De Jong | 280/287 |
| 6,336,649 B1* | 1/2002 | Lin | 280/278 |
| 6,425,598 B2* | 7/2002 | Murayama | 280/278 |
| 6,439,590 B1 | 8/2002 | Liang | |
| 6,595,536 B1 | 7/2003 | Tucker | |
| 6,595,539 B1 | 7/2003 | Belli | |
| 6,623,023 B2* | 9/2003 | Niitsu et al. | 280/278 |
| 6,641,159 B1* | 11/2003 | Fan | 280/278 |
| 6,688,625 B1* | 2/2004 | Schreuder et al. | 280/260 |
| 6,695,334 B2 | 2/2004 | Irlbacher | |
| 6,764,090 B1* | 7/2004 | Pan | 280/278 |
| 6,799,771 B2 | 10/2004 | Bigot | |
| 6,883,817 B2 | 4/2005 | Chu | |
| 6,966,570 B2* | 11/2005 | Wang | 280/278 |
| 6,979,013 B2* | 12/2005 | Chen | 280/287 |
| 7,055,842 B1 | 6/2006 | Lin | |
| 7,140,629 B2* | 11/2006 | Chen | 280/287 |
| 7,264,257 B2* | 9/2007 | Sanders | 280/278 |
| 7,290,780 B2 | 11/2007 | Hsu | |
| 7,306,249 B2 | 12/2007 | Kwok et al. | |
| 7,367,576 B2 | 5/2008 | Pan | |
| 7,510,202 B1* | 3/2009 | Shiao | 280/287 |
| 7,591,473 B2* | 9/2009 | Tak-Wei Hon et al. | 280/278 |
| 7,651,109 B2* | 1/2010 | Tong | 280/278 |
| 7,784,808 B2 | 8/2010 | Fan | |
| 8,152,189 B2* | 4/2012 | Dodman et al. | 280/274 |
| 8,162,345 B1* | 4/2012 | Szu-Yao | 280/287 |
| 8,205,902 B2* | 6/2012 | Uimonen et al. | 280/278 |
| 8,430,414 B1* | 4/2013 | Yap | 280/278 |
| 8,801,022 B2* | 8/2014 | Song | 280/278 |
| 2001/0004150 A1* | 6/2001 | Murayama | 280/287 |
| 2001/0045723 A1* | 11/2001 | Niitsu et al. | 280/287 |
| 2002/0153695 A1* | 10/2002 | Wang | 280/287 |
| 2002/0163159 A1 | 11/2002 | Christensen et al. | |
| 2002/0167151 A1* | 11/2002 | Tseng | 280/287 |
| 2003/0030245 A1 | 2/2003 | Janssen | |
| 2003/0051934 A1 | 3/2003 | Ou | |
| 2003/0114274 A1 | 6/2003 | Chang et al. | |
| 2004/0004341 A1 | 1/2004 | Carr et al. | |
| 2004/0180758 A1 | 9/2004 | Ma | |
| 2005/0062256 A1* | 3/2005 | Chen | 280/287 |
| 2005/0230933 A1 | 10/2005 | Woo | |
| 2005/0263979 A1 | 12/2005 | Sinclair et al. | |
| 2006/0061060 A1* | 3/2006 | Chen | 280/287 |
| 2006/0175797 A1* | 8/2006 | Sanders | 280/287 |
| 2007/0018421 A1* | 1/2007 | Chen | 280/278 |
| 2007/0024023 A1 | 2/2007 | Hsu | |
| 2007/0063478 A1 | 3/2007 | Kwok et al. | |
| 2007/0069499 A1 | 3/2007 | Lin | |
| 2007/0210556 A1* | 9/2007 | Hon et al. | 280/287 |
| 2007/0290479 A1* | 12/2007 | Tong | 280/278 |
| 2008/0217881 A1 | 9/2008 | Gobillard | |
| 2008/0224441 A1* | 9/2008 | Lu | 280/278 |
| 2009/0058038 A1* | 3/2009 | Dodman et al. | 280/274 |
| 2010/0133777 A1* | 6/2010 | Daniels | 280/278 |
| 2012/0056399 A1* | 3/2012 | Hon et al. | 280/278 |
| 2012/0169029 A1* | 7/2012 | Marais et al. | 280/287 |
| 2012/0273287 A1* | 11/2012 | Song | 180/65.31 |
| 2013/0087988 A1* | 4/2013 | Wang et al. | 280/287 |

FOREIGN PATENT DOCUMENTS

| | | |
|---|---|---|
| DE | 152616 | 6/1904 |
| DE | 2352321 | 5/1974 |
| DE | 3225340 | 1/1984 |
| DE | 284200 | 11/1990 |
| DE | 4006095 | 8/1991 |
| DE | 4316366 | 11/1994 |
| DE | 19521064 | 12/1995 |
| DE | 29618907 | 3/1997 |
| DE | 19803462 | 8/1998 |
| DE | 20112963 | 10/2001 |
| DE | 20110016 | 11/2001 |
| DE | 20120092 | 3/2002 |
| DE | 20311511 | 10/2003 |
| DE | 60303842 | 8/2006 |
| DE | 102007009887 | 10/2007 |
| DE | 102011050447 | 11/2012 |
| DE | 102011051850 | 12/2012 |
| DE | 10201152134 | 1/2013 |
| DE | 102011052270 | 1/2013 |
| DE | 102011053875 | 2/2013 |
| DE | 102011053733 | 3/2013 |
| EP | 10201 | 4/1980 |
| EP | 388540 | 9/1990 |
| EP | 1142780 | 10/2001 |
| EP | 1258421 | 11/2002 |
| EP | 1600368 | 11/2005 |
| EP | 1995165 | 11/2008 |
| FR | 411607 | 6/1910 |
| FR | 493509 | 12/1918 |
| FR | 876657 | 11/1942 |
| FR | 2366491 | 4/1978 |
| FR | 2876657 | 4/2006 |
| GB | 2373771 | 10/2002 |
| JP | 2010260457 | 11/2010 |
| KR | 100768964 | 10/2007 |
| NL | 9002644 | 7/1992 |
| WO | WO9800331 | 1/1998 |
| WO | WO9959865 | 11/1999 |
| WO | WO0029277 | 5/2000 |
| WO | WO03008260 | 1/2003 |
| WO | WO2006/111590 | 10/2006 |
| WO | WO2007057992 | 5/2007 |
| WO | WO2009056078 | 5/2009 |
| WO | WO2009145599 | 12/2009 |
| WO | WO2010054500 | 5/2010 |

OTHER PUBLICATIONS

Unknown author, "Past developments of Maderna Cycle Systems", unknown publication date, retrieved from http://mcsbike.com/?p=90/#d on Apr. 22, 2014.

Unknown author, "Frogsprung durch Technik", unknown publication date, retrieved from http://birdy-freunde.de/birdy/frog.html on Apr. 22, 2014.

YTdreamslide, Travelling sequences.mov Video uploaded to Youtube on Jun. 5, 2010 and retrieved from http://www.youtube.com/watch?v=7W4vy8NySbQ on Apr. 22, 2014.

* cited by examiner

Fig. 35
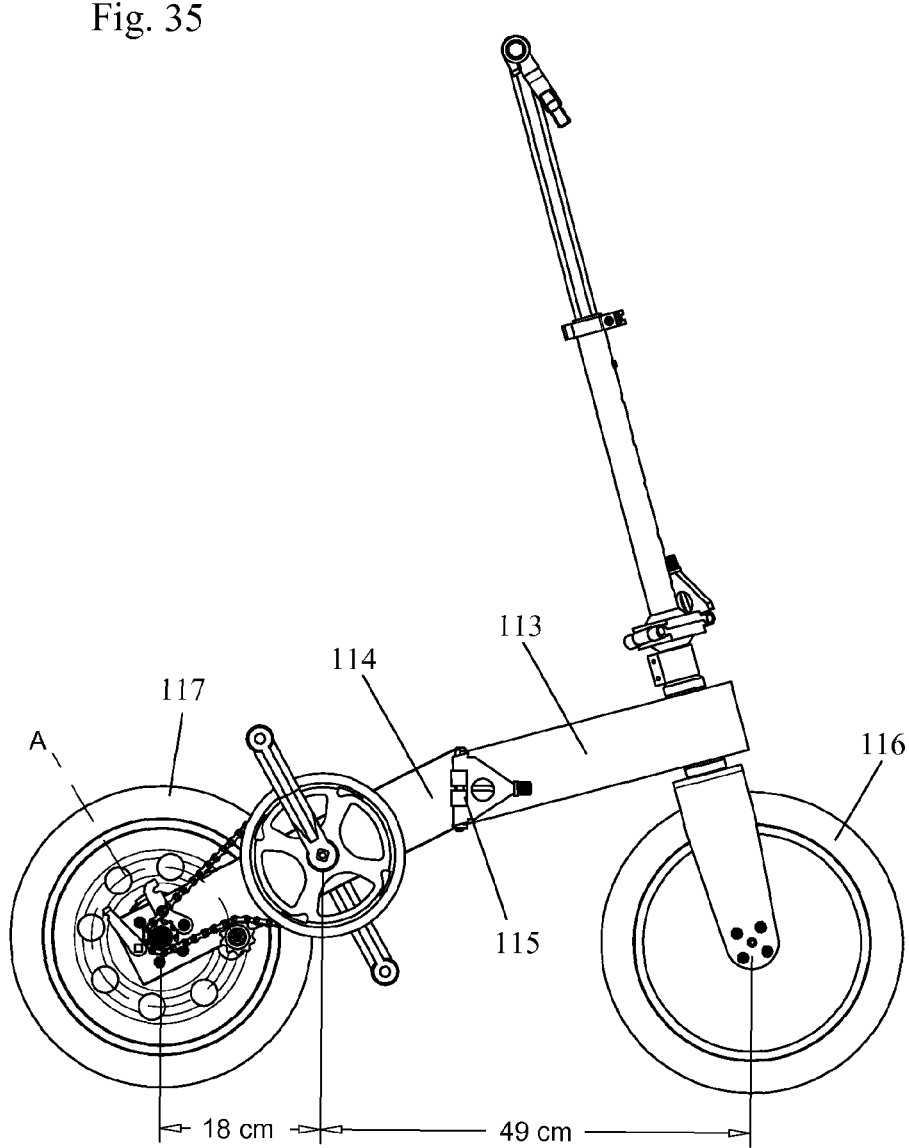
Detail A
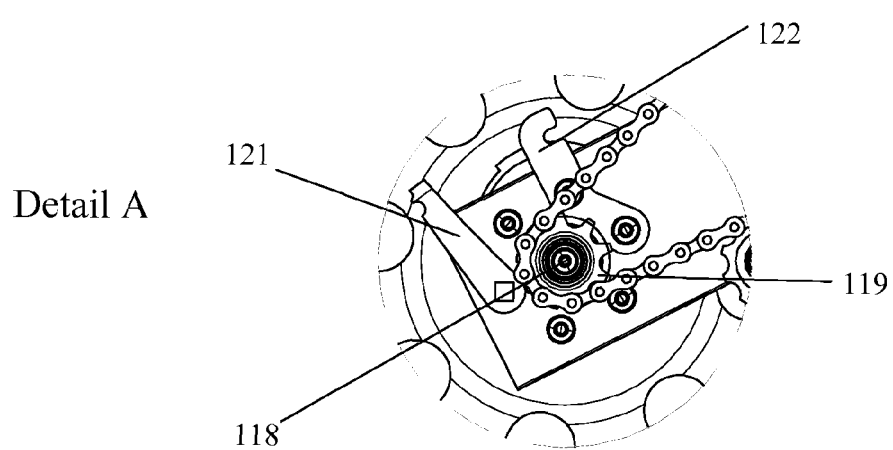

Fig. 41
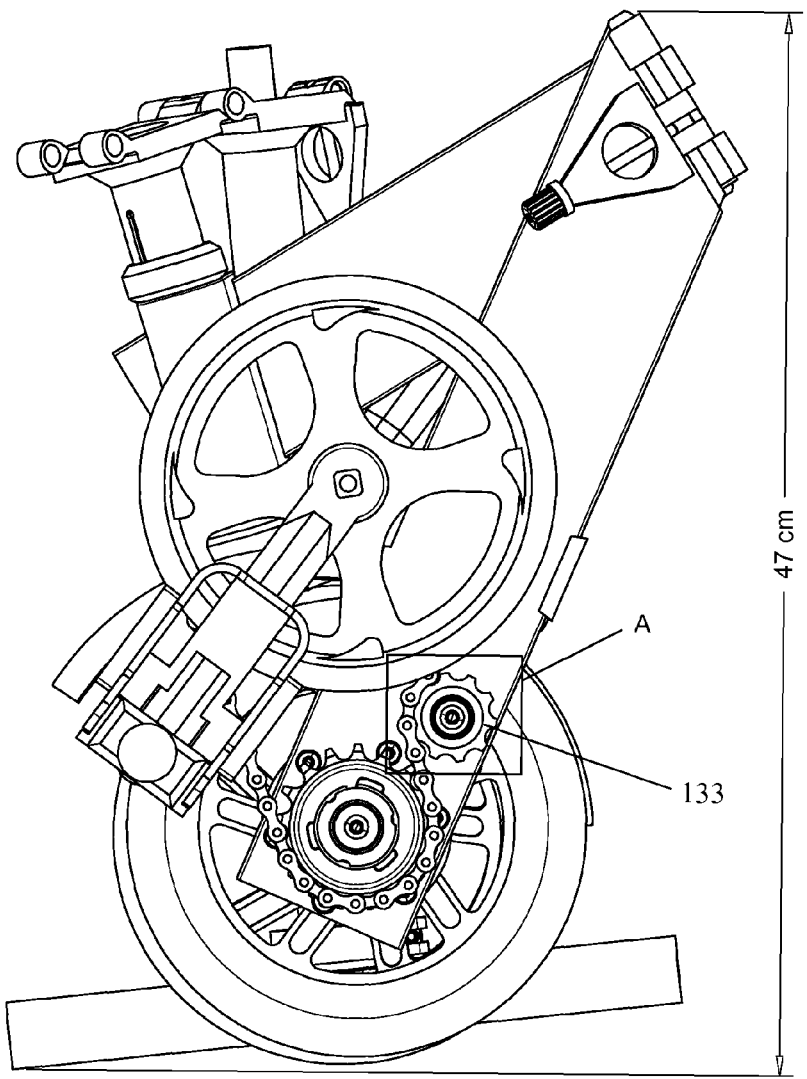
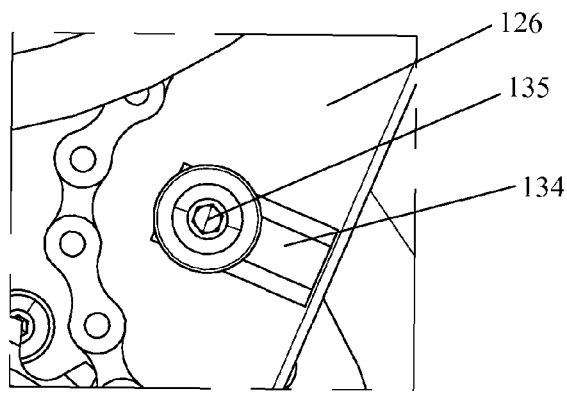
Detail A

COMPACT, COLLAPSIBLE BICYCLE

TECHNICAL FIELD

The invention relates to a compact, foldable bicycle.

BACKGROUND

In combination with (motor-driven) transportation such as railroad, automobile or aircraft or in combination with ships, folding bicycles or scooters are used as muscle- or electrically driven vehicles. These vehicles intend to minimize time for commuting distances. Further folding bicycles are used for travels where there is not enough space for a 26/28-inch bicycle. To meet these objectives, the targets are smallest possible folding size, lowest possible weight and comfortable riding for a vehicle suitable for adults.

Regarding this, known commercially-available folding bicycles exhibit the following disadvantages:
a. They are relatively heavy (>10 kg), lighter versions are expensive because of more expensive lighter materials (for example carbon instead of aluminum).
b. The frame construction requires the use of many special components only manufactured for the respective bicycle frame, making it very expensive.
c. To achieve the targeted folding size, components such as brakes and shifting elements have to be manufactured individually for the respective folding bicycle.
d. Axially seen between the bicycle frame and the rear wheel the output sprocket of the chain transmission is arranged. This arrangement requires a minimum width of the rear-wheel-axle or, due to required chainstay lengths a long folding size in the folded state of the bicycle.
e. Transmissions (planetary gears and derailleurs) are used with transmission ratios designed for large wheels. Consequently the driving sprocket must exhibit more teeth compared to large-wheel-bicycles, hence the cyclist makes the same distance with the same pedaling frequency as with large-wheel-bicycles. To achieve a suitable development of 7.5 m in the highest gear, these transmissions are suitable even with a large driving sprocket only for wheels starting from 20 inch, however at least 16 inch.

Conventional scooters exhibit the following disadvantages:
a. The energy expend is considerably higher than in the case of a bicycle.
b. The achievable speed with a scooter is considerably lower than with a bicycle.

When wheels smaller than 16 inch or 20 inch are used, further aspects relating to the cycling characteristics have to be taken into account for assessing the prior art:

Small front wheels react more quickly to steering movements and tend to jiggle even at lower speeds and on slightly uneven road surfaces.

When cycling over obstacles (objects, holes, elevations on the roadway) with small wheels, the steering motion can be severely impaired.

Bicycles having small wheels can exhibit shorter distances between the rear-wheel axle and the bottom bracket than bicycles having large wheels. Seen in the traveling direction, the further to the rear the center of gravity of the cyclist is situated, the greater is the risk that the front wheel lifts off when the cyclist accelerates.

Due to the gyroscopic effect that is considerably reduced in the case of small wheels, the cyclist's inertia has a larger influence affecting the cycling stability. If for example the cyclist in quick alternation steers to the one and to the other direction with a small front wheel, the mass of the cyclist produces a moment of inertia that trails the steering motion. This affects the control of a bicycle having small wheels. The cyclist's moment of inertia delays the cyclist's curve motion at the beginning of the steering motion and accelerates the cyclist's curve motion at the end of the steering motion. The frequency of the changes staying constant (for example during a slalom race), this effect builds up to the point that the bicycle starts to spin. Seen in the travel direction, the further to the front the center of gravity of the cyclist is situated, the greater are the destabilizing tilting moments from the cyclist's moment of inertia while cycling a curve.

Due to the considerably reduced gyroscopic effect cycling while standing up is in principle more unstable with smaller wheels than with large wheels.

Small wheels require more revolutions to achieve the same convenience for the bicycle as with bicycles having larger wheels.

The braking behavior is also essential for the cycling characteristics. For supporting his own moment of inertia on the handlebar while decelerating the sitting position usually forces the cyclist's arms to describe a straight line between the handlebar and the shoulder. Particularly compact-designed bicycles doesn't allow the arms to describe a sufficiently straight line, so that the cyclist can no longer brace his accelerated mass against the handlebar on greater deceleration from higher speeds and would fall toward the front over the handlebar or at least carries out a motion relative to the bicycle toward the front that affects the cycling stability.

Therefore the following points are essential to evaluate the prior art of bicycles having small wheels:
the cycling characteristics and the cycling stability
the folding size achieved
the development that are achieved for bicycles having small wheels
the braking behavior It is a disadvantage of the following bicycles with small wheels that in case of quick steering motions the cycling stability is compromised by the above-mentioned tilting moments due to the construction, that puts the cyclist far in front. The specifications listed below as examples, describe bicycles having small wheels that, due to their construction, exhibit, seen horizontally, a large distance of more than 25 cm between the cyclist's center of gravity and the rear-wheel axle, the design-related causes being indicated in brackets:
DE 201 10 016 U1, DE 201 20 092 U1, U.S. Pat. No. 6,439,590 B1 (drive system having upstanding steps), U.S. Pat. No. 7,784,808 B2, U.S. Pat. No. 6,799,771 B2 (drive system having a two-chain transmission),
the bicycle dreamslide by dreamslide, S.A, Bures-sur-Yvette, France (bottom-bracket linkage and 16-inch rear wheel used because of the single-speed chain drive),
the bicycle microslider by dreamslide, S.A, Bures-sur-Yvette, France (two-chain transmission),
U.S. Pat. No. 5,186,482 A (two-chain transmission),
the bicycle Birdy Frog by Riese and Müller up to 2006 (rotatable fork dampened relative to the seat tube on the bottom bracket for fork-like suspension of the rear wheel),
U.S. Pat. No. 3,979,136 A (spur gear on the bottom bracket arranged in the direction of the rear wheel),
EP 1 995 165 A2 (drive system by means of foot plates, the center of gravity of the cyclist being in front of the bottom-bracket axle seen in the direction of cycling),
US 2007/0,069,499 A1 (chain must be passed below the frame, in the folded state the rear wheel must remain arranged below the seat tube to comply with the folding size)
U.S. Pat. No. 4,598,923 A (folding principle).

The bicycles in DE 201 10 016 U1 and in DE 201 20 092 U1 exhibit the disadvantage that the upstanding steps are rotatably connected to the rear-wheel axle, the chainstay length being at least as large as the front center having the disadvantages relating to cycling stability described above.

In contrast, the bicycles mentioned below as examples having small wheels exhibit, seen horizontally, a relatively short distance between the cyclist's center of gravity and the rear-wheel axle: DE 198 03 462 A1, U.S. Pat. No. 7,306,249 B2, DE 32 25 340 A1, U.S. Pat. No. 3,990,717 A, DE 203 11 511 U1, US 2005/0,263,979 A1, WO 2010/054 500 A1, DE 201 12 963 U1, U.S. Pat. No. 6,595,536 B1, WO 2007/057 992 A1, U.S. Pat. No. 6,595,539 B1.

However, they have the disadvantage that they exhibit a saddle and are preferably used seated. While accelerating the bicycle, the cyclist absorbs his own inertia with his hands on the handlebar preventing falling off the bicycle. In the case of the above-mentioned bicycles due to the seat position the force acting on the pedals is applied in front of the cyclist's center of gravity and/or due to the arms pointing forward the pulling force acting on the handlebar is oriented toward the rear. The pulling force acting toward the rear on the handlebar and the force acting toward the rear on the saddle induced by the cyclist's moment of inertia when accelerating in combination with the cyclist's center of gravity, that, seen horizontally, is already arranged very close to the rear-wheel axle, lift the front wheel off the ground even at low pulling forces acting on the handlebar.

Other known bicycles don't allow the cyclist to brace his inertia against the handlebar in the case of a stronger breaking deceleration. Due to the handlebar position the cyclist has to ride with angled arms and cannot stretch them. On stronger deceleration, the cyclist would carry out a motion toward the front relative to the bicycle and fall toward the front, possibly over the handlebar. Examples for this are in: DE 32 25 340 A1, U.S. Pat. No. 7,306,249 B2, US 2003/0,114,274 A1 and U.S. Pat. No. 1,381,281 A.

The folding size and the weight of a folding bicycle are very important for everyday use. The prior art relating to the achievable folding size is described below:

Due to the design of many known folding principles for bicycles with small wheels, in the folding state both wheels being situated one behind the other but at least do not lie next to each other congruently. A disadvantage is, when using wheels with 12 inch and more, these folding principles result in a corresponding folding length of at least circa 65 cm. Examples for this are in EP 1 600 368 A2, WO 2010/054 500 A1, US 2007/0,069,499 A1, U.S. Pat. No. 7,306,249 B2, DE 203 11 511 U1, EP 0 388 540 A1, WO 2009/145 599 A2, WO 2006/111 590 A1, U.S. Pat. No. 4,824,130 A, DE 40 06 095 A1, U.S. Pat. No. 3,419,283 A, U.S. Pat. No. 6,196,566 B1, US 2005/0,230,933 A1, US 2007/0,024,023 A1, US 2003/0,051,934 A1.

A few bicycles are known comprising a top tube with two rotatably connected frame tubes, one is rotatably connected to the head tube and the top tube is rotatably connected centrally to a further frame part to which in turn the rear wheel and the bottom bracket are attached. The head tube connects a steering column to the front wheel. Due to the folding principle of these bicycles the two frame parts connected to the top tube can be folded together scissors-like. The disadvantage of these bicycles consists in that the longest side of the folding size is at least 65 cm and that the folding size L+W+H of the bicycle is at least 120 cm. However, by far the greater disadvantage is that such a small folding size is only achieved by using particularly small 6-inch or 7-inch wheels, which markedly reduces the ride comfort and the usability. Examples for this are in: US 2005/0,263,979 A1 and WO 2010/054 500 A1.

Folding principles for bicycles having small wheels often realize a folding-together of steering column and seat tube in the same sense, the seat tube and the steering column then approximately lying parallel to the longest side of the folding size. The disadvantage of these folding principles consists in that this longest size is at least 70 cm. Examples for this are in U.S. Pat. No. 4,844,494 A, U.S. Pat. No. 6,032,971 A, U.S. Pat. No. 6,595,536 B1, U.S. Pat. No. 7,055,842 B1, US 2005/0,230,933 A1, US 2003/0,114,274 A1, US 2007/0,024,023 A1, U.S. Pat. No. 6,883,817 B2, DE 603 03 842 T2, U.S. Pat. No. 6,695,334 B2, DE 203 11 511 U1, DE 198 03 462 A1, U.S. Pat. No. 6,799,771 B2, U.S. Pat. No. 7,290,780 B2, U.S. Pat. No. 4,718,688 A, U.S. Pat. No. 4,895,386 A, U.S. Pat. No. 3,979,136 A, U.S. Pat. No. 5,785,338 A.

Further known bicycles, too, exhibit a longest side having a length of at least 65 cm due to the folding principle. Examples for this are in: U.S. Pat. No. 6,032,971 A, U.S. Pat. No. 6,595,536 B1, US 2005/0,230,933 A1, US 2007/0,024,023 A1, U.S. Pat. No. 3,419,283 A, U.S. Pat. No. 4,132,428 A, U.S. Pat. No. 4,111,447 A, U.S. Pat. No. 7,367,576 B2.

The inventor is only acquainted with three bicycles that can be used by adults and that have a very small folding size: U.S. Pat. No. 4,598,923 A, U.S. Pat. No. 6,595,539 B1 and U.S. Pat. No. 7,306,249 B2.

Regarding U.S. Pat. No. 4,598,923 A: The essential disadvantage of this bicycle is that the folding depth with the two wheels arranged next to each other and the box enclosing these wheels would lead to such a box depth that a comfortable ride is no longer possible. The disadvantages of this design-related large horizontal distance between the rear-wheel axle and the cyclist's center of gravity have already been pointed out above. Due to the design-related large front center the cyclist has to stretch his arms comparatively far to the front while the steering-tube head with the head tube and the front-wheel axle are on a line. The bicycle therefore lacks suitable means for controlling the wobbling front wheel during a fast ride. In addition, the bicycle achieves only low meters of development, because only a single-speed chain drive is provided for the small wheels.

Regarding U.S. Pat. No. 6,595,539 B1: In addition to the disadvantages mentioned above, it is disadvantageous that the bicycle does not provide any conventional cranks or that the low folding size cannot be achieved, when cranks are used, and that due to many frame parts and hinge connections a stable construction of the bicycle would result in a high bicycle weight and/or the riding stability is not ensured. A construction having larger wheels would lead to a larger folding size.

Regarding U.S. Pat. No. 7,306,249 B2: The folding size is approximately 58×33×25 cm. In addition to the disadvantages already mentioned for this bicycle, the further disadvantage consists in that the chainstay length for larger wheels is large due to the design, because in the folded state the front wheel is arranged between the rear wheel and the bottom bracket. Thus, the folding size mentioned can only be achieved with 8-inch wheels. 10-inch wheels, for example, would already require a folding length of approximately L=68 cm. For accommodating the front wheel between the bottom bracket and the rear wheel in the folded state and for arranging the chain run, fragile chainstays are designed, allowing reasonable doubts concerning the required strength of the chainstays in practical use. It is a further disadvantage that the front center of the bicycle has the same length as the chainstay and that the head angle is less than 10°. The result is that the front wheel cannot be braked according to standard with a braking deceleration of 3.4 m/s² without the rear wheel lifting off the ground. In addition, the riding stability and the cycling characteristics are compromised for the reasons already mentioned. However, due to the design it is not possible to increase the front center, required for improvement, since otherwise it would no longer be possible to fold the steering column, as is provided here, parallel to the longest side of the folding size. An increase of the head angle is also only possible to a limited extend because when the head angle is increased without the possibility of any appreciable increase of the front center, the handlebar is displaced toward the rear and riding while standing up is made impossible.

Except for these bicycles mentioned all folding bicycles known by the inventor for comfortable use by adults have the disadvantage, that the sum of the two longer edges of the folding size amounts to more than 100 cm. Furthermore, the lightest conventional folding bicycles weigh at least 6.5 kg, however only while accepting particularly small wheels of 10 inch and less. Conventional bicycles having larger wheels weigh at least almost 10 kg.

In the majority of bicycles designed for riding while sitting, the distance between the handlebar and the cyclist's torso is design-related relatively large. When riding while sitting, the cyclist's back is not upright, so the cyclist has to move his head backward and has to tension his back and the neck muscles. Thus he expends additional energy that he cannot use for riding. The back/shoulder and neck areas are always strained. It is a further disadvantage that the cyclist, while riding standing-up, has to bend forward and with a bent body cannot utilize his entire weight for propulsion. An example are in U.S. Pat. No. 4,598,923.

The compact bicycles disclosed in DE 40 06 095 A1, DD 2 84 200 A5, U.S. Pat. No. 4,389,055 A exhibit the disadvantage that the front wheel is driven, whereby the bicycle has to be ridden in a seated position and the cyclist's weight increases the grip between the driven wheel and the ground only to a small fraction, hence frequent slip of the driven wheel is to be expected for greater accelerations.

In the bicycle disclosed in DE 195 21 064 A1, the bottom bracket is arranged, seen in travel direction, in front of the front wheel hence the bicycle cannot be ridden while standing-up.

Furthermore bicycles are known where in particular a transversal seat tube and/or a top tube are absolutely required due to the design. This has the disadvantage that the bicycle is not well suited for riding while standing-up, because the required legroom is missing. In addition, it is more difficult to design constructions having a top tube to be foldable. Examples for bicycles designed having a top tube due to their design and/or with a transversal seat tube: EP 1 600 368 A2, U.S. Pat. No. 5,186,482 A, WO 2010/054 500 A1, DE 32 25 340 A1, DE 198 03 462 A1, U.S. Pat. No. 4,895,386 A, DE 603 03 842 T2.

In the bicycle from U.S. Pat. No. 1,381,281 A the effect described above, that the front wheel lifts off during stronger accelerations, does not arise despite the cyclist being seated while riding. However the disadvantage is, that the bicycle cannot be ridden comfortably while seated, because the pressure point onto the pedals, seen horizontally, is very close to the cyclist's center. Due to the design, the bicycle cannot be ridden while standing up and is also not intended for this purpose. The embodiment provided for women (FIG. 1 from U.S. Pat. No. 1,381,281 A) cannot be ridden while standing up, because under the saddle the handlebar is connected to the connecting tube to the fork stem and the required legroom for cycling while standing up does not exist. The embodiment provided for men (FIG. 3 from U.S. Pat. No. 1,381,281 A) cannot be ridden while standing up, because the handlebar stem below the saddle runs very flat toward the front and thereby does not achieve enough height for the legs to pass under the handlebar when cycling while standing up. In this embodiment also the handlebar grips are arranged lower than the seat surface so that the cyclist could not reach around the handle grips when cycling upright. In the embodiment provided for men, there exists the additional disadvantage that during stronger deceleration the cyclist would fall forward over or against the handlebar. In all embodiments there exists the disadvantage that during stronger deceleration, the cyclist cannot support his own inertia and would fall forward. In both embodiments, the saddle, arranged in a vertical line above the bottom bracket, impedes cycling while standing up. Further disadvantages consist in that the frame cannot be folded together, that the frame is not designed as a single-beam type, that the preferred embodiment only achieves a development of approximately 3.8 m/crank revolution (estimated construction of the preferred embodiment: 8-inch wheels having a driving sprocket with 54 teeth and an output sprocket having 9 teeth) and that a single-speed chain drive having a very large driving sprocket and an output sprocket arranged between the frame and the rear wheel is provided, thereby the frame has to be guided from inside to outside between the driving sprocket and the output sprocket and thereby the chainstay length cannot undershoot an ascertainable minimum.

In many of the bicycles already mentioned and otherwise known, the use of a single-speed chain drive and small wheels, result in very low meters of development, not suitable for normal speed. Because these bicycles are not suitable for daily use, a detailed description of extending disadvantages beyond the above mentioned disadvantages is omitted here. Examples are in: US 2007/0,069,499 A1, U.S. Pat. No. 4,895, 386 A, GB 2 373 771 A, US 2004/0,180,758 A1, DE 43 16 366 A1, DE 201 12 963 U1, US 2007/0,024,023 A1, US 2005/0, 230,933 A1, U.S. Pat. No. 6,595,536 B1, U.S. Pat. No. 4,598, 923 A.

Bicycles are furthermore known, where the bottom-bracket axle and the rear-wheel axle coincide and the rear wheel is driven directly or via an intermediate gear box. The disadvantage of these bicycles consists in the fact, that the transmission ratios achievable for the bicycle drive are very small and thus require large wheels to achieve a suitable transmission, whereby no compact folding size can be achieved. At least 20-inch wheels are requisite so that the pedals obtain the necessary ground clearance. In addition, no conventional bottom brackets and cranks can be used. Examples are in: WO 98/00 331 A1, EP 0 010 201 A1, FR 411 607 A, FR 2 366 491 A1, FR 876 657 A, DE 138 824 A, FR 493 509 A, WO 2007/057 992 A1.

In WO 2009/056 078 A2 a two-chain drive drives the rear wheel and the bottom-bracket axle and the rear-wheel axle coincide. Hence the driving sprocket of the first transmission shaft is connected to the same shaft on which the output sprocket of the second transmission shaft is mounted. The driving sprocket of the first transmission step is connected conventionally to the crank. To achieve an appropriate chain-line distance of the first transmission step despite the two-chain drive, the chainline distance of the second transmission step relative to the central reference plane of the bicycle is to be designed approximately so small that it corresponds to half the width of the rear-wheel tire. The disadvantage of this drive system is therefore that 26-inch wheels have to be used so that rim and tire of the wheel do not collide with the second transmission step, this likewise, due to the design, not achieving a compact folding size. A further disadvantage consists in that no commercial bottom brackets can be used because the bottom bracket also supports the rear wheel.

In all known bicycles that are ridden standing up the cyclist supports himself only on two points at the bicycle, to be precise with the feet on the pedals and with the hands on the handlebar. If small front wheels are used, in accordance with the explanations above, particularly during fast cycling and/or while cycling over obstacles, the directional stability is severely impeded. In all known bicycles that are ridden while standing up, there is in addition the disadvantage that during stronger braking the cyclist is moved forward due to his own inertia and at first experiences an uncontrolled relative motion in the direction toward the handlebar, the cycling stability being compromised in the process. Finally there is the disadvantage the shoulder and back muscles of the cyclist are tensioned by the arms pointing forward and the cyclist at the same time tending to slightly lean forward while cycling. Examples are in: JP 2010 260 457 A, FR 2 876 657 A1, EP 1 995 165 A2, WO 2006/111 590 A1, KR 10 0 768 964 B1, US 2004/0,004,341 A1, the bicycles microslider and dreamslide by dreamslide, S.A, Bures-sur-Yvette, France, and the bicycles MCS16" and MCS across the city by Maderna Cycle Systems, Vienna, Austria. The foot loops used in FR 2 876 657 A1 and the pedals that are bent upwards from the tip of the foot alleviating the disadvantages, that have been mentioned, only slightly in that the feet can support the cyclist's inertia during stronger deceleration likewise against the bent-off pedals.

Above what has been mentioned, it is a disadvantage of the vehicle from US 2004/0,004,341 A1 that the transmission ratios realized by the single-speed chain or gear drive, for small wheels do not enable appropriate development. Due to the arrangement of a base between the bottom bracket and the front wheel, the cyclist must cycle bent forward and/or with arms stretched forward. The small distance between the bottom bracket and the rear-wheel tire is achieved in the vehicle only because the bottom bracket is fastened to the frame by a separate arm pointing upward and because therefore all transmission parts (sprockets and chain or gear wheels) are arranged above the supporting frame.

In addition, the bicycles MCS16" and MCS across the city by Maderna Cycle Systems, Vienna, Austria, exhibit the following disadvantages: The bicycle is only suitable for persons with small difference in terms of body height because the height of the steering tube that is connected to the fork stem cannot be height-adjusted. Furthermore at its upper end the steering tube exhibits a front-facing handlebar stem that is connected to the handlebar and that positions the handlebar further away from the cyclist to the front. The steering and braking concept of these bicycles therefore evidently provides that while braking, the cyclist braces his weight against the handlebar by stretching the arms and thus maintains his position relative to the bicycle when braking, with the disadvantages mentioned above. The folding concept of the bicycle therefore provides a hinge having an axis of rotation parallel to the rear-wheel axis, so that the unit consisting of front wheel, front-wheel fork, head tube, and handlebar, is folded scissors-like with the rear frame part, with the disadvantages, mentioned above, of the very long folding dimension.

The cycling/steering and braking concepts of the bicycles microslider and dreamslide by Dreamslide S.A. Bures-sur-Yvette, France, due to the arrangement of the handle grips inclined to the front and the position of the handlebar relative to the body of the cyclist (handlebar position slightly lower than the center of the cyclist, handlebar position so far in front of the cyclist's torso, that out-of-saddle riding is possible) evidently also provide for the cyclist to brace his weight against the handlebar by stretching the arms while braking and thus maintains his position relative to the bicycle with the disadvantages that have been mentioned. It is also a disadvantage of these bicycles that only the handlebar can be folded in.

All bicycles having particularly small wheels exhibit the disadvantage that the driving wheels when running onto an insurmountable obstacle are inevitably pushed away to one side whereby also the cyclist falls uncontrollably to one side.

The disadvantage of using commercially available cranks having a crank length of at least 165 mm for cycling while standing up are described in detail in US 2008/0,217,881 A1. Here also the disadvantages of US 2002/0,163,159 A1 and US 2003/0,030,245 A1 are discussed in detail. However, the disadvantage of the embodiment known from US 2008/0,217,881 A1 for a crank to be ridden while standing up consists in that no commercially available bottom brackets and driving sprockets can be used here because the bottom bracket has to be supported between the driving sprocket and the cranks relative to the bicycle frame, that rather the bottom bracket and the cranks are expensive special components, that the chain drive is arranged inside the frame and thus more difficult to access for maintenance, thereby the manufacturing costs for the bicycle frame are correspondingly high, that the foldability of the frame can be made possible only at considerable effort and that, as already described above for the correspondingly designed bicycle by dreamslide, due to the design there result chainstay lengths of more than 25 cm (see also the bicycle dreamslide by dreamslide S.A, Bures-sur-Yvette, France).

In the bicycle microslider by dreamslide S.A, Bures-sur-Yvette, France, a two-chain transmission is used to achieve suitable transmissions and to achieve good ground grip of the rear wheel despite the small wheels. In order to arrange the two-chain transmission with an appropriate width and a small axial pedal distance, the chain transmission has to be arranged inside the bicycle frame of two-part design between the rear wheel and the bottom bracket. Due to the required arrangement of the output wheel of the first transmission step, there results a design-related great chainstay length with the disadvantages described above in terms of the cycling stability and the achievable folding size.

An elliptically designed driving sprocket is provided for the bicycle presented in FR 2 876 657 A1, to reduce the rate of fall of the cyclist onto the pedals. Here too, it is disadvantageous that no conventional cranks can be used and that the bicycle cannot be folded together.

The bicycle disclosed in KR 10 0 768 964 B1 exhibits the disadvantage that each pedal is rotatably connected to the bicycle also at the level of the rear-wheel axle. Therefore a corresponding rear-wheel axle and a supporting bicycle frame have to be designed on both sides.

In addition to the disadvantages already mentioned, the bicycle in EP 1 995 165 A2 exhibits the disadvantage that it is very expensive to manufacture due to the complex frame structure.

The bicycle to be ridden while standing up, disclosed in WO 2006/111 590 A1, exhibits, seen horizontally, a chainstay length of at least 21 cm if, as is shown, an 8-inch wheel is used. The chainstay length would amount to at least 22.5 cm when using a 9-inch wheel. Due to the handlebar stem pointing forward, the handlebar is positioned so far in front of the cyclist, seen in the cycling direction, that the cyclist must stretch his arms sufficiently, with the disadvantages mentioned. There is also the disadvantage that the design does not provide means for handling the wobble of the small 8-inch wheel resulting from road bumps and cycling activity. It is also problematic to run over obstacles due to the small wheels and the lack of control of the front wheel. Due to the single-speed chain drive and the small 8-inch wheels results only a development of approximately 54/9*8 inch*π=3.83 m/U for the bicycle.

Due to the design the chainstay length of approximately 21 cm is only achieved in that the supporting frame part running in the central reference plane extends above the 8-inch rear wheel and exhibits at the rear wheel two ends that are connected to the supporting frame part above the tight side of the chain and must extend downward from the frame so as to arrange the rear wheel and the output sprocket of the chain drive inside the ends of the rear wheel.

A disadvantage of this arrangement is that the supporting frame part is arranged above the two wheels so that due to the construction suitable bottom-bracket heights of the bottom bracket arranged directly below the supporting frame part can only be achieved for wheel sizes up to a maximum of 10 inch. For larger wheels the bottom bracket would have to be arranged in an X-frame further below the horizontal frame carrier.

Due to the design, there is further the disadvantage that an unconventional rear-wheel brake has to be provided that in the present case is operated by a pedal, the pivot of the pedal having to be arranged between the rear wheel and the bottom bracket with the consequence that, measured horizontally, more than 10 cm is required between the bottom-bracket axle and the outer circumference of the rear wheel so that the brake construction can be arranged. The chainstay length of approximately 21 cm is thus only realized for 8-inch wheels due to the design. In a design of the bicycle having 10-inch wheels, a chainstay length of more than 25 cm would result.

Due to the arrangement and guidance of the handlebar and of the chainstay length of 21 cm achievable for an 8-inch wheel, the illustrated wheel base of approximately 72 cm results in a weight distribution of the cyclist of at most 71% on the rear wheel and at least 29% on the front wheel.

For example for a 100 kg cyclist due to the design the following force ratios between the rear wheel and the ground result: Since the cyclist rides while standing up, he puts his entire weight on the pedals. This exerts a torque of approximately 100×9.81×130×8 inch×pi/3,830=21,250 Nm onto an 8-inch rear wheel in the case of the mentioned development of 3.8 m/crank revolution and a crank length of at least 130 mm. This means, a tangential force of 21,250/8 inch*2=209 N acts between the rear wheel and the ground. At this moment, the pedals are at the foremost point, i.e. 210 mm+130 mm=340 mm from the rear-wheel axle. Thus a weight force of 100× 9.81×(1−340/720)=518 N rests on the rear wheel considering the wheel base of 720 mm. To achieve sufficient friction of the rear wheel to the ground, the friction coefficient between the rear wheel and the ground thus has to amount to at least 0.4 to prevent the rear wheel from slipping on the ground. In addition, it is very unfavorable if not even impossible to use pneumatic tires due to the smaller wheels. Taken together the bicycle is suitable only to a limited extent for cycling on wet and/or less firm grounds like soil or gravel.

The frame consists of a front and a rear frame part that can be telescoped one inside the other to achieve a favorable packed size and due to the design are therefore constructed in a straight line. Due to the design, the bottom bracket therefore has to be arranged below the rear frame part to enable on the one hand the frame parts to be telescoped into each other and on the other hand to be able to guide the tight side of the chain below the ends of the rear wheel. Because the steering head that is connected to the front frame part, for achieving the desired favorable packed size, is arranged directly above the front wheel and thus the handlebar can be removed directly above the steering head or folded together, there is the construction-related disadvantage that the design shown with an 8-inch wheel can achieve only a bottom-bracket height of approximately 22 cm. In a design having a 9-inch wheel, correspondingly only a bottom-bracket height of 24 cm can be achieved. There is also the disadvantage that bending moments act between the front and the rear frame parts therefore a minimum insertion length is required that covers both frame parts.

Finally, the intended head angle is not inside the standard 65-75°. This has the disadvantage of a more inferior steerability of the bicycle.

In all bicycles with chain transmissions that can be ridden while standing up and/or that exhibit small wheels of less than 20 inch, there exists the further disadvantage that the output sprocket of the chain transmission is arranged between the bicycle frame and the rear wheel, a possible chain guard that supports the rear wheel also counting as part of the bicycle frame.

This arrangement exhibits the construction-related disadvantages, that in the case of a single-speed chain drive, the output sprocket has to exhibit at least 9 teeth, hence to achieve an appropriate development for 12-inch wheels a driving sprocket should have at least 52 teeth.

that a minimum width of the rear-wheel axle suspension of at least 120 mm is requisite due to the frame lying outside at the rear wheel and due to the fastening screws of the rear-wheel axle, that with a single-speed chain transmission and an outside driving sprocket the chainstays have to form a curve from the bottom bracket to the rear-wheel axle, therefore relatively large pedal distances and corresponding chainstay lengths are required to get a sufficient distance between the crank and the bicycle frame or the rear-wheel axle or the fastening screw for the rear wheel.

Examples for this embodiment can again be found in the bicycles MCS 16" and MCS across the city by Maderna Cycle Systems, Vienna, Austria, where the chainstay length is more than 23 cm.

DE 152 616 A describes a compact foldable bicycle that exhibits the following disadvantages:

Due to the construction, the pedals are not connected to a crank, but rotatably to the crank shaft that is eccentric at its ends and the eccentricity between the crank shaft and the pedal axle amount to only a few centimeters. The effort of the cyclist leads only to a very small driving torque, thus no suitable accelerations can be achieved with the bicycle.

Due to the construction, the front wheel is approximately only half the size as the rear wheel so that the targeted small packed size can be achieved. If a larger front wheel were to be used, it would no longer be possible to realize the inventive idea of the bicycle. To achieve the targeted packed size, due to the construction the crank shaft is approximately at the same height as the rear-wheel axle. To implement the targeted bicycle geometry in connection with the required bottom-bracket heights, due to the construction a 16-inch wheel is to be used as rear wheel. Independent of the wheel size there is the design-related disadvantage that appropriate crank lengths cannot be achieved due to the bicycle geometry in connection with the required ground clearance of the pedals.

A chainwheel is used that is positioned on the inside, whereby usual cranks can no longer be used.

To achieve the smaller packed size the angle of the head tube has to amount to more than 85°. Therefore the front wheel cannot be decelerated according to the standard with a braking deceleration of at least 3.4 m/s² without the rear wheel lifting off the ground.

To fold the bicycle, front wheel, handlebar and head tube have to be disassembled.

A gear box is positioned inside the frame. To achieve unimpeded meshing of the gear box, the frame construction must have the corresponding stiffness.

The bicycle is provided with a frame that due to the construction exhibits a side panel each on both sides of rear wheel respectively front wheel and thus is of at least two-part design between the ends of the rear wheel and the bottom-bracket housing and between the bottom-bracket housing and the front-wheel suspension.

The largest packed size of the folded bicycle amounts to at least 65 cm.

Essential aspects of the prior art described above are again pointed out below:

a. All known bicycles that are ridden while standing up exhibit, seen in the travelling direction, a handlebar stem and/or handles that point forward plus a horizontal part of the distance between the bottom-bracket axle and the steering-tube head of more than 300 mm. With the steering and braking concept of the bicycles the cyclist braces himself against the handlebar with his arms that are stretched if possible, so he maintains his position relative to the bicycle, with the mentioned disadvantages concerning the cycling stability and safety.

b. All known bicycles having wheels of at most 16 inch have a bicycle drive with a chain transmission having an output sprocket arranged, seen axially, between the bicycle frame and the rear wheel, or having an output sprocket, seen axially, on the side of the rear wheel opposite the bicycle frame, a possible chain guard that supports the rear wheel also counting as part of the bicycle frame, with the mentioned disadvantages concerning the width of the chainstay and/or the requisite chainstay length.

c. All known feasible bicycles that use cranks for riding, exhibit folding concepts that only achieve a folding size of more than H+W+D=115 cm. The sum of the two longest folded sides of all known bicycles amounts to more than 100 cm. The longest folding-size length of all known bicycles amounts to more than 55 cm.

d. All known bicycles exhibit the disadvantage that they don't achieve appropriate development of at least 4.5 m per crank revolution and no suitable velocity with acceptable pedaling frequency, or they achieve this development, but exhibit a chainstay length of more than 23 cm.

e. For all bicycles having an average wheel size of at most 380 mm and a bicycle drive with a driving wheel, arranged outside the bicycle frame, the friction coefficient of the friction pairing rear wheel/ground has to amount to at least 0.4, so that the rear wheel does not slip on the ground when accelerating while standing up. This in principle entails the risk of slipping on soil and/or wet ground.

SUMMARY

The object of the invention consists in developing a foldable bicycle,
a. that closes the gap between a light, but energy-expending scooter and a heavy, but energy-efficient folding bike,
b. that enables smaller folding sizes and can be lighter than known and realizable bicycles.
The characterizing features of claim 1 serve to achieve this object in a generic bicycle.

Furthermore the bicycle according to the invention exhibits advantageous designs,
c. that, despite their small wheels, exhibit a similar grip of the rear wheel as commercially available 26/28-inch bicycles.
d. whose front wheel does not lift off, when accelerating at least in the more demanding gears, similar to a 26/28-inch bicycle.
e. that exhibits a good directional stability even with small wheels,
f. that lead to the smallest possible handlebar excursions when going across obstacles with small wheels,
g. using which, fast steering movements with small wheels do not lead to oversteering triggered by the cyclist's inertia and leads to swerving,
h. that can be braked easily without the cyclist falling forward across the handlebar,
i. whose drive system exhibit suitable developments despite smaller wheels.
j. its folding size fits the size of a conventional suitcase for travelling, preferably a carry-on luggage having the dimensions W+L+H<=115 cm,
k. that weight considerably less than 10 kg with variants that comply with the regulations concerning carry-on luggage for air travel with at most 6 to 8 kg,
l. that can be ridden energy-efficiently even over longer distances due to the short crank lengths,
m. that can also be engineered with solid-plastic wheels of smaller inch size so that a high banking inclination (enhancing the pleasure) can be achieved on a dry roadway,
n. that are suitable for cyclists having different body heights, the favorable cycling characteristics being maintained,
o. that can be engineered with differing wheel sizes between 8 inch and 16 inch,
p. that exhibit a bicycle frame and few frame parts to be manufactured easily and therefore cost-efficiently—preferably by extruding,
q. that the same extruded profiles can be used for frames with different wheel sizes,
r. that exhibit a narrow pedal distance and enable ergonomically favorable cycling,
s. that are equipped with conventional components such as brakes, cranks, bottom brackets, sprockets etc. and can be manufactured cost-effectively,
t. that exhibit a multi-speed gear having six evenly graded speeds,
u. that are engineered according to standard,
v. that offer optimum ground adhesion of the rear wheel during acceleration while standing up.

To explain the inventive ideas and the advantages of the characterizing features:

At first a simplifying calculation model for determining the grip of the rear wheel is introduced that has proven to be a good summary of many characterizing properties of the invention. As a characteristic value, the required friction coefficient of the friction pairing rear wheel/ground surface has to be calculated. For the simplified calculation model it is assumed that acceleration of the small wheels takes place during cycling while standing up.

The force ratios between the rear wheel and the ground surface when accelerating while standing up are considered in the following simplified model so as to formulate a characterizing feature:

The cyclist uses his entire weight on the pedals when cycling while standing up, the pedals in the process being in the foremost position. His weight force then acts at right angles onto the pedals. The torque acting on the rear wheel is determined from the torque taking up by the crank multiplied with the transmission ratio of the drive system of the bicycle, the transmission ratio being defined as the ratio between the number of crank revolutions divided by the number of revolutions of the rear wheel. For simplification, the following parameters are set here: the weight force of the bicycle and the cyclist together amounts to 115% of the weight force of the cyclist (this corresponds to a bicycle weighing 12 kg that is being ridden by an 80 kg cyclist, or a 10.5 kg bicycle that is being ridden by a 70 kg cyclist), and the center of gravity of the bicycle is on a perpendicular line with the center of gravity of the cyclist who cycles while standing up.

For the requisite friction coefficient of the friction pairing rear wheel/ground surface follows simplified:

With

G=weight force of the cyclist
TKL=crank length
HBL=chainstay length, i.e. horizontal distance between the rear-wheel axle and the bottom-bracket axle
AA=wheel base, i.e. horizontal distance between the rear-wheel axle and the front-wheel axle
Ut=number of revolutions of the crank
Uh=number of revolutions of the rear wheel
Ü=transmission of the bicycle drive=Ut/Uh
Da=outside diameter of the rear wheel
M=torque acting on the rear wheel=G*TKL*Ü
Ft=tangential force Ft resulting from M between rear wheel and ground surface=M/Da*2
Fg=weight force of the cyclist acting on the rear wheel
Rerf=requisite coefficient of friction for the friction pairing rear wheel/ground surface the following applies:

$$Fg=G*(1-(TKL+HBL)/AA)*1.15$$

$$Ft=M/Da*2=TKL*G*Ü/Da*2$$

$$Rerf=Ft/Fg=(TKL*Ü/Da*2)/(1-(TKL+HBL)/AA)/1.15$$

With this, the requisite friction coefficient specifies for which surface, using which wheels and thus in which friction pairing rear wheel/surface resulting there from, the bicycle can be ridden without the rear wheel slipping when accelerating while standing up.

For 26/28-inch bicycles results from the equation above a requisite friction coefficient Rerf of approximately 0.32. If this value is inserted into the equation above, a general feature fulfilled by the invention can be formulated:

$$\text{Rated value}=1 \geq TKL/AA+HBL/AA+TKL*5.4*Ü/Da$$

the factor $F=5.4$ being calculated by $F=2/0.32/1.15$.

The calculation model thereby offers the particular advantage that a rated value independent of the cyclist is formed to describe the characterizing properties of the invention for different wheel sizes and to compare different bicycles by recourse to the geometrical values of the bicycle using drawings.

Known bicycles having an average wheel size of less than 16 inch with bicycle drives that can be designed cost-effectively, where also the driving wheel of the traction mechanism is arranged on the same side of the bottom bracket jointly with the crank and where the distance between the bottom-bracket axle and the rear-wheel axle is larger than half the outer diameter of the rear wheel, only achieve rated values of more than 1.02. The invention achieves rated values of 1.00 and less. Among others, this leads to an improvement of the slip behavior of the rear wheel on wet and/or earthy and/or also sandy surfaces compared to all known bicycles having average wheel sizes of less than 16 inch.

Compliance with a rated value of 1.00 and less is achieved for small wheels because the chainstay length and the crank are engineered sufficiently short and the transmission of the bicycle drive is small enough so that suitable transmissions can be achieved despite the small wheels.

Therefore the rated value is also a suitable characterizing feature for the compactness of the bicycle between bottom bracket and rear wheel in connection with the suitable transmission achieved for the bicycle and for this reason also a suitable characterizing feature for the invention.

The embodiments shown for cycling while standing up even comply with a rated value of 1.00 if for example in the above formula the value of F=5.4 is replaced by $F=2/0.3/1.15=5.8$, a once more improved grip is achieved with Rerf of approximately 0.3 and once again a more compact design in conjunction with a continued suitable transmission.

Good cycling characteristics and stability for the bicycle with small wheels means good directional stability, the compensation of rapid steering movements when among others cycling across obstacles, a good curve behavior, a safe braking behavior and the avoidance of the front wheel lifting off during acceleration.

These properties are in each case achieved for the bicycle, because due to a short chainstay length the influence of the cyclist's inertia and swerving during rapid steering movements is reduced respectively the influence of the cyclist's inertia on the steering movement in the case of a chainstay length of at most 25 cm is even almost compensated, this having a positive effect on the directional stability.

because the closeness of the handlebar to the cyclist's torso enables the elbows and/or the lower arms and/or the wrists to be put close to the cyclist's torso, this additionally stabilizing the handlebar. Hence the directional stability of the small front wheel tending to wobble is stabilized, even when cycling across obstacles. The closeness of the handlebar to the cyclist's torso has a further important advantage: The arm position of the cyclist avoids the muscular tension of shoulder and back muscles that occurs with all known bicycles that can be ridden while standing up. The arm position of the cyclist rather corresponds to that of a runner. Therefore the cyclist no longer tends to bend forward—even slightly. He can rather assume a continuously relaxed, upright cycling position, because the cyclist, when braking, can brace himself with his torso against the handlebar or against the lower arms and wrists positioned between the handlebar and the torso.

because the bicycle is ridden while standing up and therefore, despite the short chainstay length respectively due to the short distances of the handlebar to the cyclist's torso, the front wheel cannot lift off during acceleration. If during cycling while standing up, the cyclist only uses his own weight for the propulsion, the cyclist does not exert any pull on the handlebar, for which reason no tilting moment acting toward the rear is produced around the rear-wheel axle. If the cyclist accelerates by exerting additional pressure on the pedals by pulling on the handlebar with a corresponding body tension, due to the position of the hands close to the cyclist's torso the angle between the pulling force acting on the handlebar and the weight force acting at right angles downward on the pedals is so low that the tilting moment about the rear-wheel axle triggered by the pulling force on the handlebar or by the cyclist's inertia does not become greater than the weight moment about the rear-wheel axle, acting at right angles on the pedals, so that the front wheel does not lift off even if the bicycle is accelerated more strongly.

In this context: The shorter the distance between the handlebar and the cyclist's torso and/or the shorter the chainstay length, the larger is the achievable cycling stability and the smaller is the achievable folding size.

With this, the bicycle offers the best possible combination of grip of the rear wheel, suitable development, small folding size and cycling stability.

To engineer a bicycle with commercially available bottom brackets and cranks, having small wheels with a suitable development, a short chainstay length, a smallest possible folding size with a smallest possible rear suspension, at first further problems had to be solved concerning the drive system of the bicycle according to DE 10 2011 050 447 B4 and DE 10 2011 051 850 B3. The disclosed short chainstay lengths and the suitable development can be realized by the corresponding features from DE 10 2011 050 447 B4 and/or DE 10 2011 051 850 B3. One essential feature here is that the output wheel of the bicycle drive is arranged on the same side of the bicycle frame as the input wheel. Thus, the chainstay lengths can be engineered to be very short and despite the short chainstay lengths the bicycle drive can be multi-speed.

To achieve a foldable frame having a low weight, at first, concerning the folding hinge and the bicycle frame, further problems according to DE 10 2011 052 134 B4, DE 10 2011 052 270 B4, DE 10 2011 053 733 B4 and DE 10 2011 053 875 B3 should be solved. Here it was of essential importance to find a bicycle frame, that can be manufactured cost-effectively and that, to implement short chainstay lengths, is of integral design respectively makes do without weakening weld connections. The corresponding features from DE 10 2011 052 134 B4, DE 10 2011 052 270 B4, DE 10 2011 053 733 B4 and/or DE 10 2011 053 875 B3, make it possible to design the bicycle frame such that the disclosed compact folding sizes, the targeted low weights of the bicycle frame and the disclosed short chainstay lengths can be implemented.

The description of further variants for the drive system that are comprised by the invention, but are not quite so optimal, was dispensed with.

The invention comprises a further drive system in which the output sprocket is arranged on the side of the frame opposite the rear wheel, where the frame suspends the rear wheel in a single-arm fashion. However, this arrangement has the disadvantages that a chain guard can hardly be fixed and that the suspension of the rear wheel on the bicycle frame is exposed to greater bending moments due to weight and impact.

For the reasons mentioned, the following description is restricted to the preferred embodiments that are described and can be engineered in a particularly compact manner.

BRIEF DESCRIPTION OF THE DRAWINGS

FIG. 35 shows the side view of a forth preferred embodiment having 14-inch wheels, a single-speed chain transmission having a particularly small output sprocket and a drum brake.

FIG. 41 shows the folded bicycle from FIG. 40 in the side view.

FIG. 44 shows the folded bicycle from FIG. 40 in a view from above, to illustrate the folding sizes. an example of . . . .

DETAILED DESCRIPTION

Figure 1:
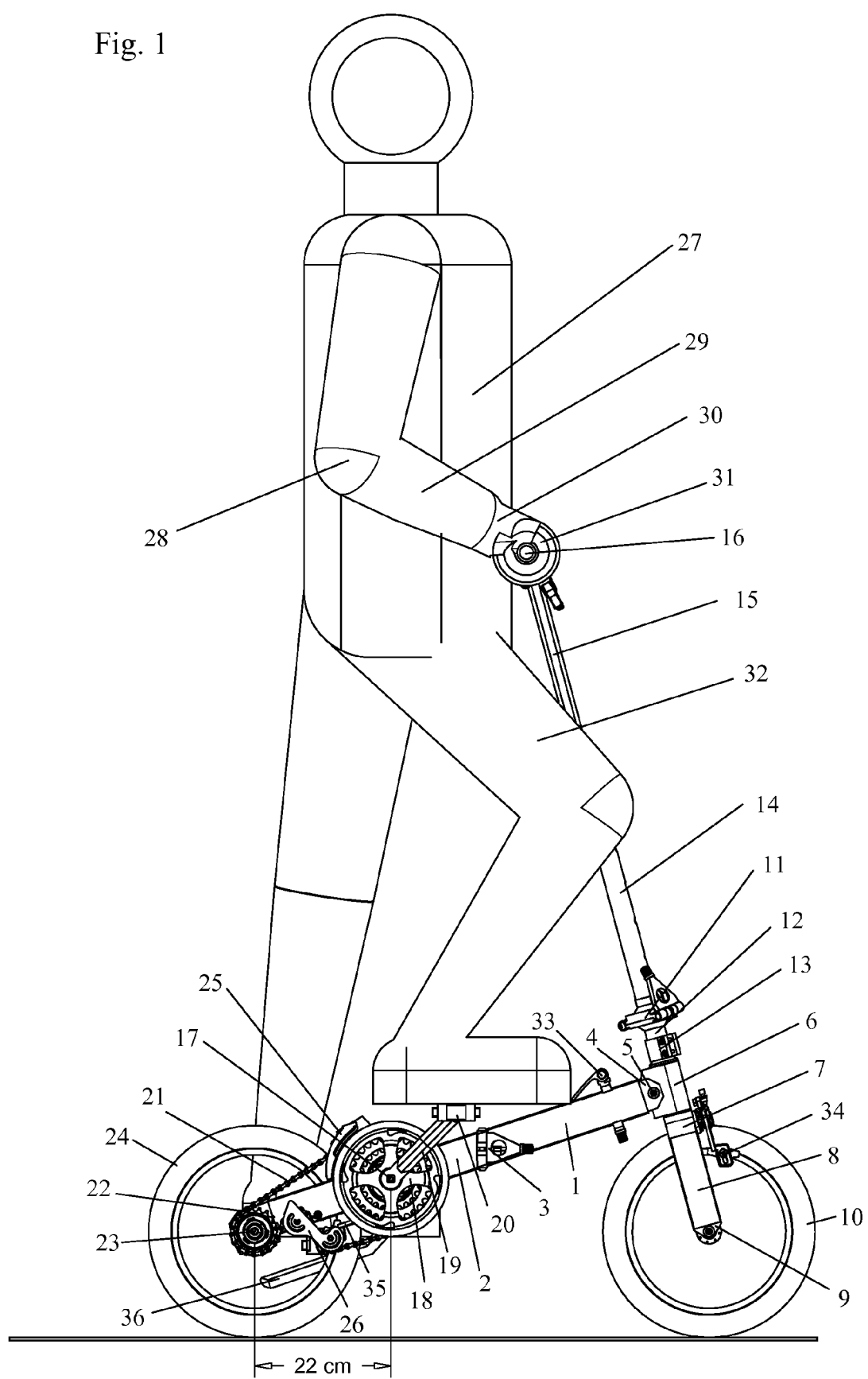
FIG. 1 shows the side view of a first preferred embodiment of the bicycle having a two-sided rear suspension, a setting device for the head angle and a bicycle drive having six speeds with a transmission unit with a planetary drive on the 14-inch rear wheel, the bicycle being ridden by a 2.0 m tall person.

FIG. 1 shows the side view of a first preferred embodiment of the bicycle with a two-sided rear suspension, a setting device for the head angle and a bicycle drive having six gears with a transmission unit with a planetary gear at the 14-inch rear wheel, the bicycle being ridden by a 2.0 m tall person.

The bicycle exhibits a frame, containing a front frame part 1, a rear frame part 2, and a folding hinge 3. According to DE 10 2011 053 733 B4, the frame is made from an extruded profile having three segments 1a, 1b, 1c and/or 2a, 2b, 2c, the outer segments 2a and 2c serving as chainstays.

Into the outer segments 1a and 1c of the front frame part 1, ends 4 are inserted that rotatably mount a head tube 6 via an axle 5. A fork stem of a fork crown 7 is supported in the head tube 6. Fork blades 8 are connected to the fork crown 7 and again receives fork ends 9 to which a front wheel 10 of the bicycle is fastened. Above the head tube 6, the bicycle exhibits a folding hinge 11, a lower hinge element 12 of the folding hinge being connected to the fork stem by means of a clamping connection 13. An upper hinge element is formed into a lower steering tube 14, an upper steering tube 15 being arranged so as to be displaced linearly in the lower steering tube 14. According to a particular feature of the invention, the height of a handlebar 16 can be adapted in this way to the height of the cyclist. The upper steering tube 15 is firmly connected to the handlebar 16.

A bottom bracket 17 is rotatably arranged in the rear frame part 2. The bottom bracket 17 is connected to a triple chainwheel 18 and to cranks 19. Foldable pedals 20 are connected to the cranks 19. The triple chainwheel 18 drives a rear-wheel shaft 23 via a chain 21 and an output sprocket 22. A rear wheel 24, in this exemplary embodiment a 14-inch pneumatic-tire wheel, is arranged on the rear-wheel shaft 23, seen from the right chainstay of the rear frame part 2, opposite the output sprocket 22 between the two chainstays.

In proven manner, the three chainwheels of the triple chainwheel 18 are switched by means of a front derailleur 25. The chain tension of the slack side of the chain 21 is maintained, likewise in proven manner, by means of a swinging chain-guide 26.

According to a feature of the invention, the bicycle is ridden by the cyclist while standing up. The upright cycling enables the cyclist to use his entire weight for the propulsion and to assume a riding position that relaxes the back. According to a feature of the invention, the cyclist's torso 27 is arranged so close to the handlebar 16 that the upright cyclist can clasp around the handlebar 16 and at the same time can establish a contact between his torso 27 and his elbow 28 and/or his lower arm 29 and/or his wrist 30 and/or his hand 31 and/or the handlebar 16. Here, the handlebar 16 has been pulled upward out of the steering tube 14 such that the upper legs 32 of the cyclist have sufficient space below the handlebar 16.

The closeness of the handlebar 16 to the cyclist's torso 27 exhibits the described advantages concerning safe cycling while standing up.

According to a feature of the invention, the center of the handlebar is arranged directly in front of the cyclist's torso 27. This has the advantage that during braking, the cyclist can brace his inertia against the handlebar 16 with his torso 27.

According to a feature of the invention front center and handlebar height are selected such that the brake decelerations of the front-wheel brake required according to the standard do not lead to the cyclist falling forward over the front wheel. The cyclist rather remains in control of the bicycle even if in case of normalized front wheel decelerations.

According to a feature of the invention the closeness of the handlebar 16 to the cyclist's torso 27 can be set by means of a setting device 33, that sets the head angle. In FIG. 1, the bicycle is ridden by a 2.0 m tall person. Here, a head angle that conforms to the standard of 75° is set.

According to a feature of the invention, the chainstay length, as illustrated in FIG. 1, amounts to at most 22 cm with the advantages already described above relating to safe cycling while standing up.

According to a feature of the invention, the crank length of the crank 19 for cycling while standing up is chosen shorter than the conventional crank length of 165-175 mm of 26/28-inch bicycles, that are driven while sitting.

In this case, the commercially available triple chainwheel 18 with the crank 19 having a crank length of 150 mm is used. The shorter crank length has the following advantages that are essential to the invention:

- Because the cyclist, when cycling while standing up, must repeatedly lift his own weight upward to the pressure point onto the pedals 20, so as to drive the driving chainwheel 18, the difference in height to be overcome and thus the cyclist's effort for each crank revolution is smaller in the case of a shorter crank.
- Due to the shorter crank, the driving torque transmitted by the weight of the cyclist onto the driving chainwheel 18 is smaller than for cranks having 165-175 mm. As a result, the maximum angular acceleration of the crank is likewise smaller and the foot of the cyclist takes longer to get to the low point of the pedals by bringing to bear the same weight. The angular velocity achieved by the crank at the low point of the pedals is also smaller. This has essential advantages: For cycling while standing up, this results in angular velocities of the crank that fluctuate less strongly during a crank revolution, the cyclist can pedal more uniformly to achieve the same speed, the short crank as whole conveys only a lower pedaling frequency of the cyclist and the energy loss of the cyclist at the low point of the pedals is likewise smaller due to the smaller angular velocity of the crank. For these reasons, a slow pedaling frequency of at most 60 rpm when cycling while standing up is felt to be more comfortable than the pedaling frequencies of 90 rpm that are usually when sitting. To decrease the pedaling frequency for cycling while standing up and to make pedaling more uniform with the same desired speed and thus with the same desired cyclist's effort, according to a feature of the invention a shorter crank is used than when cycling while sitting.

A conventional side-pull caliper brake 34 is arranged on the fork crown 7. To decelerate the rear wheel 24, according to a feature of the invention a side-pull caliper brake 35 is arranged on the lower frame side of the rear frame part 2, according to a feature of the invention the slack side of the chain 21 being guided by the swinging chain-guide 26 in each switching position so far below the side-pull caliper brake 35, that the brake arms of the side-pull caliper brake 35 do not touch the chain 21.

The arrangement, too, of a kickstand 36 can be carried out as shown.

Figure 2:
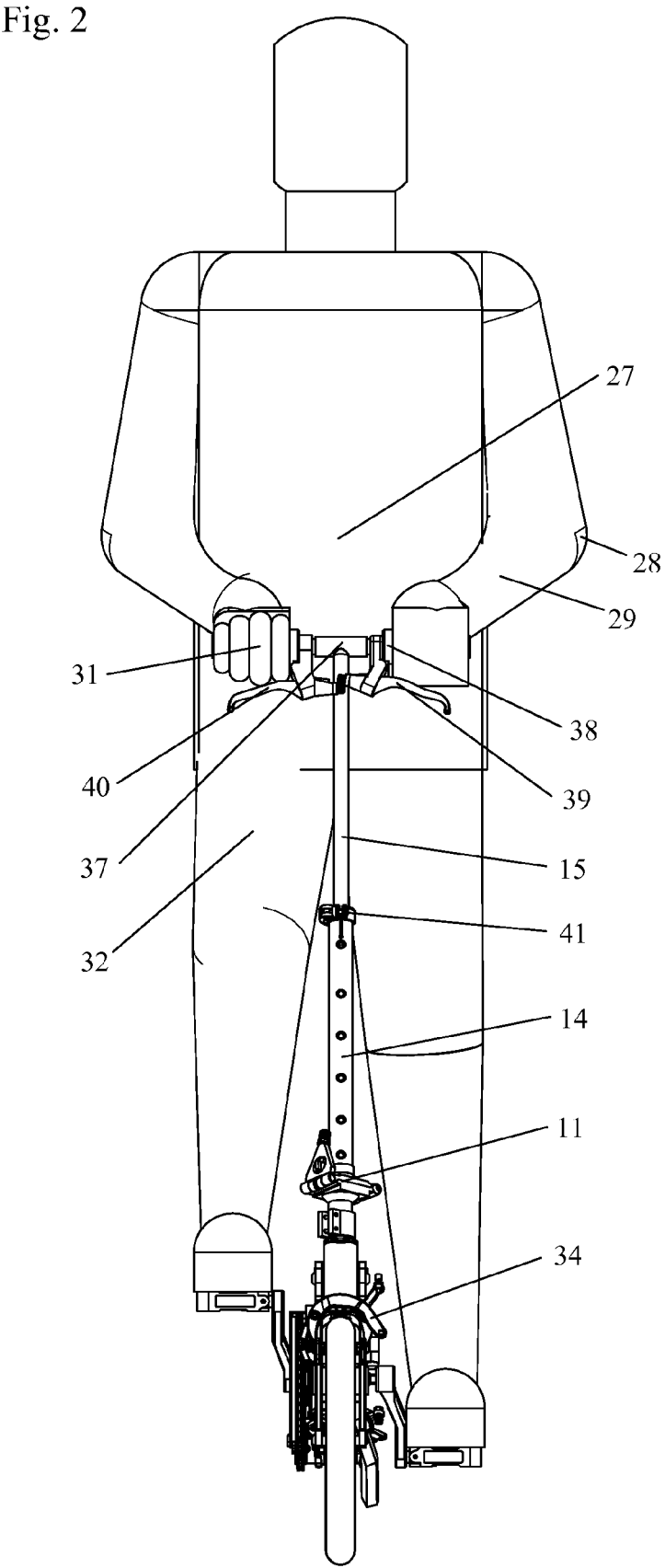
FIG. 2 shows the front view of the bicycle with the cyclist from FIG. 1

FIG. 2 shows the front wheel of the bicycle with the cyclist from FIG. 1. A steering-tube head 37 is arranged directly in front of the cyclist's torso 27. Grip shifters 38 are connected to the handlebar 16 on both sides of the steering-tube head 37 that switch, via Bowden cables not shown separately, on the one hand the front derailleur 25 and thus the triple chainwheel 18 and on the other hand any other transmission steps such as the two-speed transmission unit at the rear wheel 24 that is used in this exemplary embodiment and is described in detail in DE 10 2011 050 447 B4.

Furthermore two brake levers 39 and 40 are connected to the handlebar 16, that actuate, by means of Bowden cables not illustrated separately, the two side-pull caliper brakes 34 and 35.

According to a feature of the invention, two different brake levers 39 and 40 are used, hence it is still possible to guide the cables despite the brake levers being very close together, because the cable setting screws of the two brake levers 39 and 40 are positioned at a different distance from the axis of the handlebar 16 and thus come to rest one on top of the other, so that the Bowden cables can be guided adjacent to each other.

The length of the steering-tube sections 14 and 15 that can be displaced linearly relative to each other is established by means of proven locking devices 41.

Figure 3:
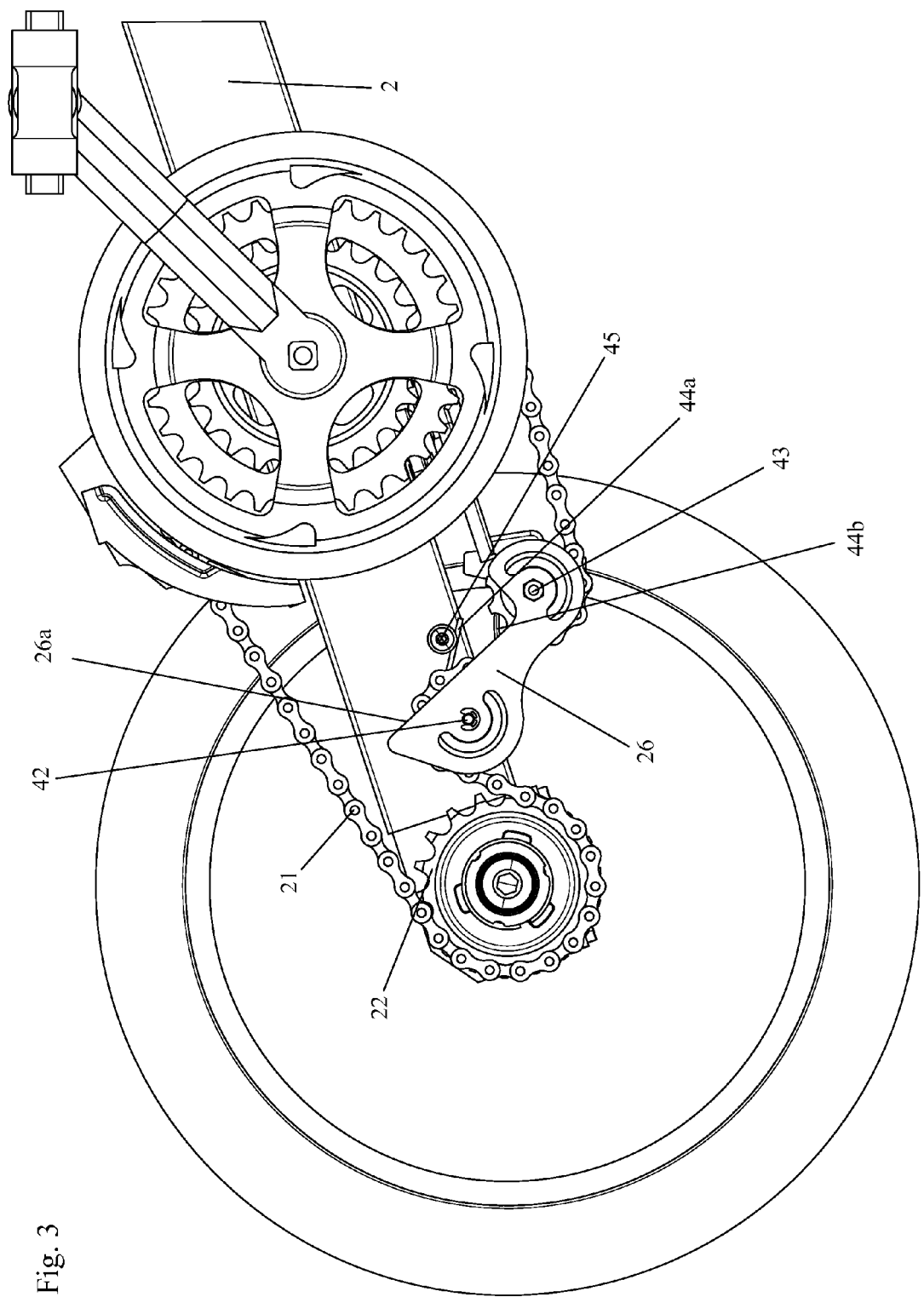
FIG. 3 shows in an enlarged illustration the rear part of the bicycle from FIG. 1 in the side view, the biggest chainwheel being switched.

FIG. 3 shows in an enlarged illustration the rear part of the bicycle from FIG. 1 in the side view, the large chainwheel of the triple chainwheel 18 being switched. The swinging chain-guide 26 includes an upper jockey roller 42 that is fastened to the rear frame part 2 such that it can rotate around its axis, and an idler roller 43 that is pressed toward the rear in the direction of the output sprocket 22 by a helical spring 44. Here the helical spring 44 is braced by its one arm 44a against a screw 45 connected to the rear frame part 2, and presses with its other arm 44b the jockey roller 43 of the swinging chain-guide 26 in the direction of the output sprocket 22. To prevent a chain collision between the chain 21 guided around the idler roller and the chain 21 guided around the output sprocket 22, according to a feature of the invention the swinging chain-guide 26 exhibits a straight edge 26a that limits the rotation of the swinging chain-guide 26 toward the rear by abutting against the screw 45 prior to the idler roller 43 contacting the output sprocket 22.

Figure 4:
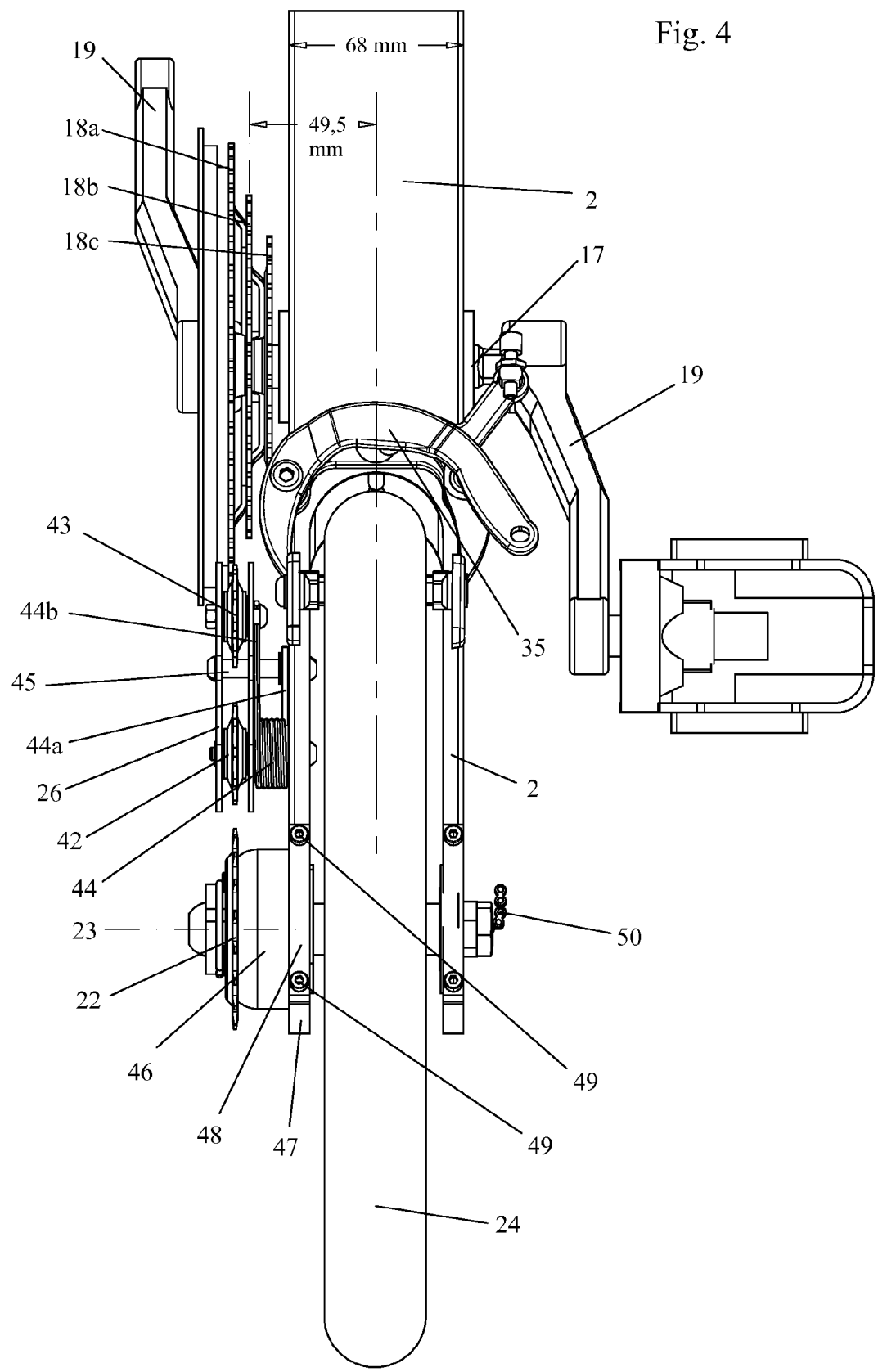
FIG. 4 shows the view of the rear part of the bicycle from FIG. 1 from below.

FIG. 4 shows the view of the rear part of the bicycle from FIG. 1 from below.

To achieve an appropriate development using the 14-inch rear wheel 24, according to a feature of the invention a planetary drive 46 having two gears, illustrated in detail in DE 10 2011 050 447 B4, is arranged between the output sprocket 22 and the rear-wheel shaft 23 with a stationary ring gear that is directly or indirectly connected to the bicycle frame, a planet carrier, driven by the output sprocket 22, with planet gears that mesh with the ring gear, and with two driven sun gears that mesh with the planet gears. In each case one of the sun gears drives the rear-wheel shaft 23 by means of a coupling member or via a switchable free wheel clutch that is inserted in-between. To achieve a development that is adapted to the cyclist's weight and to the different upward- and downward-slope conditions, according to a feature of the invention a chain transmission having the triple chainwheel 18, containing a chainwheel 18a having 42 teeth, a chainwheel 18b having 32 teeth, and a chainwheel 18c having 24 teeth, and the output sprocket 22, is arranged upstream of the planetary gear. In a combination with the two-speed planetary gear 46, according to a feature of the invention a six-speed transmission is achieved with even gear increases for the bicycle. The rear-wheel drive with the planetary gear 46 is connected to the rear frame part 2 in ends 47 of the rear frame part 2 via fastening means 48 and fastening screws 49. A shifting chain 50 that exits the rear-wheel drive switches the two gears that are present in the planetary gear 46.

The two rollers of the swinging chain-guide 26, the jockey roller 42, and the idler roller 43 are arranged at a fixed distance relative to the central reference plane of the bicycle, because the chain transmission does not feature several switchable output sprockets, but only the one output sprocket 22. Because the slack side of the chain 21 is shortest when the large chainwheel 18a of the triple chainwheel 18 is switched, the output sprocket 22, the large chainwheel 18a, the jockey roller 42, and the idler roller 43 are arranged in an almost straight line, thus avoiding a chain skew in this switching state. In this exemplary embodiment, as illustrated in FIG. 4, a conventional chain line distance of 49.5 mm is realized.

The helical spring 44 arranged about the same axis as the jockey roller 42 is braced with its one arm 44a against the screw 45 and with its other arm 44b presses the idler roller 43 in the direction of the output sprocket 22.

According to a feature of the invention, the rear frame part 2 exhibits, as illustrated in FIG. 4, a width corresponding to the dimension of commercially available bottom brackets, in this exemplary embodiment a width of 68 mm. In a correspondingly simple manner, also a bottom-bracket housing and a bottom bracket 17 can thus be arranged in the rear frame part 2.

According to a feature of the invention, the side-pull caliper brake 35 is arranged between the cranks 19 and, according to a further feature of the invention, is arranged so close to the bottom bracket 17 that the short chainstay lengths that have been mentioned can be realized.

Figure 5:
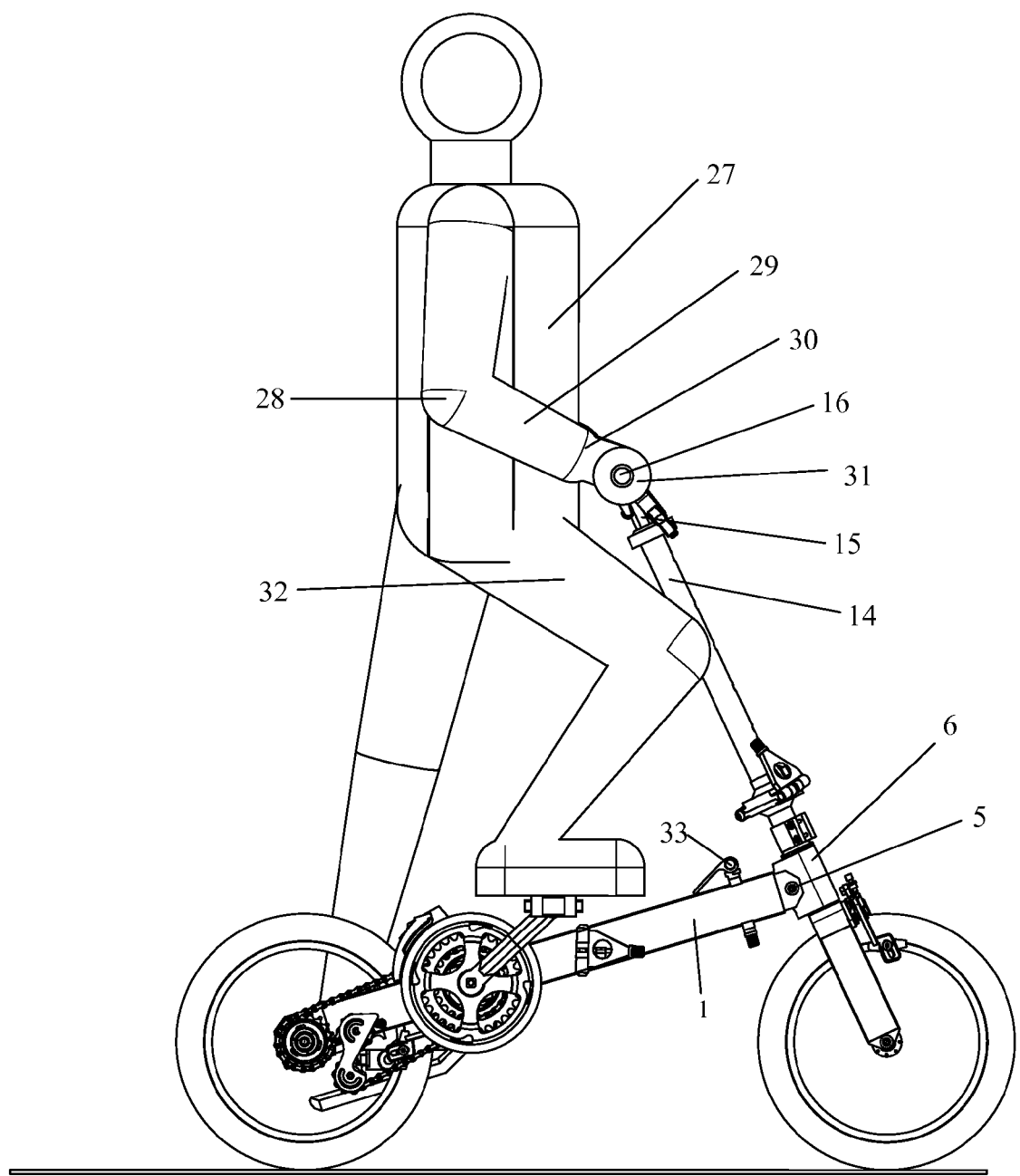
FIG. 5 shows the bicycle from FIG. 1 in the side view, the head angle amounting to approximately 65° and the bicycle being ridden by a 1.4 m tall person.

FIG. 5 illustrates the bicycle from FIG. 1 in the side view. The handlebar 16 is set to its lowest height. Using the setting device 33 for the head angle, a standard-conforming head angle of approximately 65° is set. In this way, according to a feature of the invention the bicycle from FIG. 1, as shown in FIG. 5, while maintaining the advantageous cycling characteristics already mentioned, can be ridden both by 2.0 m tall person and also by a 1.4 m tall person. Or more generally, according to a feature of the invention, the bicycle can be ridden in equal measure by persons having a difference in body height of 60 cm. By using the setting device 33 for the head angle also the considerably shorter cyclist can grasp around the handlebar 16 and at the same time can establish contact between his torso 27 and his elbow 28 and/or his lower arm 29 and/or his wrist 30 and/or his hand 31 and/or the handlebar 16.

Furthermore FIG. 5 shows the switching state when switching the small chainwheel 18*c*.

Figure 6:
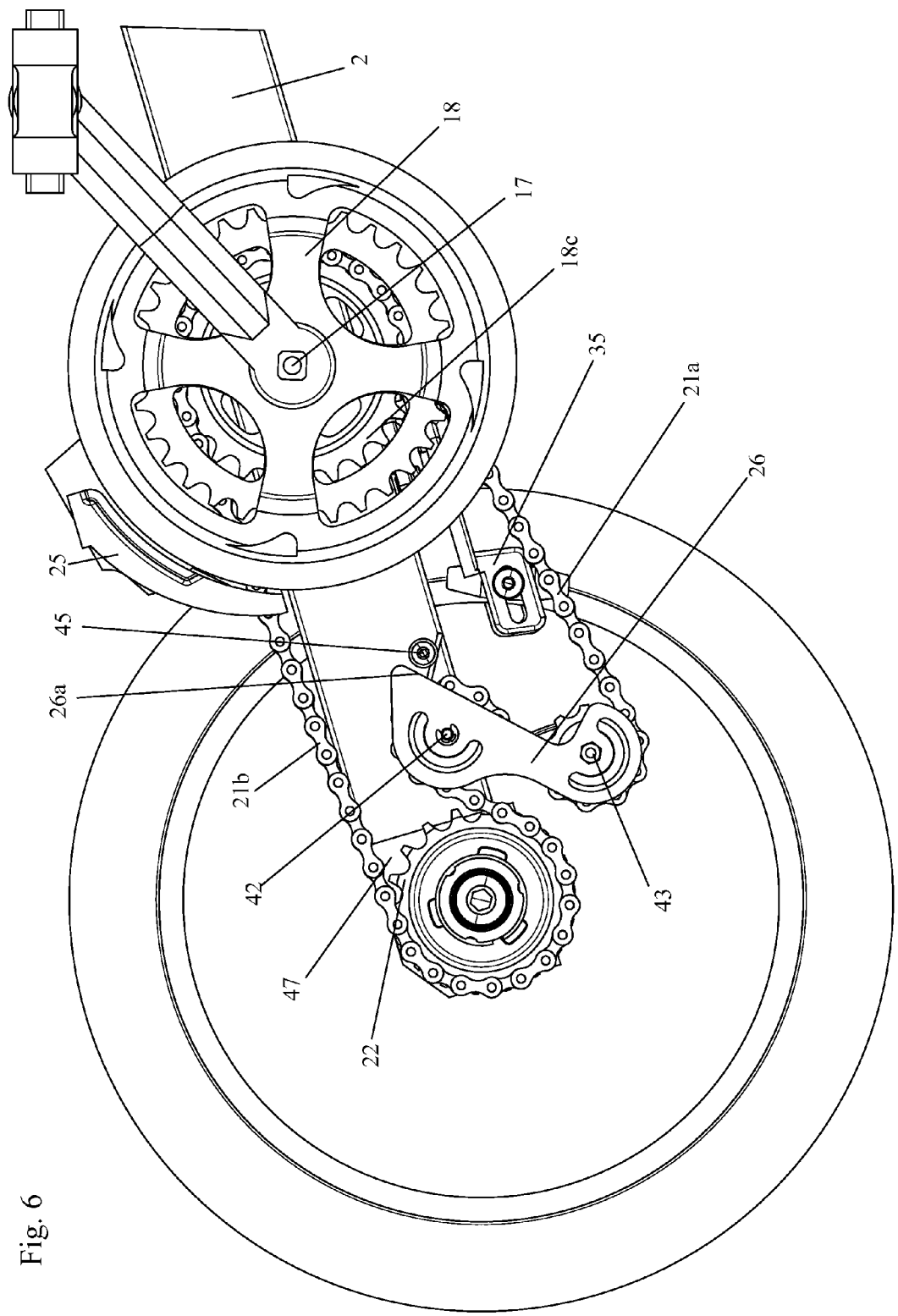
FIG. 6 shows in an enlarged illustration the rear part of the bicycle from FIG. 1 in the side view, the smallest chainwheel being switched.

FIG. 6 shows in an enlarged illustration the rear part of the bicycle from FIG. 5 in the side view, the small chainwheel 18*c* being switched. It emerges from the illustration that the straight edge 26*a* of the swinging chain-guide 26 would be pressed against the screw 45 prior to the idler roller 43 colliding with the output sprocket 22. In this switching state, too, the slack side 21*a* of the chain 21 is safely guided below the brake arm of the side-pull caliper brake 35. The side-pull caliper brake 35 is arranged so close to the bottom bracket 17 that, seen laterally, it is largely concealed by the triple chainwheel 18.

In this switching state, too, the tight side 21*b* of the chain 21 maintains sufficient distance from the front derailleur 25. The front derailleur 25 in turn is arranged above the upper side of the rear frame part 2 and thereby in the direction of the central reference plane of the bicycle has the space requisite for switching the small chainwheel 18*c*.

Figure 7:
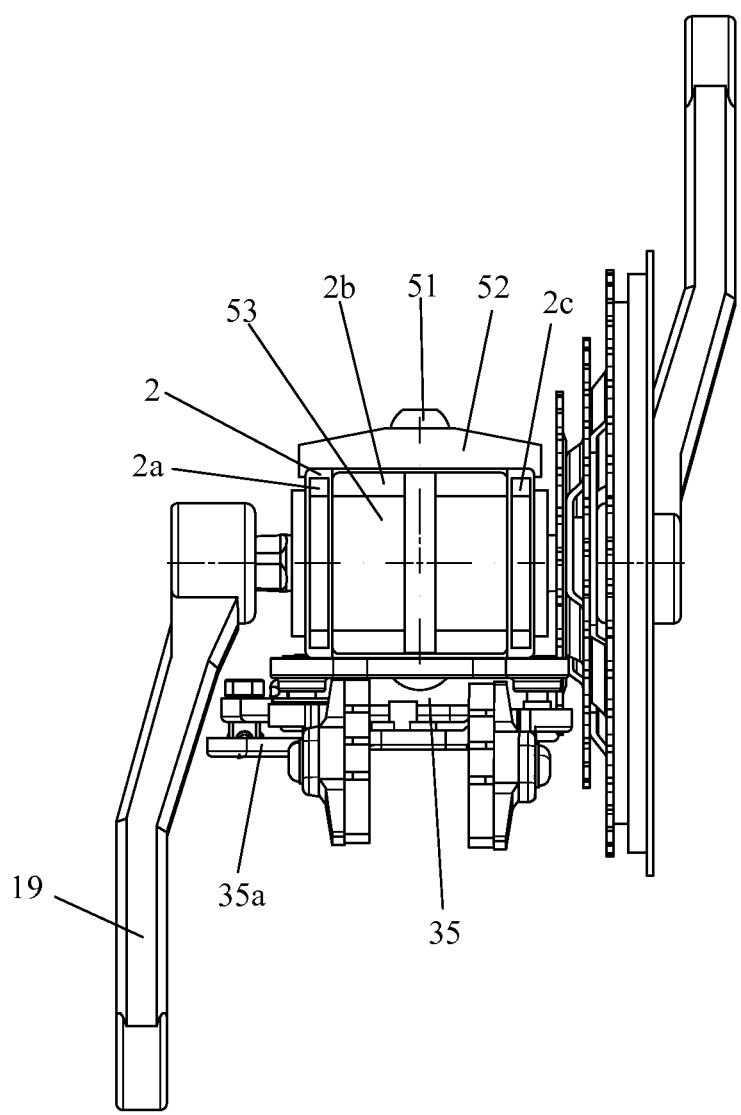
FIG. 7 shows the triple chainwheel of the bicycle from FIG. 1 with the cranks, the bottom bracket and the side-pull caliper brake for the rear wheel, to illustrate the space available for the side-pull caliper brake.

FIG. 7 shows the triple chainwheel 18 of the bicycle from FIG. 1 with the cranks 19, the bottom bracket 17 and the side-pull caliper brake 35 for the rear wheel 24, to illustrate the available space for the side-pull caliper brake 35 with its brake arms 35*a*. A nut 51 with a long thread is screwed together with the fastening screw of the side-pull caliper brake 35. For supporting the brake forces, a pressure piece 52 is tensioned against the rear frame part 2 by means of the fastening screw 51.

According to a feature of the invention, a bottom-bracket housing 53 is firmly connected to the walls of the two segments 2*a* and 2*c* of the rear frame part 2.

Figure 8:
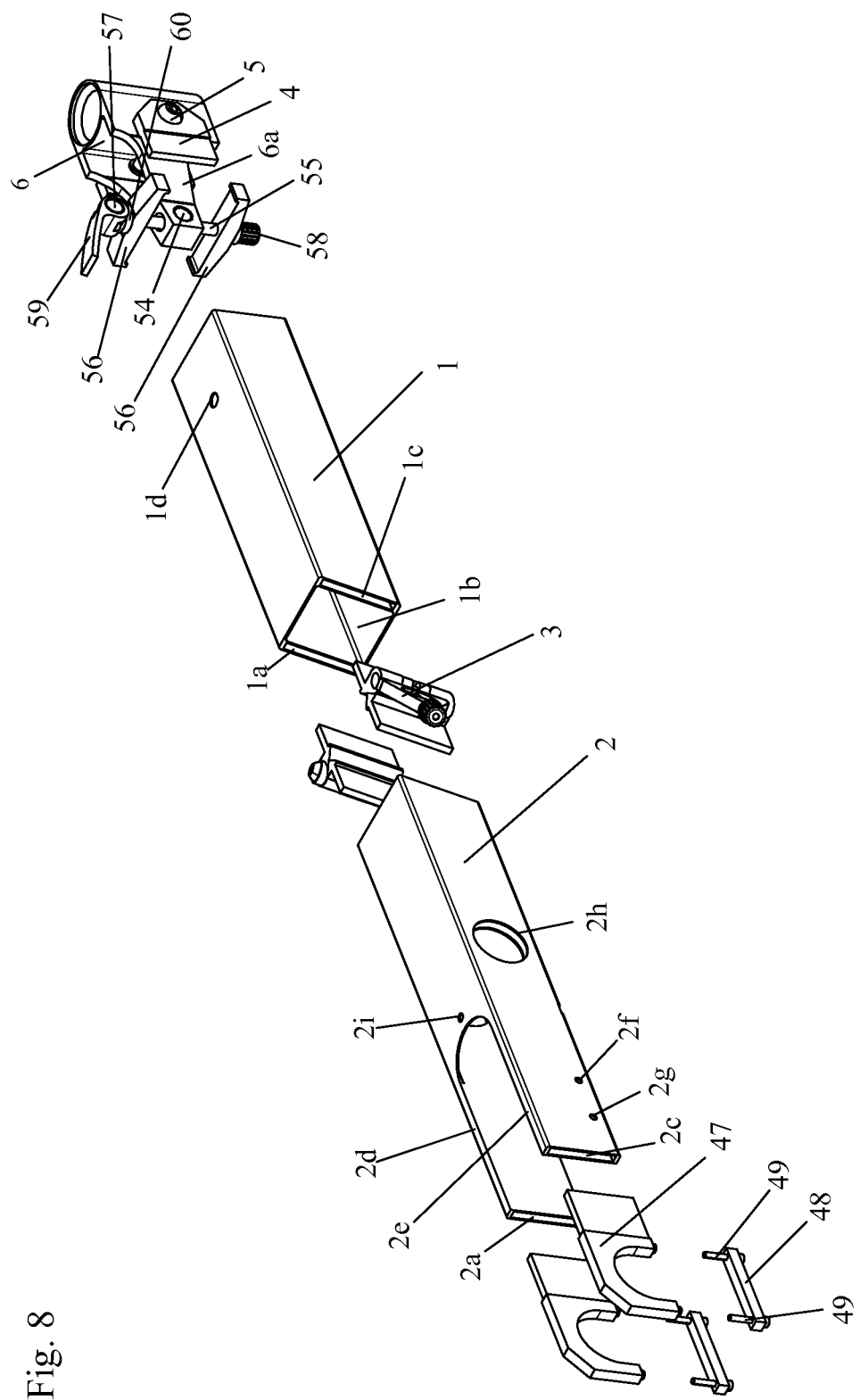
FIG. 8 shows in the exploded view the frame of the bicycle from FIG. 1, that exhibits an extruded profile, with the head tube, the front frame part, the folding hinge, the rear frame part and the ends for the rear wheel.

FIG. 8 shows in the exploded view the frame of the bicycle from FIG. 1 that according to a feature of the invention exhibits an extruded profile according to DE 10 2011 053 733 B4, with the head tube 6, the front frame part 1, the folding hinge 3, the rear frame part 2 and the ends 47 for the rear wheel 24. According to a feature of the invention, the hinge elements of the folding hinges 3 designed according to the DE 10 201 052 134 B4 are inserted into the two outer segments 1*a* and 1*c* of the front frame part 1 and into the corresponding segments 2*a* and 2*c* of the rear frame part 2 and firmly connected to these.

In the area of the rear wheel 24, the inner segment 2*b* of the extruded profile is removed so that two chainstays 2*d* and 2*e* formed by the two outer segments 2*a* and 2*c* remain. In this exemplary embodiment, the two ends 47 are pushed into the chainstays 2*d* or 2*e* and firmly connected to these. The rear-wheel drive is connected to the ends 47 of the rear frame part 2 by means of the fastening means 48 and the fastening screws 49. The rear frame part 2 exhibits diverse recesses 2*f*, 2*g*, 2*h* and 2*i* for fastening the components mentioned to the rear frame part 2. Also the variants described in DE 10 2011 053 733 B4 or in DE 10 2011 050 447 B4 for the frame or for the planetary gear 46 having a one-sided rear suspension can be used in this exemplary embodiment and are comprised by the invention.

According to a feature of the invention, the head angle of the head tube 6 can be set by means of the setting device 33. The setting device 33 preferably sets the head angle inside the available standard range of 65° to 75°. According to further features of the invention, setting the head angle takes place as described below:

In the front frame part 1, from the front the ends are pushed into the segments 1*a* and 1*c* of the front frame part 1 and firmly connected to these. In the ends 4, the head tube 6 is rotatably mounted via the axle 5. It is likewise possible and comprised by the invention that the head tube 6 is rotatably connected without further ends directly to the two outer segments 1*a* and 1*c*. The head tube 6 exhibits two arms 6*a* that extend inside the front frame part 1. The two arms 6 are guided toward each other inside the frame part 1 and accommodate a round nut 54 in a recess.

According to a feature of the invention, the round nut 45 exhibits a threaded connection to a setting screw 55. The setting screw 55 projects over the upper side and below the lower side of the front frame part 1. On the upper side on the lower side of the front frame part 1, the setting screw 55 guides fastening elements 56, fastening plates in the case of FIG. 8, that are braced on the upper side or on the lower side of the front frame part 1. According to a feature of the invention, damping or springy elements can be provided between the fastening elements 56 and the front frame part 1 so that any desired mobility of the steering tube 14 is made possible or to reduce forces acting on the setting screw 55 or on the round nut 54. According to a feature of the invention, the setting screw 55 is part of a commercially available quick-release device, consisting of the setting screw 55, a round nut 57, a lock nut 58, a locking lever 59 and a washer 60, the two fastening elements 56 being tensioned against the front frame part 1.

Figure 9:
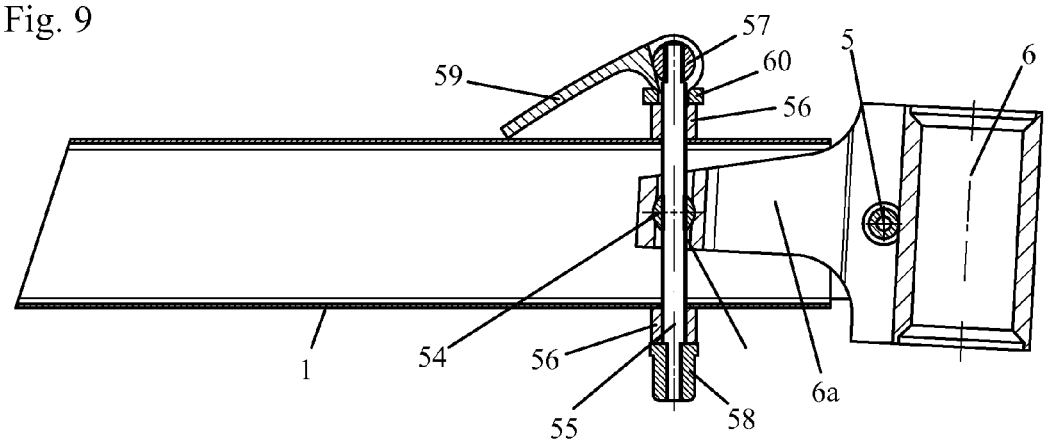
FIG. 9 shows in the sectional view the setting mechanism for the head tube, the head angle of 75° according to FIG. 1 being set in FIG. 9.

In the tensioned state, i.e. in the case of a closed locking lever 59 of the quick-release device, the position of the arm 68 and thus the head angle is established by the position of the round nut 54 on the setting screw 55. FIG. 9 shows this state, the head angle of 75° shown in FIG. 1 being set.

Figure 10:
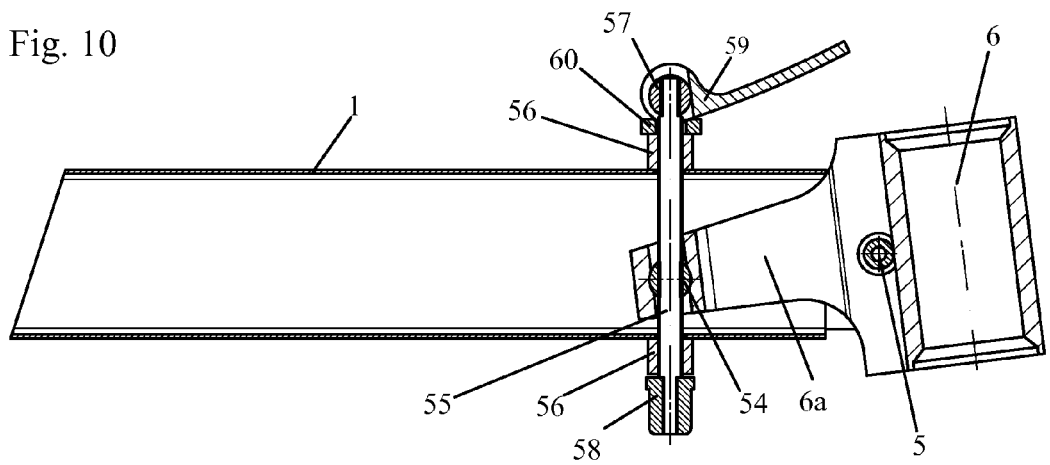
FIG. 10 shows in the sectional view the setting mechanism for the head tube, the head angle of 65° according to FIG. 5 being set in FIG. 10.

FIG. 10 shows the released state. In the released state, i.e. in the case of the open locking lever 59, the setting screw 55 can be rotated by rotating the locking lever 59, thus changing the position of the round nut 54 on the setting screw 55. According to a feature of the invention, this change in position changes the angle between the arm 6*a* and the front frame part 1 and the head tube 6 is moved about the axle 5, changing the head angle as a result. In FIG. 10, the head angle of 65° shown in FIG. 5 is set. The position obtained is fixed again by closing the locking lever 59.

An advantage of this arrangement is that the vertical forces acting on the front wheel 10 are transferred onto the front frame part 1 via the axle 5, while the horizontal forces acting on the front wheel 10 seek to trigger a rotary movement of the head tube 6 about the axle 5 and eventually being dissipated positively via the fastening elements 56 onto the front frame part 1. Furthermore, no further bending moments are triggered that require in other embodiments a correspondingly stable design of the connection between the head tube and the front frame part.

The length of the arms 6*a* of the head tube 6 and thus the distance between the axle 5 and the round nut 54 determine the force that is exerted on the round nut 54 and on the front frame part 1. In this way, also the settable angle range of the head tube 6 is established.

Figure 11:
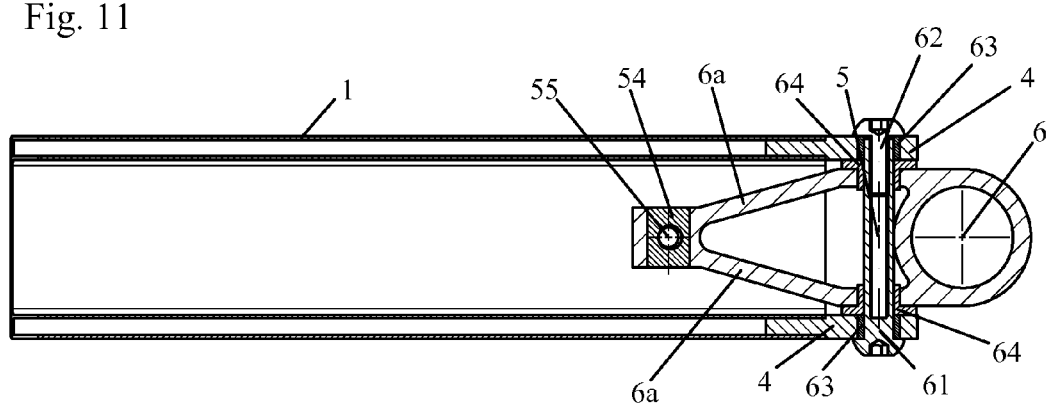
FIG. 11 shows a further sectional view, orthogonal relative to FIG. 9 and FIG. 10, through the setting mechanism for the head tube.

FIG. 11 shows a sectional view of the setting device from above. According to a feature of the invention, the arms 6*a* of the head tube 6 are rotatably mounted on the axle 5 very close to the ends 4, whereby high bending moments on the axle 5 being avoided. According to a feature of the invention, the arms 6*a* are guided toward each other toward the pathway to the round nut 54, therefore the forces that occur now being dissipated to the front frame part 1 by the setting screw 54. The axle 5 is formed by a steel-nut 61 that is screwed together with a steel-screw 62. The steel-screw 61 is braced in steel-bushings 63 and is connected rotatably to these. The bushings 63 in turn are firmly connected to the ends 4 made from aluminum. Also the head tube 6 that is made from aluminum is firmly connected to steel-bushings 64 that again are rotatably mounted on the axle 5 or on the steel-nut 61. What is advantageous about the use of the steel-bushings 63 and 64 is that the transition fit requisite for bearing and for rotating the head tube 6 takes place between two steel elements that withstand considerably higher contact pressures than an aluminum/steel-pairing, while the bushings 63 and 64 can be connected on the outside by means of a fixed fit with the ends 4 made from aluminum or with the head tube 6. The bushing 63 or 64 then in addition exhibit a sufficiently large outer diameter to hold the contact pressures in the aluminum/steel-pairing resulting from the forces that occur below the admissible contact pressures for aluminum.

Figure 12:
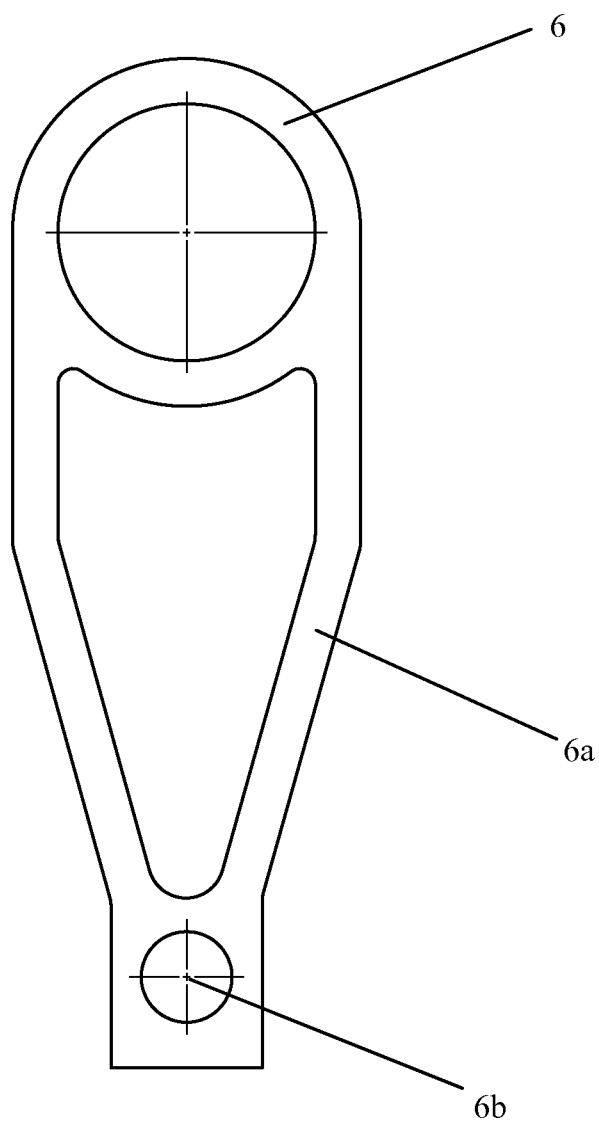
FIG. 12 shows the extruded profile of the head tube.

The integrally manufactured head tube 6 can be manufactured cost-efficiently from an extruded profile. FIG. 12 shows a corresponding profile for the preferred embodiment shown in FIG. 1. Even during the executing of the extruded profile, the requisite recess 6b for the setting screw 55 in the head tube 6 can be provided.

Figure 13:
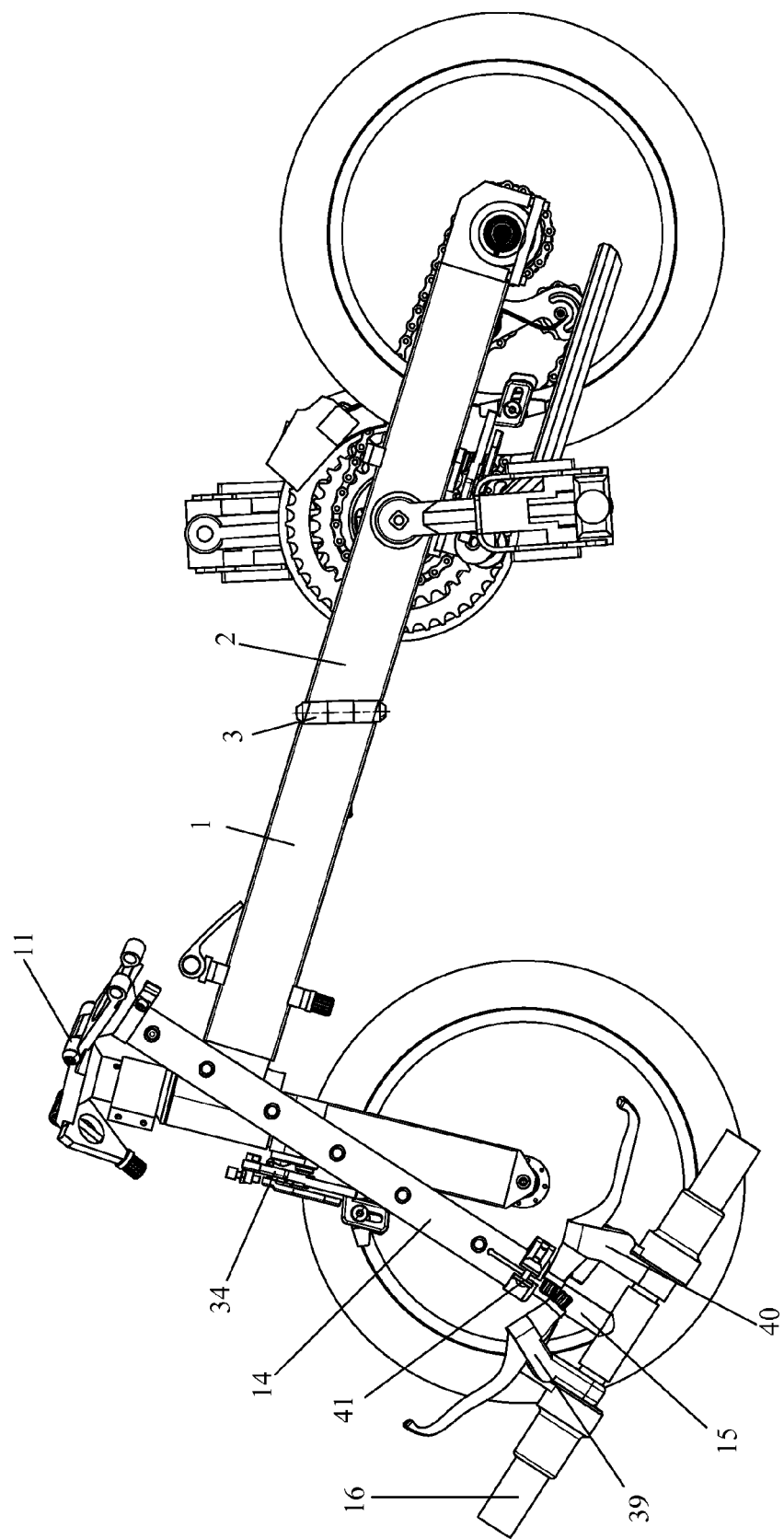
FIG. 13 shows a side view of the bicycle from FIG. 1 with the folded-in handlebar.

FIG. 13 shows a side view of the bicycle from FIG. 1 with a folded-in handlebar 16. According to a feature of the invention, the folding hinge 11 is engineered and oriented such that the steering tube 14, seen laterally, comes to lie between the side-pull caliper brake 34 and the front-wheel axle, the handlebar 16 then being positioned largely parallel or at an angle of at most 10° relative to the central reference plane of the bicycle.

Figure 14:
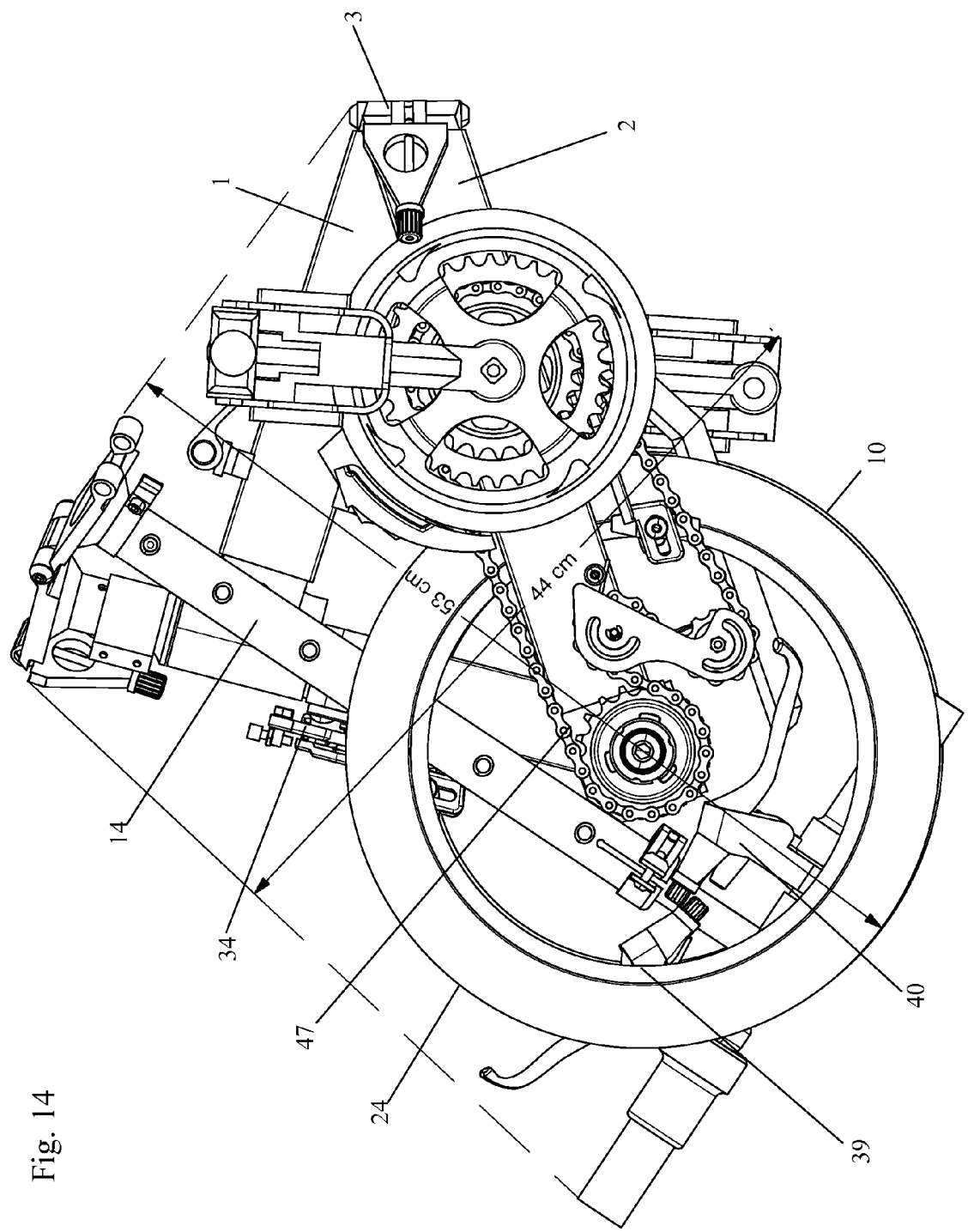
FIG. 14 shows a side view of the folded bicycle from FIG. 1.

FIG. 14 shows a side view of the folded bicycle from FIG. 1. In the folded state, according to a feature of the invention the front wheel 10 and the rear wheel 24, seen laterally, are placed behind each other largely congruently. Here, the steering tube 14 uses the space that is available according to a feature of the invention precisely between the side-pull caliper brake 34 of the front wheel 10 and the rear ends 47 respectively the output sprocket 22. The two longest folding lengths of the folding size in this exemplary embodiment amount to at most 53 cm and at most 44 cm. According to a feature of the invention, the sum of these two folding lengths thus comprises at most 100 cm. This small folding size is achieved because according to a feature of the invention the steering tube 14 is folded to the side of the fork blades 8 of the front-wheel fork by the folding hinge 11 and because according to a feature of the invention the front frame part 1, the rear frame part 2, and the fork blades 8 of the front-wheel fork in the folded state of the bicycle describe a triangle, the front-wheel axle respectively the rear-wheel axle, the folding hinge 3 and the head tube 6 forming the corner elements of the triangle.

Figure 15:
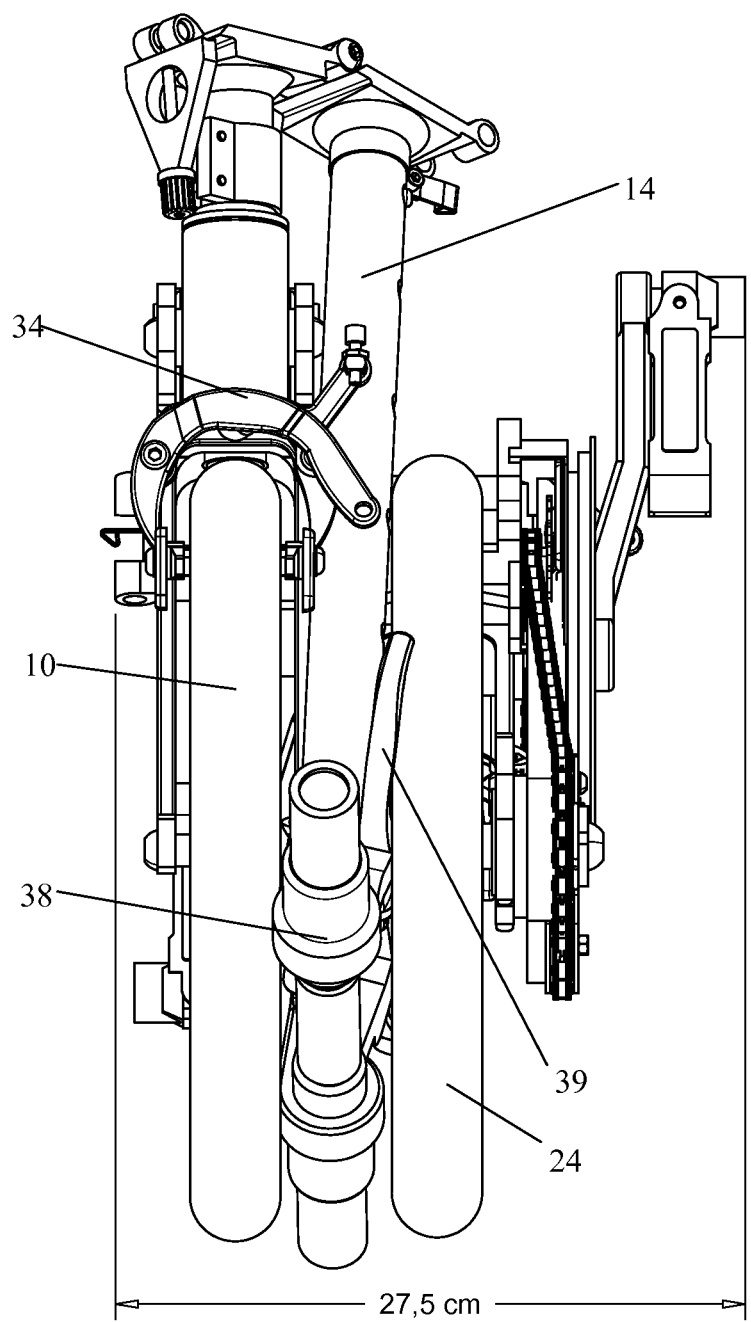
FIG. 15 shows the front view of the folded bicycle from FIG. 1.

FIG. 15 shows the front view of the folded bicycle from FIG. 1.

Figure 16:
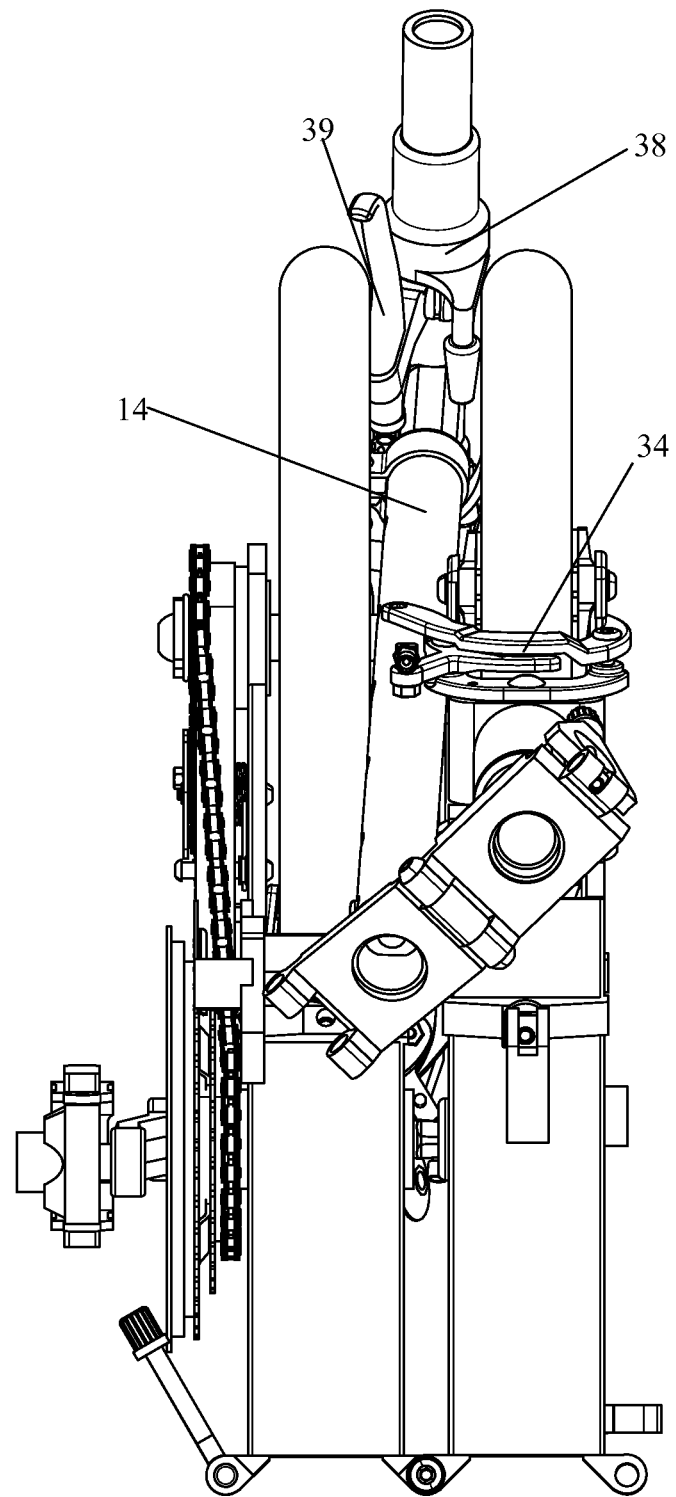
FIG. 16 shows the top view onto the folded bicycle from FIG. 1

By using the side-pull caliper brakes 34 and 35, a defined minimum distance between the front wheel 10 and the rear wheel 24 is to be maintained in the folded state. According to a feature of the invention, the space arising thereby between the front wheel 10 and the rear wheel 24 is filled in that the steering tube 14 and the handlebar 16 are arranged between the front wheel 10 and the rear wheel 24. Likewise the brake levers 39 and 40 and the grip shifters 38 find the required space, as is documented also in FIG. 16 that illustrates the top view onto the folded bicycle from FIG. 1.

For these reasons, the depth of the folding size thus amounts to less than 28 cm. Thus according to a feature of the invention, the sum of the length, the height, and the width of the folding size amounts to at most 125 cm.

According to a feature of the invention, in this exemplary embodiment illustrated in FIGS. 1 to 16, notwithstanding the small folding sizes that can be achieved, many commercially available bicycle components that are easy to source are used, in particular the wheel rims and the wheel tires of the front wheel 10 and the rear wheel 24, the bottom bracket 17, the cranks 19, the foldable pedals 20, the triple chainwheel 18, the output sprocket 22, the front derailleur 25, the steering tubes 14 and 15, the handlebar 16, the side-pull caliper brakes 34 and 35, the grip shifters 38, the brake levers 39 and 40, the setting device 33 and the locking device 41, the idler roller 43 and the jockey roller 42. Using these commercially available bicycle components thus enables cost-effective production on the basis of proven and tested technology.

According to a feature of the invention, the geometrical values of the bicycle are engineered such that a design of the bicycle is realized that complies with standards in every respect, having a head angle of 65° to 75°, a weight distribution of at least 25% on the front wheel 10, a deceleration of the front wheel 10 that is possible in a standard-compliant manner with a braking deceleration of 3.4 m/s2 without falling over toward the front even for the 2.0 m tall and 100 kg heavy cyclist, the ground clearance of the pedals 20 situated in the lowest position and thus the bottom-bracket height, required for a lateral bicycle inclination of 25°, the distance of 100 mm between the pedal axle and the front wheel 10 or the wheel guard of the front wheel 10, and the possibility, by using air tires, of safely crossing 25 mm high and 12 mm beveled laths.

Finally it is appreciated that the preferred embodiment illustrated in FIGS. 1 to 16, while maintaining the essential features can also be engineered for other wheel sizes, in particular for the wheel sizes 12 inch and 10 inch, according to a feature it even being possible to use the same bicycle frame. These embodiments, too, are comprised by the invention.

Figure 17:
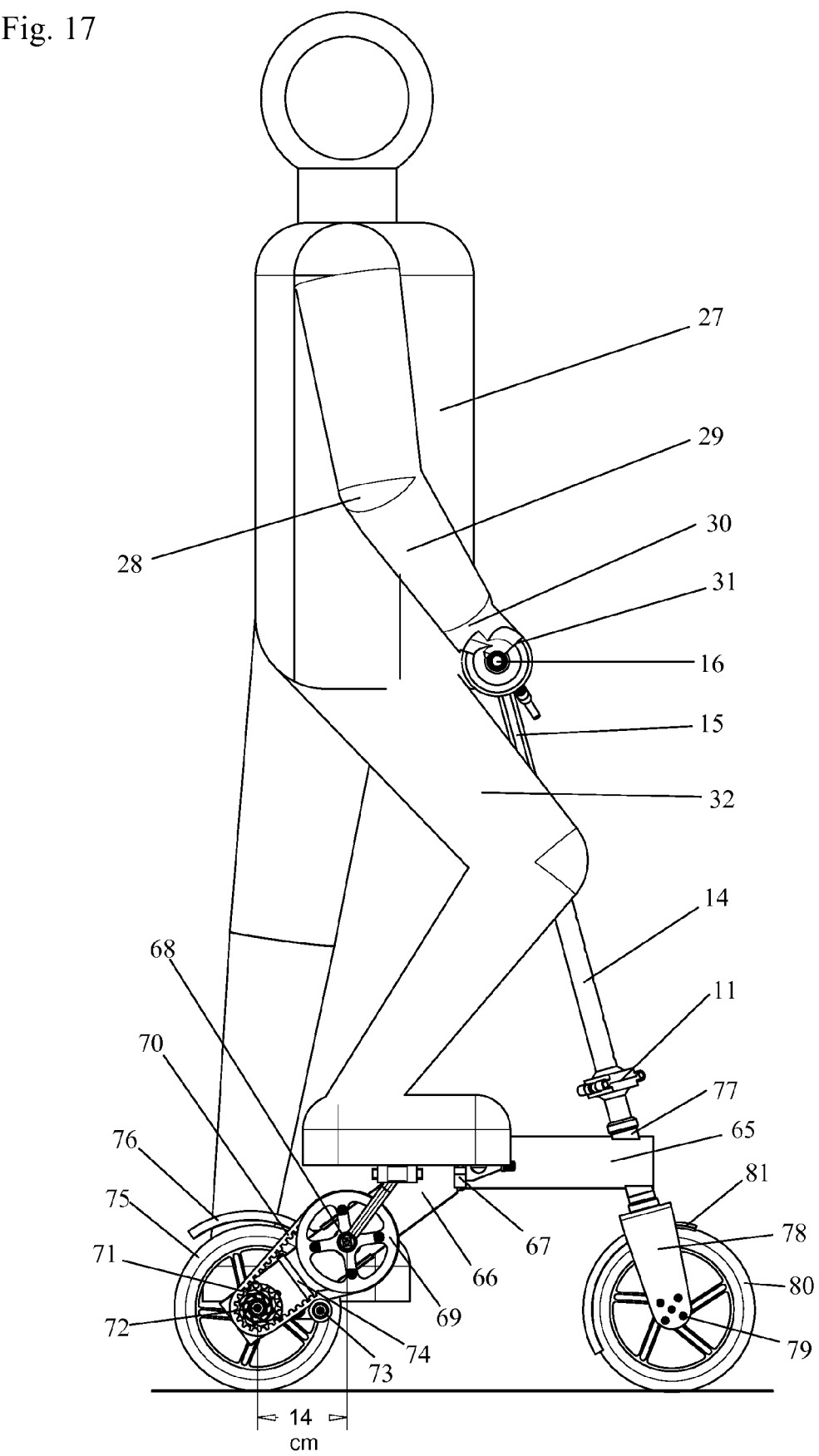
FIG. 17 shows the side view of a second preferred embodiment of the bicycle having a one-sided rear suspension, a belt drive with downstream planetary gear, 10-inch solid-plastic wheels, and a wheel-guard brake, the bicycle being ridden by a 2.0 m tall person.

FIG. 17 shows the side view of a second preferred embodiment of the bicycle with a one-sided rear suspension, a toothed-belt drive with downstream planetary gear that in turn drives a rear-wheel shaft, 10-inch solid-plastic wheels and a wheel-guard brake, the bicycle being ridden by a 2.0 m tall person.

In this exemplary embodiment, too, the handlebar 16 is arranged so close to the cyclist's torso 27 that the 2.0 m tall person cycling upright can place the elbows 28 and also the lower arms 29 and possibly the wrists 30 against his torso 27.

According to a feature of the invention, in the exemplary embodiment in FIG. 17 according to DE 10 2011 053 875 B3 a front frame part 65 and a rear frame part 66 are used that extend parallel to and outside from the central reference plane of the bicycle, the frame parts being manufactured from extruded profiles. The two frame parts 65 and 66 in turn are connected to a folding hinge 67. According to a feature of the invention, in this exemplary embodiment a bottom bracket 68 is connected to a commercially available driving wheel 69 of a toothed-belt drive. The driving wheel 69 of the toothed-belt drive drives, by means of a toothed belt 72, an output wheel 71 of the toothed-belt drive, that drives a rear-wheel shaft 72 using a transmission unit. Reference is again made to DE 10 2011 050 447 B4 for a detailed description of the transmission unit. The requisite belt tension is produced by a belt tightener 73 arranged on the slack side of the toothed belt 70, the belt tightener 73 being pulled in the direction of the tight side of the toothed belt 70 by a guide element 74 connected to the rear frame part 66. A 10-inch solid-plastic wheel as rear wheel 75 is connected in this exemplary embodiment to the rear-wheel shaft 72 on the side of the rear frame part 66 opposite the output wheel 71. According to a feature of the invention, the rear wheel 75 can be decelerated by a wheel guard 76, that is rotatably connected to the bicycle frame. Since the bicycle is ridden while standing, for decelerating the rear wheel 75 the cyclist can press his foot onto the wheel guard 76 arranged rotatably in the frame and can exert a corresponding pressure onto the rear wheel 75 using the wheel guard 76. His inertia presses him against the handlebar 16, which puts him into the position to exert a further force onto the rear wheel 75 by a corresponding body tension counter to this pressure and to decelerate the bicycle safely and rapidly.

According to a feature of the invention, a head tube 77 is connected laterally to the front wheel part 65. For this purpose, according to a feature of the invention, the head tube 77 exhibits two arms that are connected to the front frame part 65 on the upper and the lower side of the front frame part 65. The recesses, forming the arms, of the head tube 77, that is manufactured from an extruded profile, have to be carried out parallel to the extent of the front frame part 65 and can be carried out at any angle to the extrusion direction of the head tube 77. For the purpose of the smallest achievable folding size, in this exemplary embodiment the front frame part 65 runs parallel to the horizontal direction according to a feature of the invention, thus the recesses of the extruded profile, forming the arms of the head tube 77, run at an angle of 75☐ to the extrusion direction of the head tube 77.

According to a further feature of the invention, a front-wheel fork 78 is manufactured from an extruded profile, the extrusion direction of the profile of the front-wheel fork 78 running orthogonally to the extrusion direction of the head tube 77. On the front-wheel fork 78, by means of fastening screws 79, a flange is connected with a front-wheel axle on which a front wheel 80 is rotatably supported. According to a feature of the invention, it is also possible to arrange on the front-wheel fork 78 a front wheel having an electric motor, it being possible to brace the motor torque against the front-wheel fork 78 by means of the fastening screws 79. These embodiments, too, are comprised by the invention.

The front-wheel brake that is used can be a brake, only indicated here, having a brake pad 81 of metal, preferably steel or aluminum, directly acting on the solid-plastic wheel. This brake principle has been known for a long time and is therefore not explained further. The essential point here is that the brake does not require any greater width than the wheel itself, thus achieving the targeted small folding size.

As is remarked in FIG. 17, use of the 10-inch wheel implements a particularly small chainstay length of at most 14 cm. This small chainstay length results in the advantage that even more cyclist's weight is transferred onto the rear wheel 75, thus improving the grip of the rear wheel 75 on the ground surface even when accelerating this small wheel size.

According to a feature of the invention, even in this exemplary embodiment the geometrical values of the bicycle are engineered such that a design of the bicycle is realized that complies with standards in almost every respect, having a head angle of 75°, a deceleration of the front wheel 80 that is possible in a standard-compliant manner with a braking deceleration of 3.4 m/s2 without falling over toward the front even for the 2.0 m tall and 100 kg heavy cyclist, the ground clearance of the pedals 20 situated in the lowest position and thus the bottom-bracket height, required for a lateral bicycle inclination of 25°, the required distance of 100 mm between the pedal axle and the front wheel 80 or a wheel guard of the front wheel 80. Due to the short chainstay, more than 75% of the cyclist's weight rests on the rear wheel 75.

The normative demand on the weight distribution is mainly formulated to prevent the front wheel 80 from lifting off during fast acceleration. Since the bicycle from FIG. 17 is driven while standing, despite the small chainstay and because of the small distance of the handlebar 16 from the cyclist's torso 27 it is insured that the front wheel 80 cannot lift off during acceleration.

Figure 18:
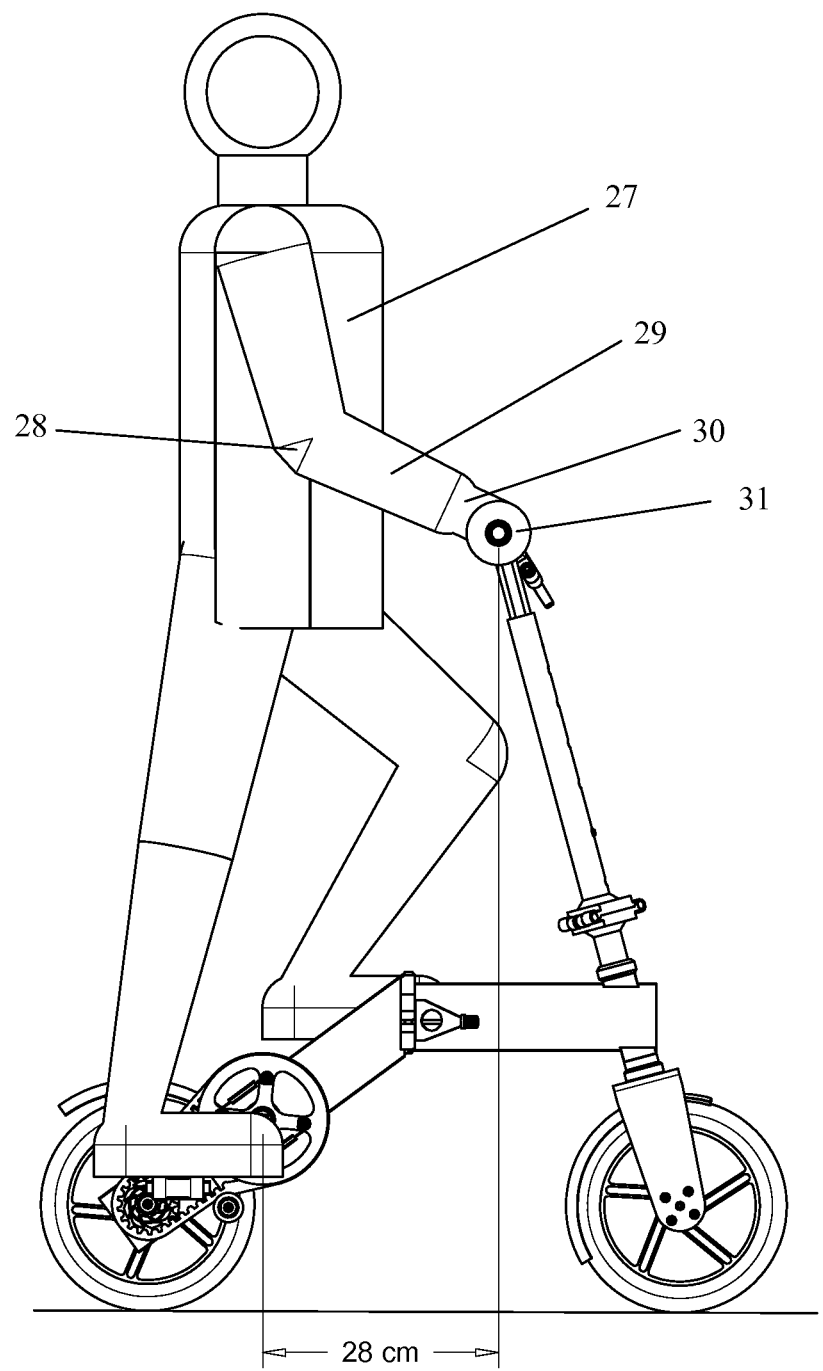
FIG. 18 shows the side view of the bicycle from FIG. 17 with a 1.4 m tall person riding the bicycle.

FIG. 18 shows the side view of the bicycle from FIG. 17 with a 1.4 m tall person that rides the bicycle.

For this purpose, the upper steering tube 15 and the lower steering tube 14 are again telescoped, making the handlebar 16 lower. Due to the setting device for the head angle that is missing in this exemplary embodiment, the handlebar 16 migrates away from the cyclist's torso 27 with reducing height. Anyway, the cyclist shown in FIG. 18 is still able to position his elbows 28 against the torso 27 for cycling stability, to achieve an additional bracing point for the steering movement and for the handlebar guidance. Thus this exemplary embodiment with a constant head angle is equally suitable for cyclists having a difference of at least 60 cm in body height, while maintaining the characterizing features of the invention.

Figure 19:
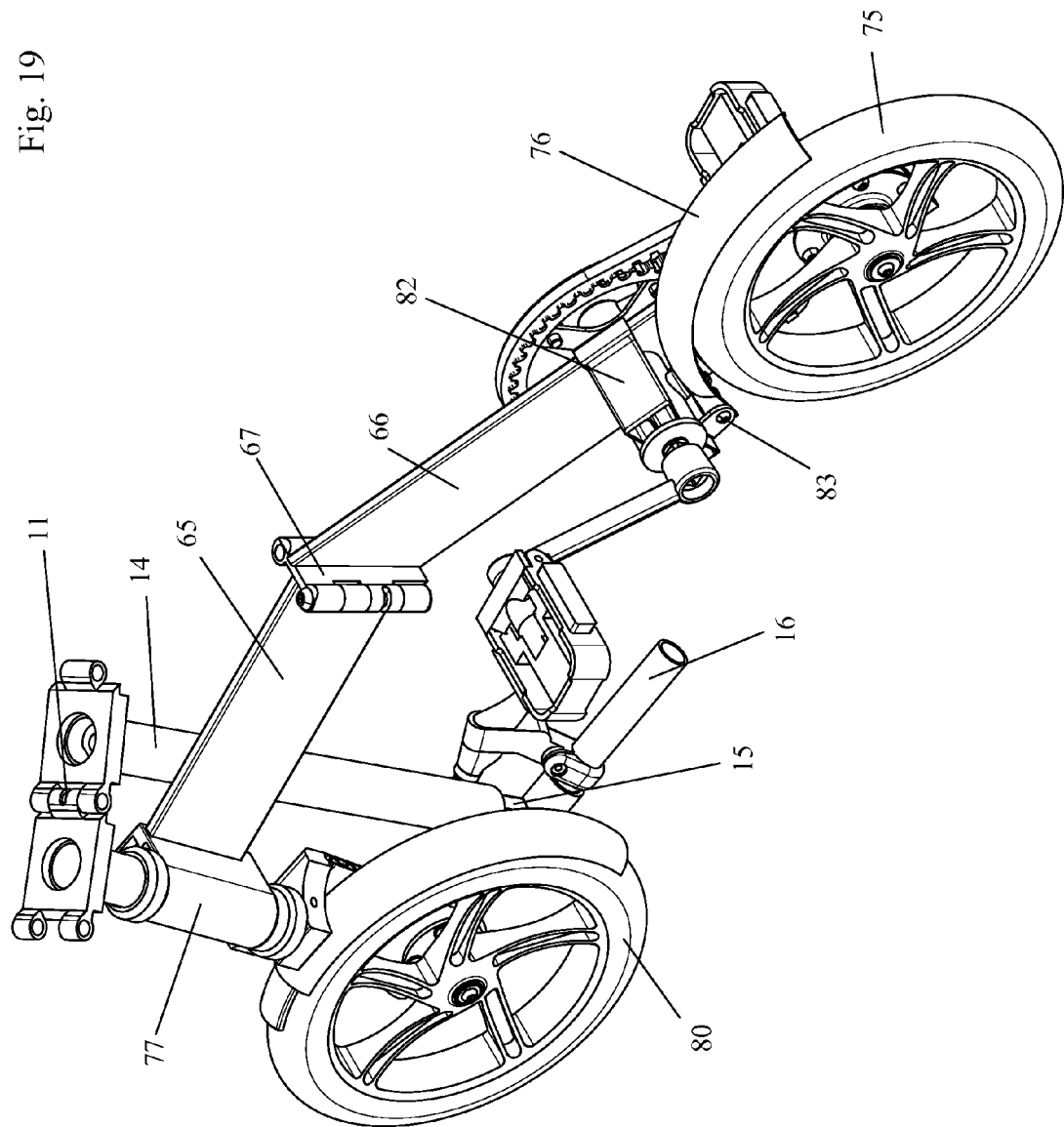
FIG. 19 shows a further view of the bicycle from FIG. 17 with a folded handlebar.

FIG. 19 shows a view of the bicycle from FIG. 17 with a folded-in handlebar.

According to a feature of the invention, the frame parts 65 and 66 run outside the central reference plane of the bicycle. FIG. 19 clarifies that according to a feature of the invention the further essential frame components, i.e. the head tube 77, a bottom-bracket housing 82 and a holder 83 for the rotatable wheel guard 76 are located on one side of the frame parts 65, 66 and are connected to these.

According to a feature of the invention, the steering tubes 14 and 15 and the handlebar 16 are folded downward on the side of the front frame part 65 lying opposite the head tube 77. Instead, the access of rotation of the folding hinge 11 is rotated by about 45° relative to the frame part 65, furthermore the axis of rotation of the folding hinge 11 is not precisely at right angles relative to the head tube axis, so that according to a feature of the invention, the handlebar 16, in the manner shown, again comes to rest largely parallel to the central reference plane of the bicycle.

Figure 20:
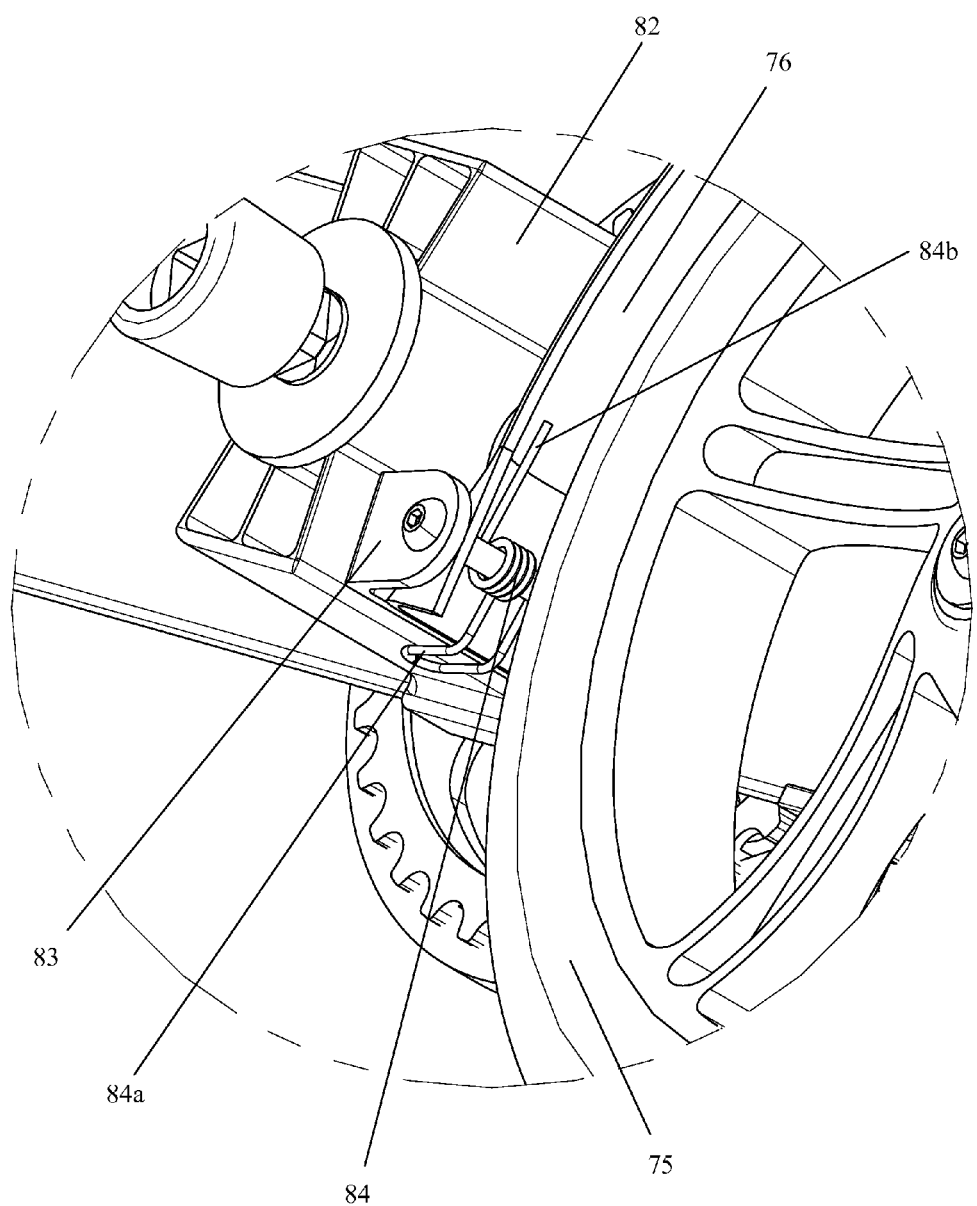
FIG. 20 shows in a detailed view the arrangement of the return spring for the wheel-guard brake.

In a detailed view, FIG. 20 shows the arrangement of a return spring 84 for the wheel guard 76, serving as brake, of the rear wheel 75. The holder 83 of the wheel guard 76 is firmly connected to the bottom-bracket housing 82. The return spring 84 that is braced against the lower side of the bottom-bracket housing 82 by means of its arm 84a and presses the wheel guard 76 toward the bottom-bracket housing 82 with aid of the arm 84b, is attached in the holder 83. According to a feature of the invention, with this design of the bottom-bracket housing 82 and regarding the small space requirement for holder 83, wheel guard 76 and return spring 84 between the rear wheel 75 and the bottom-bracket housing 82, a particularly small distance can be realized between the outer circumference of the rear wheel 75 and the bottom-bracket axle of approximately 4 cm.

Figure 21:
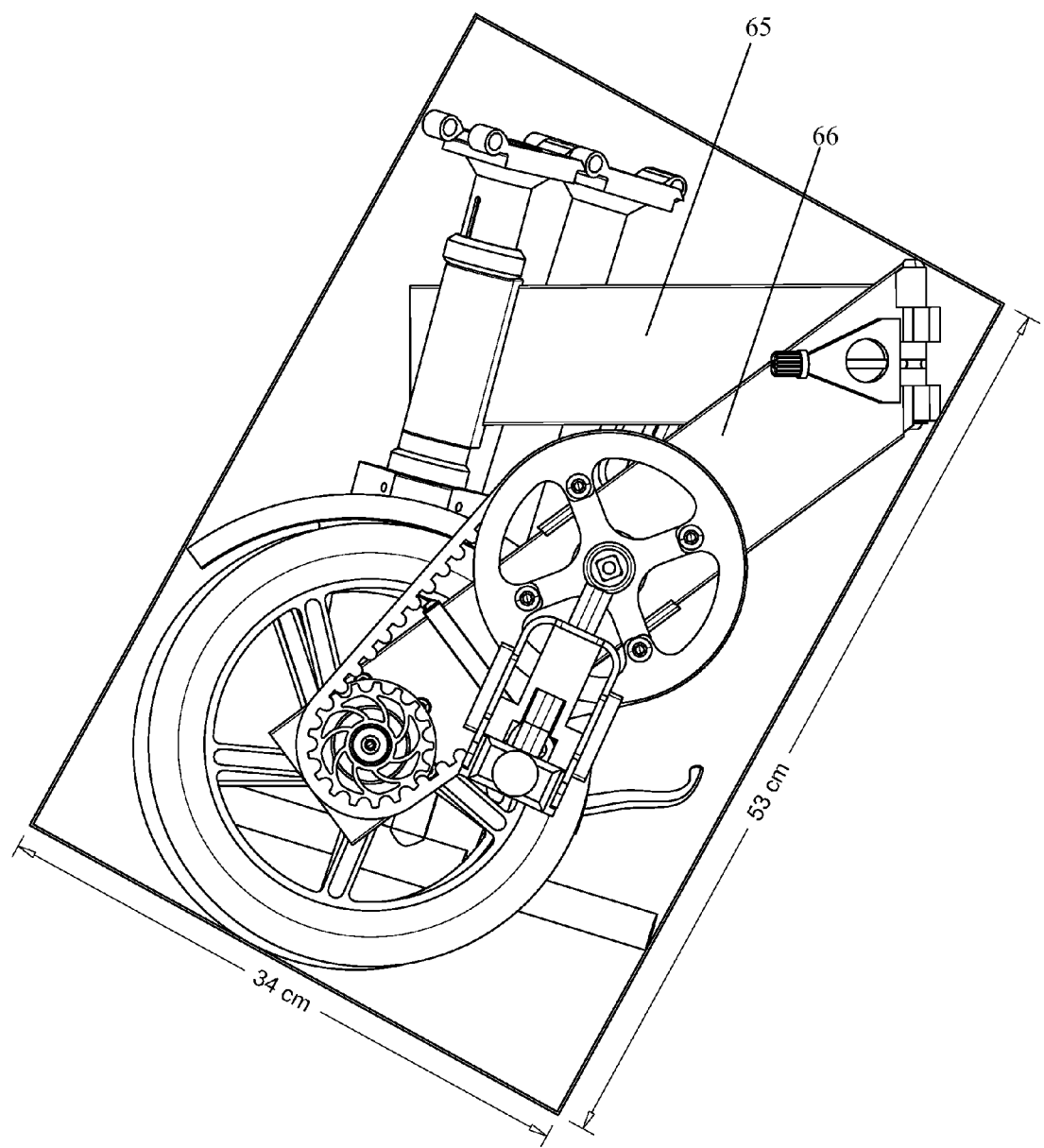
FIG. 21 shows the folded bicycle from FIG. 17 in the side view.

FIG. 21 shows the folded bicycle from FIG. 17 in the side view. According to a feature of the invention, the front frame part 65 extends approximately or precisely parallel to the ground plane, while the rear part 66 extends upward from the rear-wheel axle at such an angle to the ground plane that according to a feature of the invention the bottom bracket, seen laterally, is arranged between the upper side and the lower side of the rear frame part 66 and is at a standard-compliant level above the ground plane. The advantage of this embodiment consists in a short chainstay length and a standard-compliant bottom-bracket height, as a result of the steep angle of the rear frame part 66, and in the very short front frame part 65, that can be engineered. According to a feature of the invention a very compact folding size is thereby achieved that safely complies the usual carry-on luggage sizes of the airlines. The two longest folding lengths here amount to at most 53 cm and 35 cm. Due to the very light frame, also the weight of the bicycle complies with the usual carry-on luggage regulations of the airlines.

A further advantage of the short chainstay in connection with the steep angle of the rear frame part 66 relative to the ground plane is that the rear frame part 66 despite its narrow design can satisfy these stability requirements on the bicycle frame resulting from the bending and torque moments acting on the bicycle frame.

Figure 22:
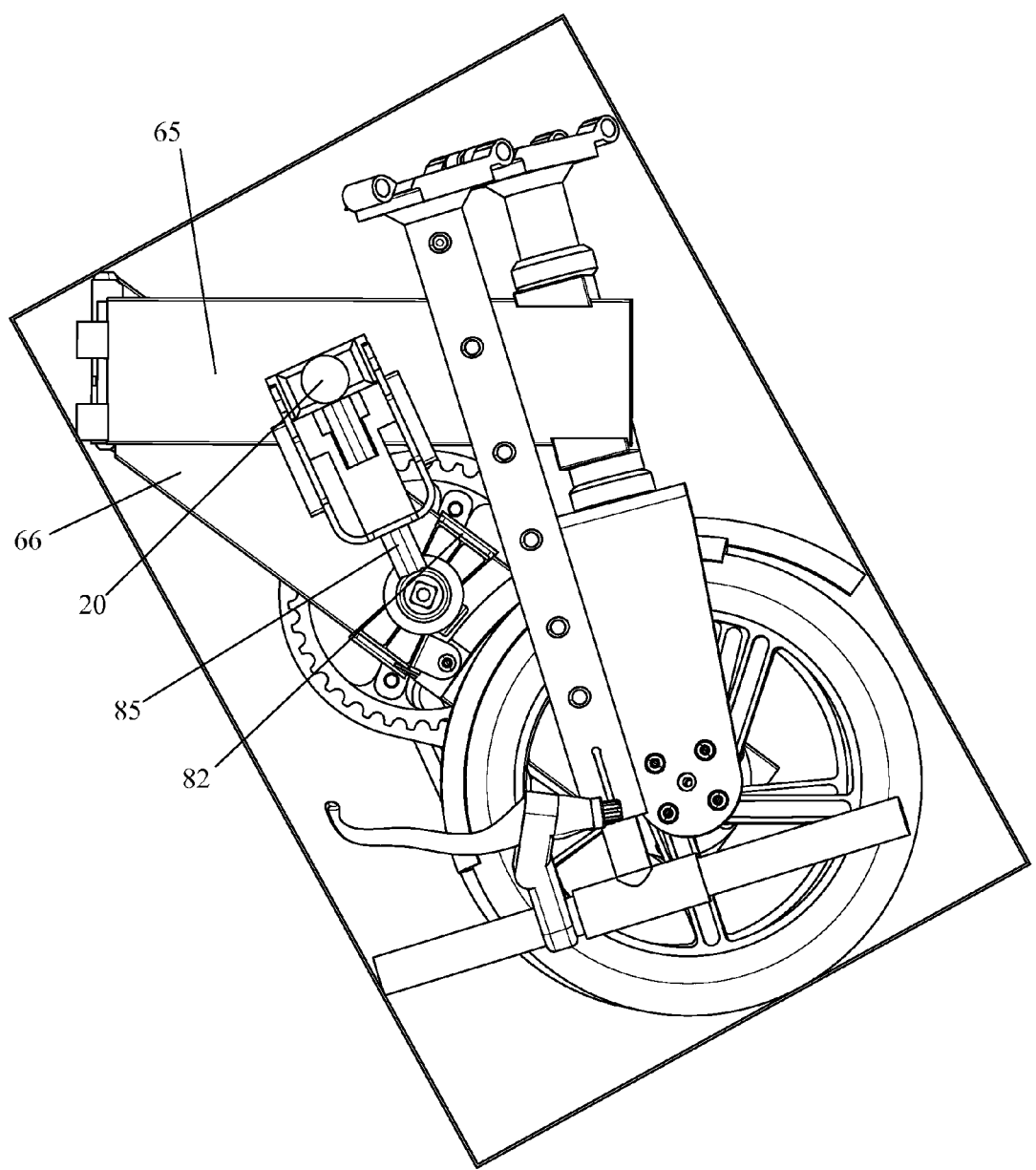
FIG. 22 shows the folded bicycle from FIG. 17 in the other side view.
Figure 23:
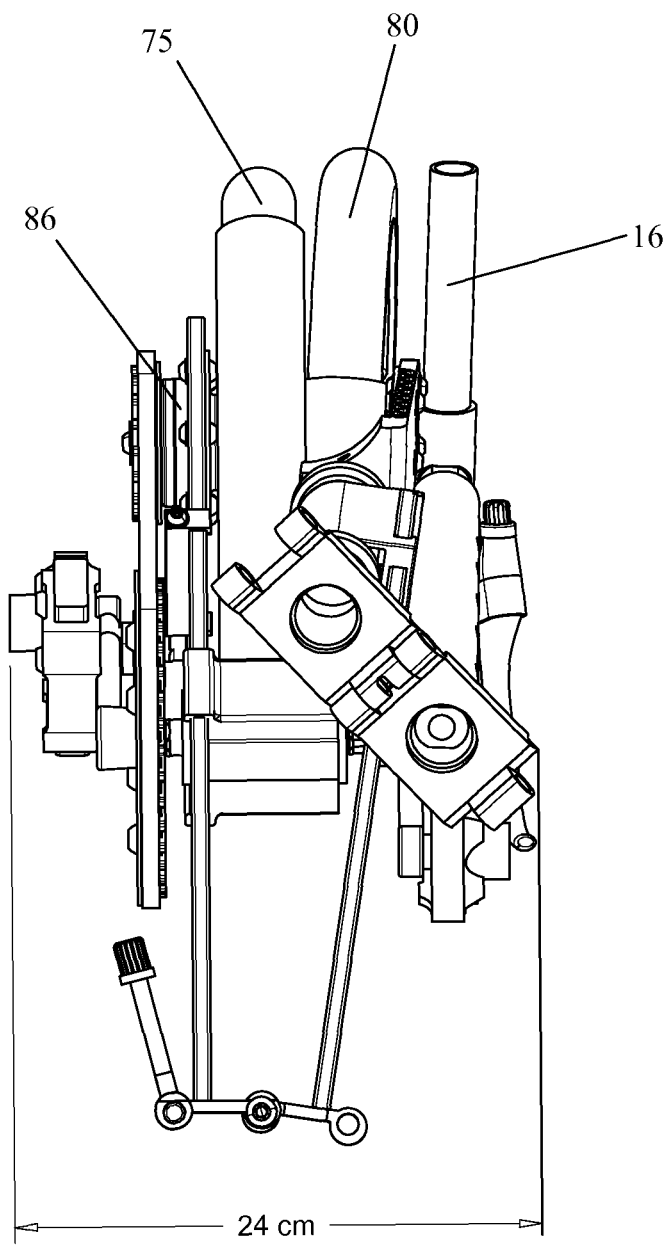
FIG. 23 shows the folded bicycle from FIG. 17 in the top view.

FIG. 22 shows the folded bicycle from FIG. 17 in the other side view. FIG. 23 shows the folded bicycle from FIG. 17 in the top view. According to a feature of the invention, seen axially the front frame part 65 of the folded bicycle is arranged between the rear frame part 66 and a crank 85 with the pedal 20. According to a further feature of the invention, in the folded state of the bicycle the front frame part 65 is located above the bottom-bracket housing 82. The two features result in the advantage that the two wheels of the folded bicycle are positioned largely congruently and without any intermediate space next to each other or, seen laterally, one behind the other. To summarize, the arrangement of the two wheels located directly next to each other and of the handlebar extending parallel to the central reference plane leads to a very small folding width of 24 cm noted in FIG. 23.

In this exemplary embodiment with the achievable small folding size, again many commercially available bicycle components are used. This exemplary embodiment can likewise, as the exemplary embodiment from FIG. 1, be equipped with commercially available driving sprockets and output sprockets. These embodiments, too, are comprised by the invention. According to a feature of the invention, due to the more favorable cycling characteristics when cycling while standing, the crank 84 is again shorter than conventional cranks for 26/28-inch bicycles that are ridden while sitting. In this exemplary embodiment, the crank length only even amounts to 130 mm with the advantages already described above.

To achieve a suitable development with the 10-inch rear wheel 75, according to a feature of the invention there is arranged in the force flow between the output sprocket 71 and the rear-wheel shaft 72 a planetary gear 86, illustrated in detail in DE 10 2011 050 447 B4, having at least one gear with a stationary ring gear directly or indirectly connected to the bicycle frame, a planet carrier, driven by the output sprocket 71, with planet gears that mesh with the ring gear, and at least one sun gear meshing with the planet gears that drives the rear-wheel shaft 72 directly or by means of an intermediate freewheel clutch.

Figure 24:
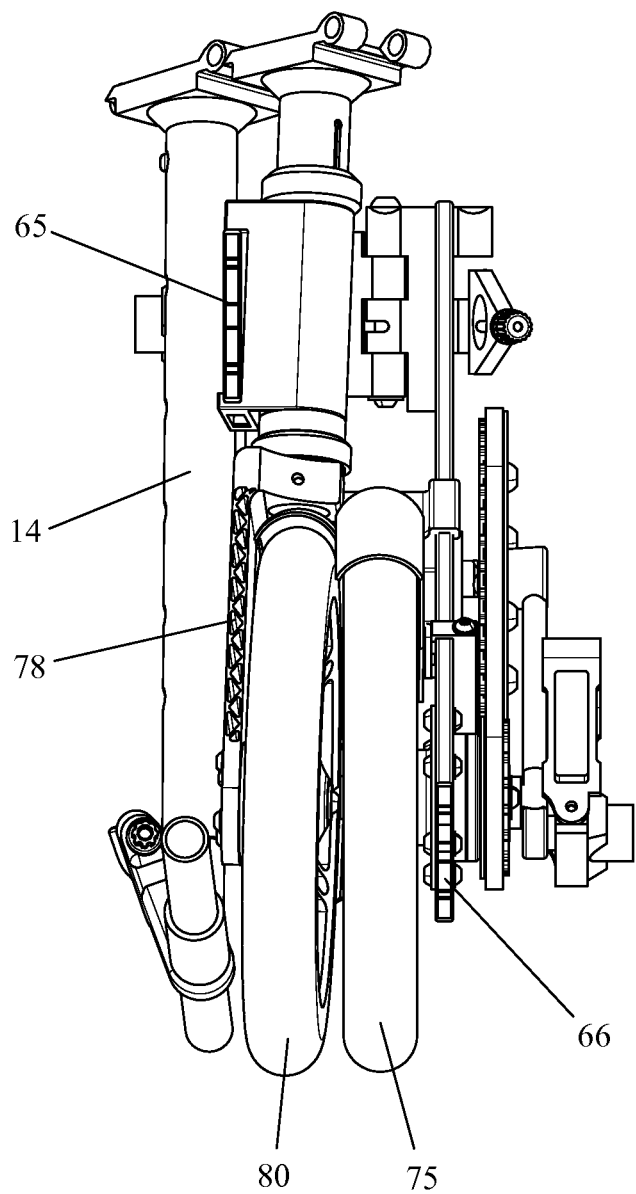
FIG. 24 shows the folded bicycle from FIG. 17 in the front view.

FIG. 24 shows the folded bicycle from FIG. 17 in the front view. According to a feature of the invention, the front frame 65 and the rear frame part 66 are manufactured from an extruded profile. These profiles exhibit stabilizing transversal walls that can support the assembly forces.

According to a feature of the invention, fork crown, fork blade and fork end of the front-wheel fork 78 are likewise manufactured as an integrally manufactured component from an extruded profile, the extrusion direction extending largely or precisely at right angles to the head tube axis. The advantage consists in that no strength-reducing connections are required between the fork crown and the fork blades.

Figure 25:
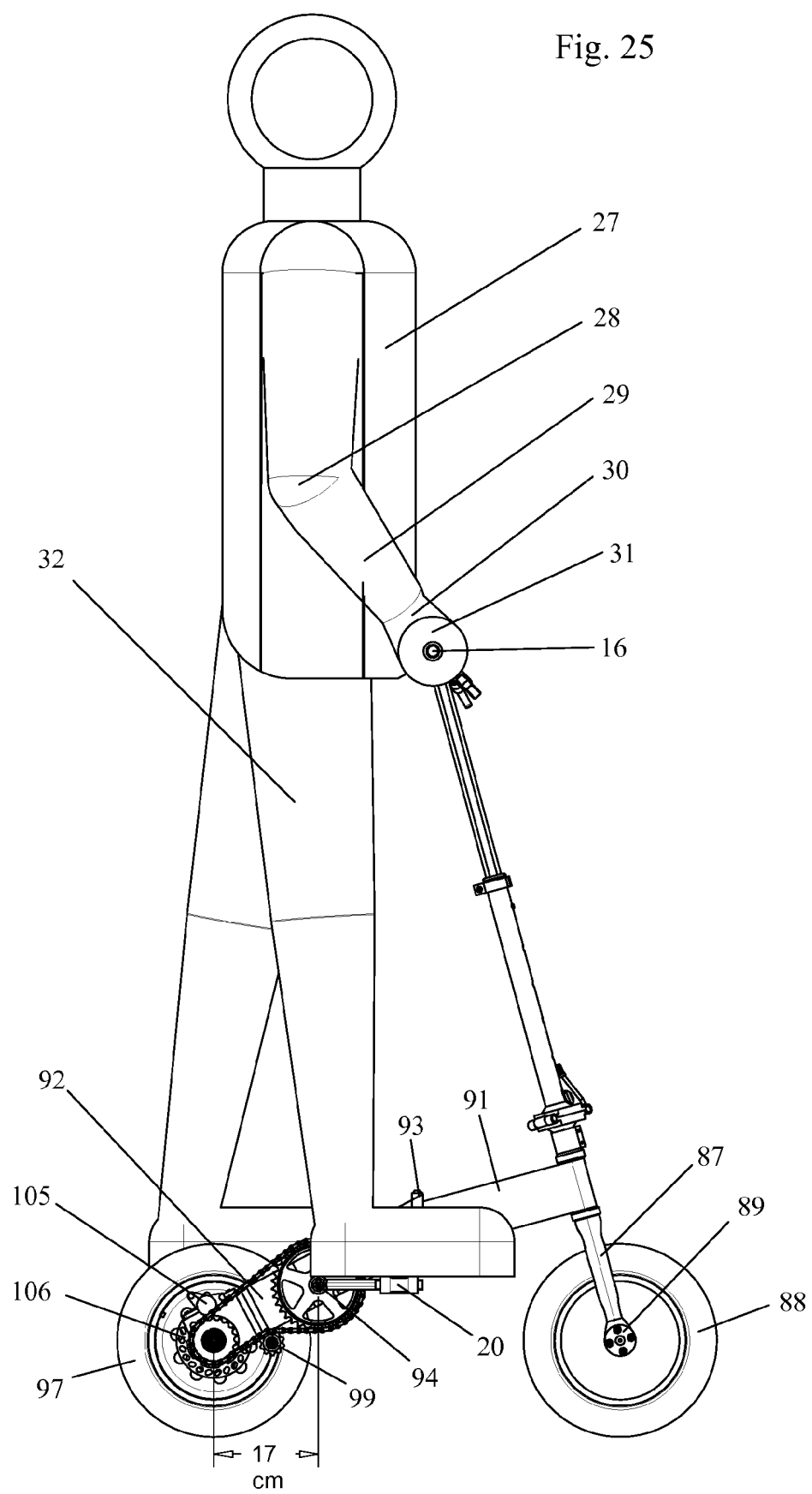
FIG. 25 shows the side view of a third preferred embodiment of the bicycle with a one-sided rear suspension, a chain transmission having a downstream planetary gear, a disk brake, and 12-inch wheels having a particularly wide tire.

FIG. 25 shows the side view of a third preferred embodiment of the bicycle with a one-sided rear suspension, a chain transmission with a downstream planetary gear, a disk brake, and with 12-inch wheels with a particularly wide tire.

A 2.0 m tall cyclist is illustrated. In this illustration, the pedals 20 are at the same level, the cyclist has stretched his legs and he can further grasp around the handlebar 16 without any problems. In this embodiment, a chainstay length of at most 17 cm is realized according to a feature of the invention with the 12-inch wheels that are used.

According to a feature of the invention, also in this embodiment the geometrical values of the bicycle are engineered such that a design of the bicycle is realized that complies with standards in every respect, having a head angle of 75°, a weight distribution of at least 25% on a front wheel 88, a deceleration of the front wheel 88 that is possible in a standard-compliant manner with a braking deceleration of 3.4 m/s2 without falling over toward the front even for the 2.0 m tall and 100 kg heavy cyclist, the ground clearance of the pedals 20 situated in the lowest position and thus the bottom-bracket height, required for a lateral bicycle inclination of 25°, the required distance of 100 mm between the pedal axle and the front wheel 88 or the wheel guard of the front wheel 88 and the possibility, by using air tires, of safely crossing 25 mm high and 12 mm beveled laths.

The reference numbers illustrated are described in terms of the following Figures.

Figure 26:
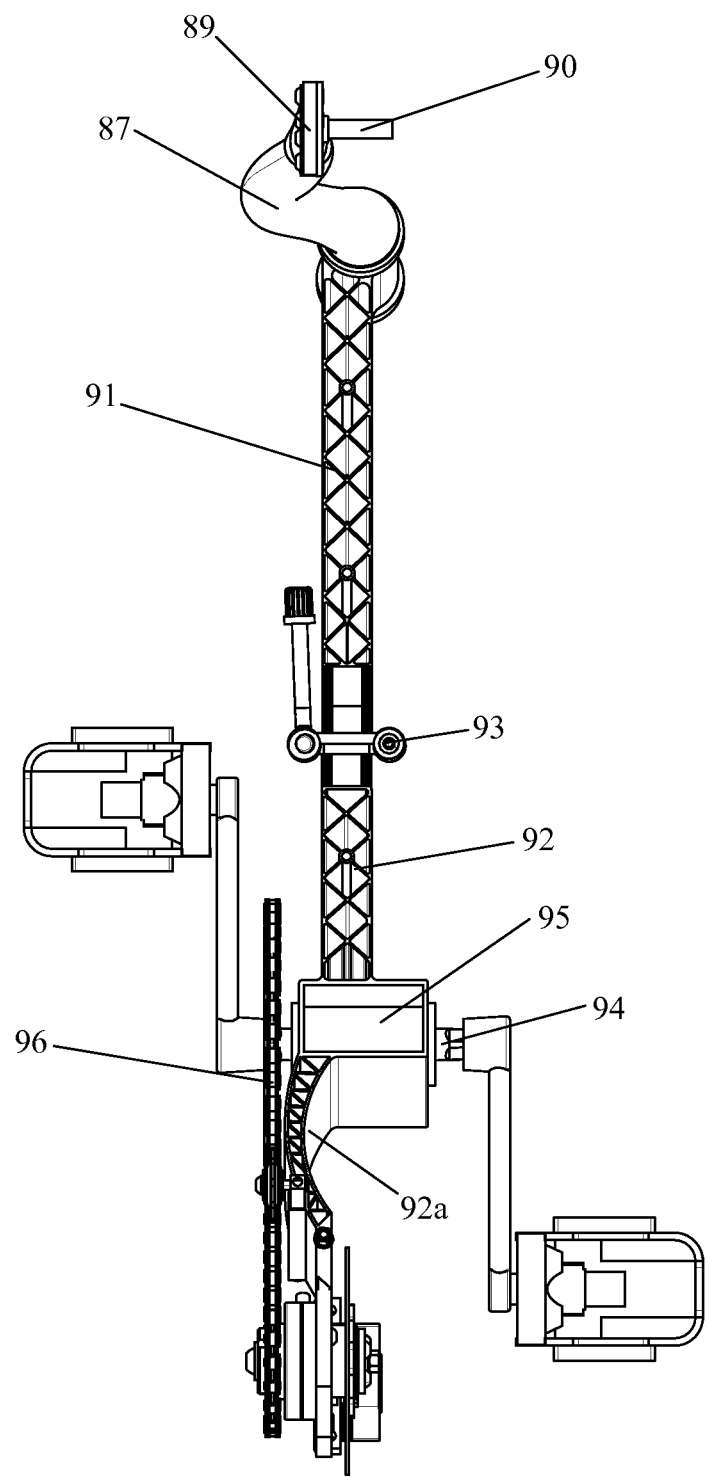
FIG. 26 shows a view of the bicycle from FIG. 25 from below without the wheels.
Figure 27:
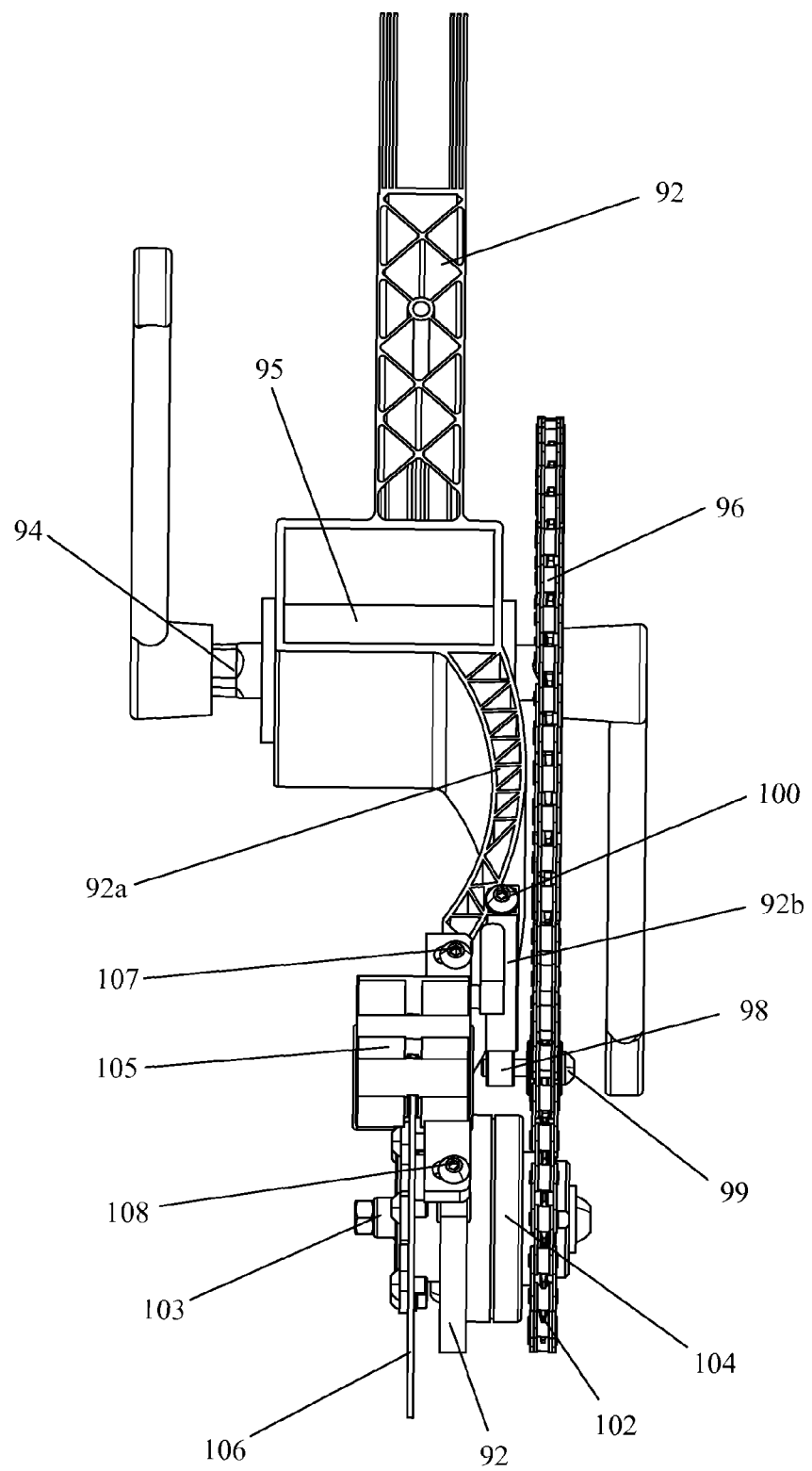
FIG. 27 shows a rear view of the rear part of the bicycle to illustrate the arrangement of the disk brake and the frame offsets.

FIG. 26 shows a view of the bicycle from FIG. 25 from below without the wheels. FIG. 27 shows a rear view of the rear part of the bicycle with the rear wheel removed.

A one-armed front-wheel fork 87 exhibits a shape that is adapted to the front wheel 88 having a wide 12-inch wheel. Its end 89 is connected to a flange 90 that exhibits an axle for mounting the front wheel 88.

According to a feature of the invention, a front frame part 91 and/or a rear frame part 92 are manufactured from an extruded profile as in DE 10 2011 052 270 B4, the extrusion direction extending from the upper side of the frame part to the lower side of the frame part. The two frame parts 91 and 92 are interconnected by means of a folding hinge 93, for example the folding hinge explained in depth in DE 10 2011 052 134 B4. The advantage of the frame shape consists here in that the frame can be adapted to the geometrical and the strength requirements by designing and blanking the extruded profile. Thus the rear frame part 92 exhibits the features evident from FIG. 26 and from FIG. 27:

a. the rear frame part 92, at the level of a bottom-bracket 94, exhibits a width as is required by the clamping width of the bottom-bracket 94. A corresponding bottom-bracket housing 95 is flush with the frame part 92.

b. Running toward the rear, according to a feature of the invention the rear frame part 92 describes a curve 92*a* that is going outward, hence it is possible for the 12-inch wheel with broad tire to be arranged centrally relative to the central reference plane of the bicycle. The curve 92 maintains the required distance from a chain 96 in an outward direction and is engineered broader and thus more stable in the direction of the bottom bracket 94.

c. Running further toward the rear axle of a rear wheel 97, according to a feature of the invention the rear frame part 92 exhibits a recess or an extruded chamber 92*b* on which a linear guide 98 for an idler roller 99 is arranged, a setting screw 100 arranged in the recess pulling the idler roller 99 and thus the chain 96 upward and tensioning them.

d. Running further toward the rear-wheel axle of the rear wheel 97 the rear frame part 92 is offset the central reference plane of the bicycle to create space for the rear-wheel drive connected to the rear frame part 92. So that an appropriate development can be achieved with the 12-inch rear wheel 97, according to a feature of the invention seen in the force flow between an output sprocket 102 and a rear-wheel shaft 103 a planetary gear 104 with at least one speed is arranged, illustrated in detail in DE 10 2011 050 447 B4, having a stationary ring gear directly or indirectly connected to the bicycle frame, a planet carrier driven by the output sprocket 102 with planet gears that mesh with the ring gear, and at least one sun gear meshing with the planet gears, that drives the rear-wheel shaft 103 directly or by means of an intermediate freewheel clutch.

e. At the level of the rear-wheel drive, according to a feature of the invention the rear frame part 92 exhibits further recesses that serve to install a brake caliper 105 of a disk brake, according to a further feature of the invention a brake disk 106 being arranged on the side and inside of the rear-wheel 97 seen from the rear frame part 92. By means of fastening screws 107 and 108, the brake caliper 105 is directly connected to the rear frame part 92.

Figure 28:
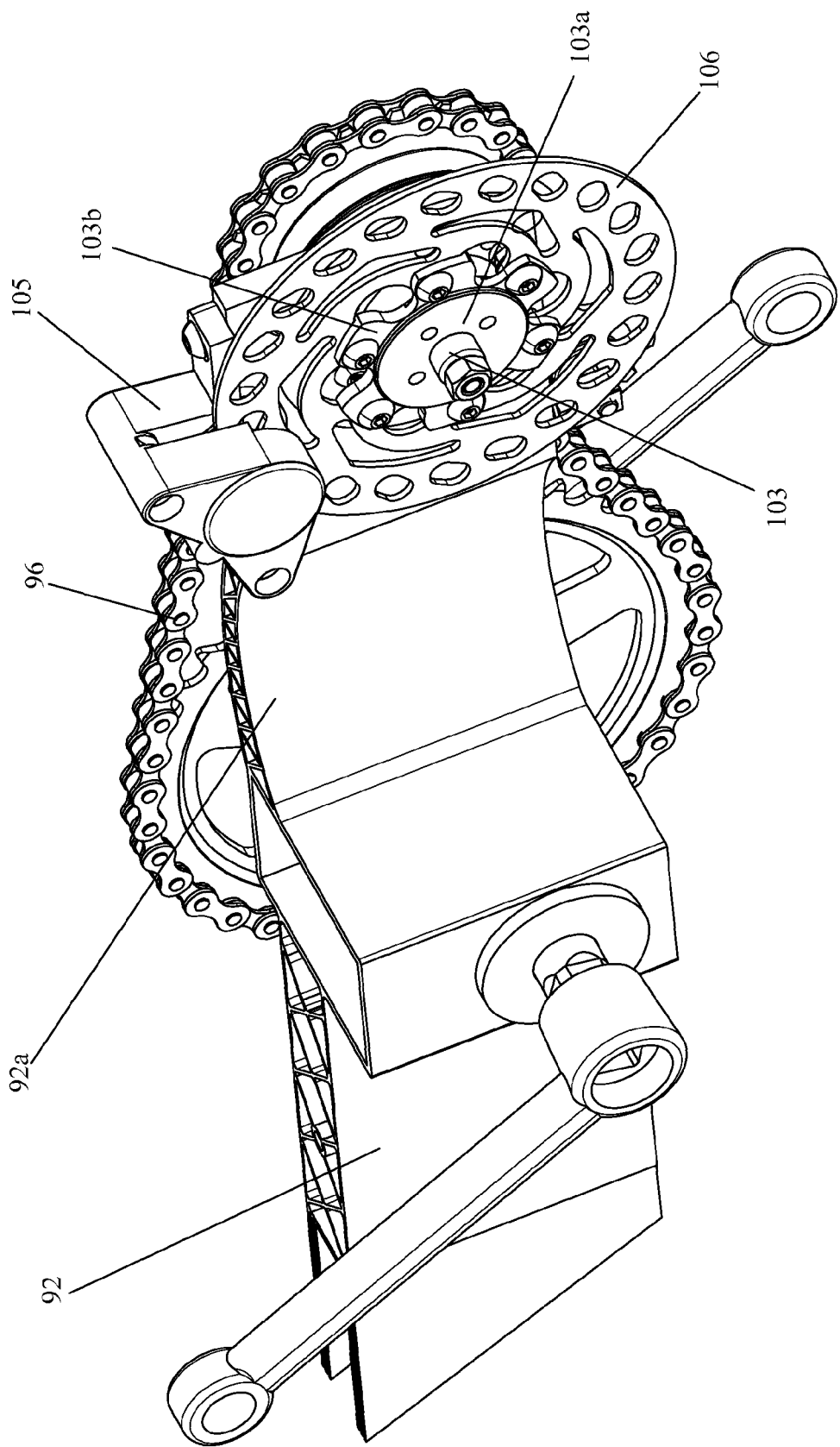
FIG. 28 shows an enlarged view of the rear part of the bicycle to illustrate the arrangement of the disk brake.

FIG. 28 shows an enlarged illustration of the rear part of the bicycle, to clarify the arrangement of the disk brake.

Figure 29:
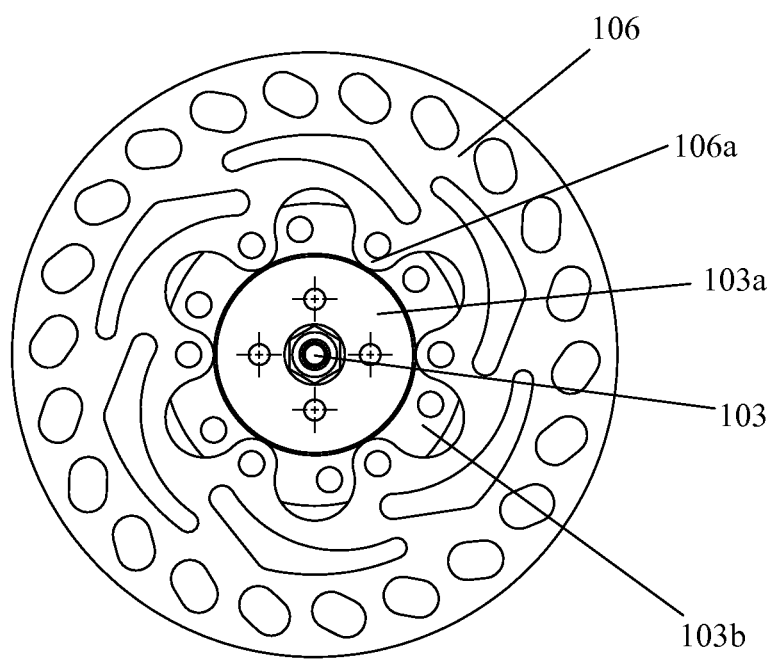
FIG. 29 shows the brake disk of the disk brake in connection with the rear-wheel flange, to which the brake disk is fastened, in the installation position.

FIG. 29 shows the brake disk of the disk brake in connection with a rear-wheel flange, on which the brake disk is fastened, in the installation position.

Figure 30:
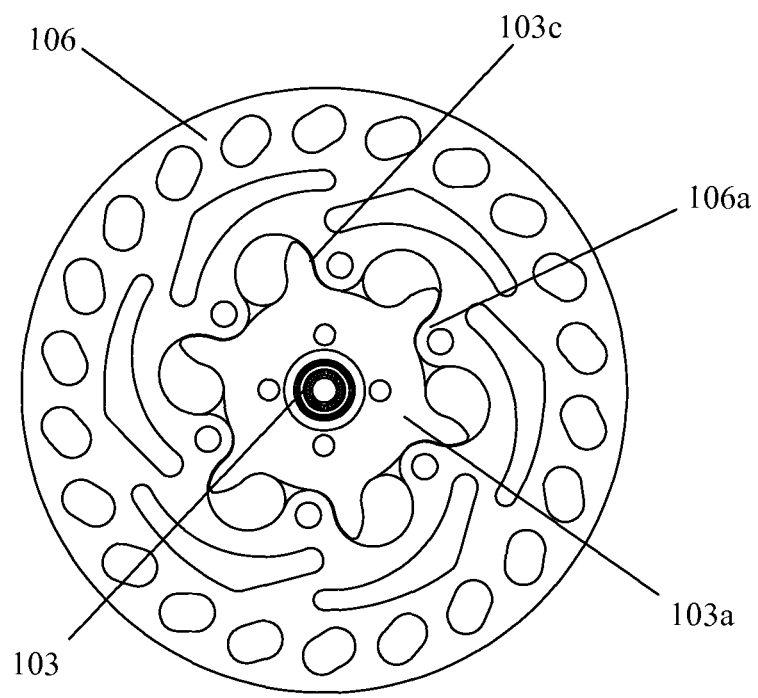
FIG. 30 shows the brake disk and the rear-wheel flange in the installed state.

FIG. 30 shows the brake disk and the rear-wheel flange in the installed state.

On the side of the rear frame part 92 facing the rear wheel 97, the rear-wheel shaft 103 is formed as a rear-wheel flange 103a. According to a feature of the invention, the brake disk 106 is fastened to the rear-wheel flange 103a of the rear-wheel shaft 103 such that, seen axially, the brake disk 106 is connected to the rear-wheel flange 103a between the rear frame part 92 and the rear-wheel flange 103a. For this purpose, the brake disk 106 and the rear-wheel flange 103a exhibit lugs 103b respectively 106a that alternately can be pushed one past the other to get the brake disk 106 behind the rear-wheel flange 103a and to install it with the rear-wheel flange 103a. As an option, to achieve a form-fit brake-force transmission from the brake disk 106 to the rear-wheel flange 103a toward the lugs 106a of the brake disk 106, the rear wheel flange 103a can exhibit an edge 103c against which the lugs 106a of the brake disk 106 are braced toward the rear-wheel flange 103a when decelerating the bicycle.

Figure 31:
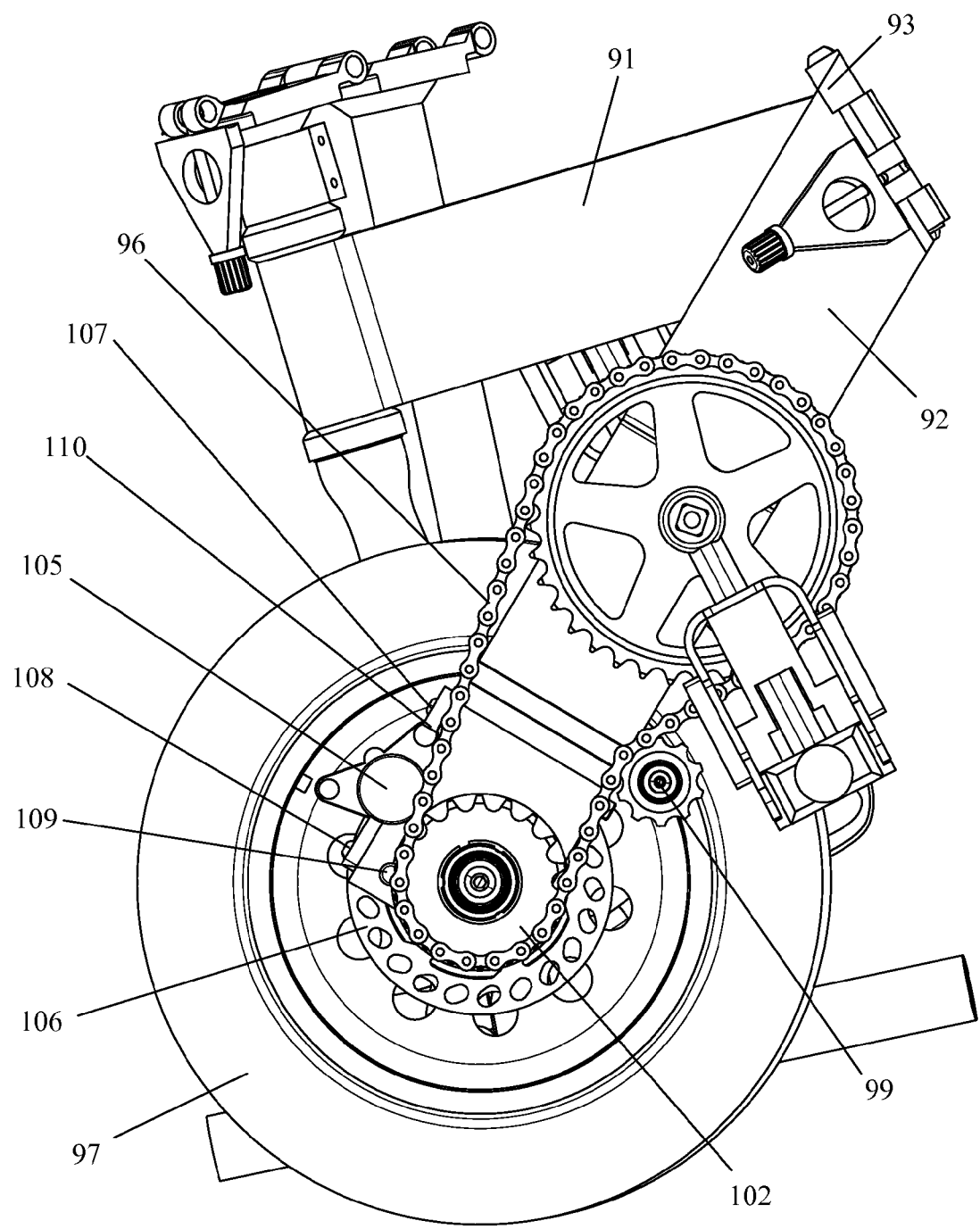
FIG. 31 shows the folded bicycle from FIG. 25 in the side view.

FIG. 31 shows the folded bicycle from FIG. 25 in the side view and the arrangement of the disk brake from a further perspective. According to a feature of the invention, the rear frame part 92 exhibits as in DE 10 2011 052 270 B4 a recess following the shape of the brake caliper 105 and further recesses for guiding fastening screws 107 and 108 that connect the brake caliper 105 to the rear frame part 92. The rear frame part 92 exhibits a further lateral recess in which a round nut 109 is arranged that again is clamped with the fastening screw 108. A Bowden cable 110 is likewise indicated and is guided toward the front between the rear wheel 97 and the chain 96.

Figure 32:
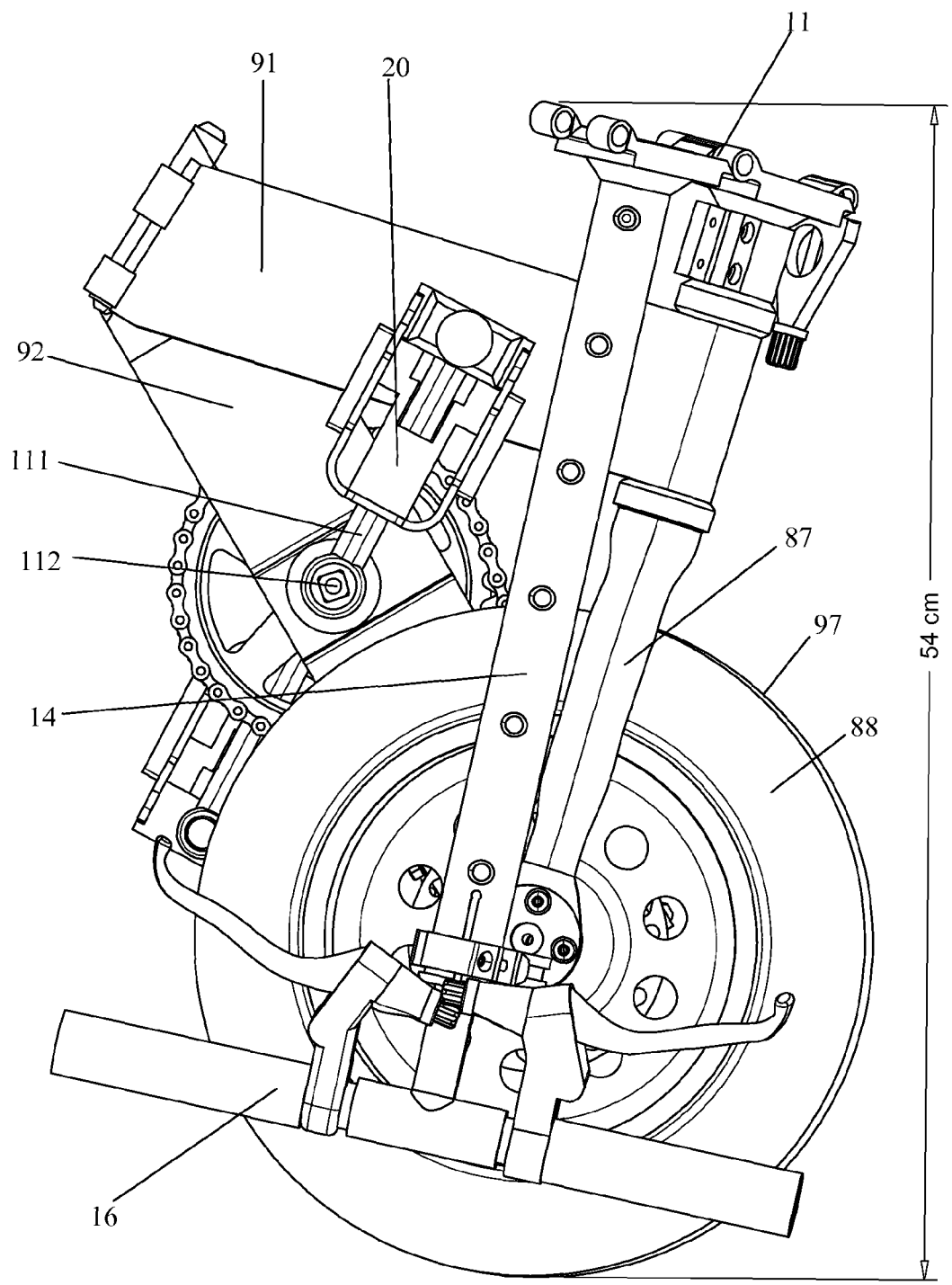
FIG. 32 shows the folded bicycle from FIG. 15 in the other side view.
Figure 33:
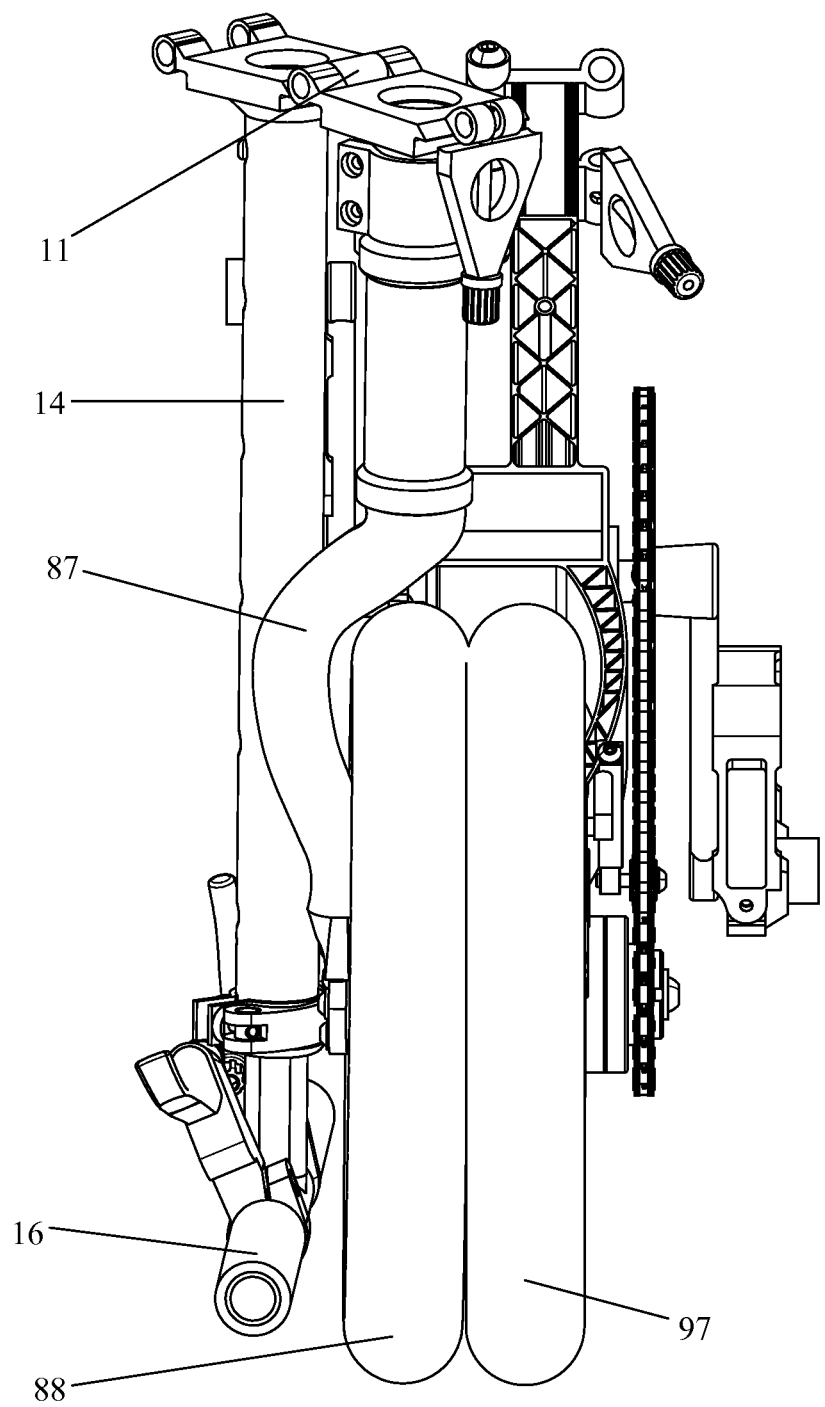
FIG. 33 shows the folded bicycle from FIG. 25 in the front view.

FIG. 32 shows the folded bicycle from FIG. 25 in the other side view, and FIG. 33 shows the folded bicycle from 25 in the front view.

As in FIG. 17, also in this exemplary embodiment according to a feature of the invention the front frame part 91 is arranged, seen axially, in the folded bicycle between the rear frame part 92 and a crank 111 with the pedal 20. According to a further feature of the invention, in the folded state of the bicycle the front frame part 91 is positioned above a bottom bracket 112. From both features the advantage results that in the folded bicycle the rear wheel 97 and the front wheel 88 are largely congruent and rest next to each other without any intermediate space. Added to this, in this exemplary embodiment the single-armed front-wheel fork 87 is tube-shaped due to the wide tires, so that in the folded bicycle the steering tube 14 and the front-wheel fork 87, seen laterally, are located next to each other at the level of the tire. Thus, according to a feature of the invention the arrangement leads to a very small folding size, due to the two wheels, the front wheel 88 and the rear wheel 97, located directly next to each other, the front-wheel fork 87 and the steering tube 14, seen laterally, located next to each other and the handlebar 16 running parallel to the central reference plane.

According to a feature of the invention, this exemplary embodiment with broad 12-inch wheels as noted in FIG. 32, having a longest folding length of 54 cm complies also with the usual carry-on luggage sizes of the airlines.

Figure 34:
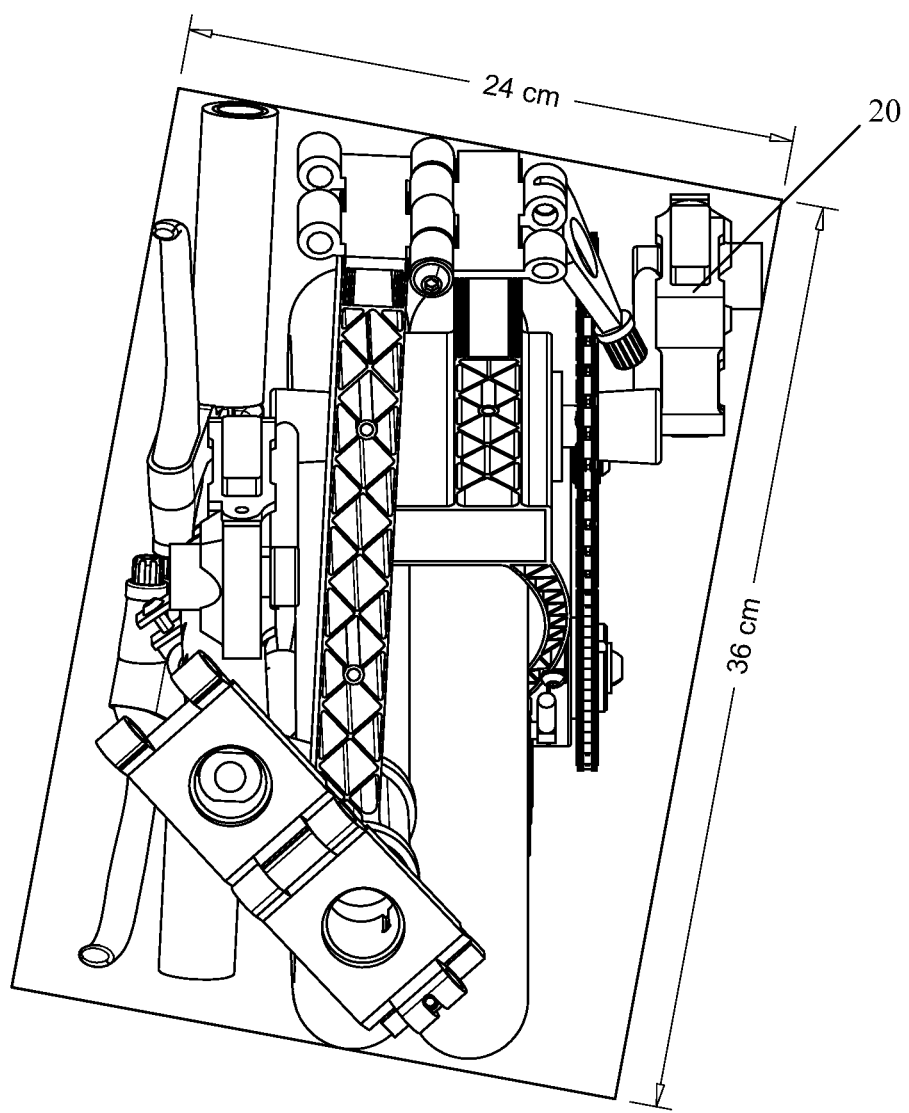
FIG. 34 shows the folded bicycle from FIG. 25 in a view from above to illustrate the folding sizes.

FIG. 34 shows the folded bicycle from FIG. 25 in a view from above, to illustrate the further folding sizes. According to a further feature of the invention, the folding sizes of the bicycle amount to 54 cm+36 cm+24 cm=114 cm and thus complies wellwith the usual carry-on luggage size of the airlines of L+H+D=115 cm. In this exemplary embodiment the commercially available foldable pedal 20 is used. It is directly evident from FIG. 34 that available folding pedals that achieve even smaller folding widths, can reduce the folding size of the bicycle even further.

FIG. 35 shows the side view of a fourth preferred embodiment with 14-inch wheels, a drum brake and a single-speed chain transmission having a particularly small output sprocket.

A front frame part 113 is connected to a rear frame part 114 by means of a folding hinge 115. A front wheel 116 and a rear wheel 117 are 14-inch wheels. According to a feature of the invention, the rear wheel 117 is driven via an output sprocket 119 of an upstream chain transmission by a rear-wheel drive—for example as in DE 10 2011 051 850 B3—having a rear-wheel axle 118. The rear wheel 117 is connected to the rear-wheel shaft 118 on the side of the rear frame part 114 lying opposite the output sprocket 119. According to a feature of the invention, seen axially a drum brake 120 is arranged between the rear frame part 114 and the rear wheel 117, the drum brake being actuated by means of a brake arm 121 rotatably arranged in the rear frame part 114, the brake cable being braced, like commercially-available drum brakes, against a front stay bridge 122.

The standard-manner design of this embodiment and the use of many commercially-available bicycle components have already been pointed out above.

In this embodiment, according to a feature of the invention, a chainstay length of at most 18 cm is realized with the 14-inch wheels that are used.

Figure 36:
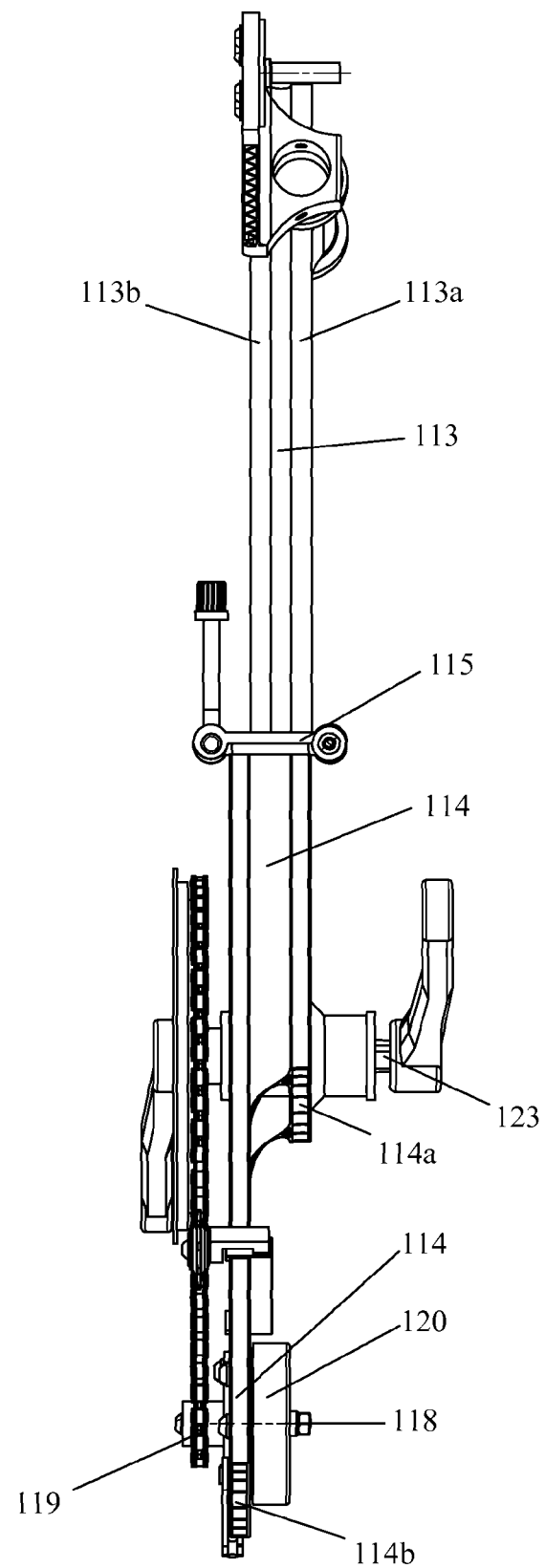
FIG. 36 shows a view of the bicycle from FIG. 35 from below without the wheels, to illustrate the arrangement of the rear-wheel drive and the drum brake.

FIG. 36 shows a view of the bicycle from FIG. 35 from below without the wheels, to illustrate the arrangement of the rear-wheel drive and the drum brake 120.

According to a feature of the invention, the front frame part 113 and the rear frame part 114 are in this exemplary embodiment again designed according to DE 10 2011 053 733 B4 with two outer segments 113a or 114a and 113b or 114b, according to a feature of the invention the outer segment 113a of the front frame part 113 and the outer segment 114a of the rear frame part 114 being arranged in the central reference plane of the bicycle. According to a feature of the invention, the supporting frame parts 113 and 114 exhibit extruded profiles of differing widths. This has the advantage that the front frame part 113 can be designed to be sufficiently narrow so that in the folded state it can be arranged, as can be seen from FIG. 37, above a bottom bracket 123 and, seen axially, again between the rear frame part 114 and the pedal 20, with the advantages already described concerning the achievable folding size.

Figure 37:
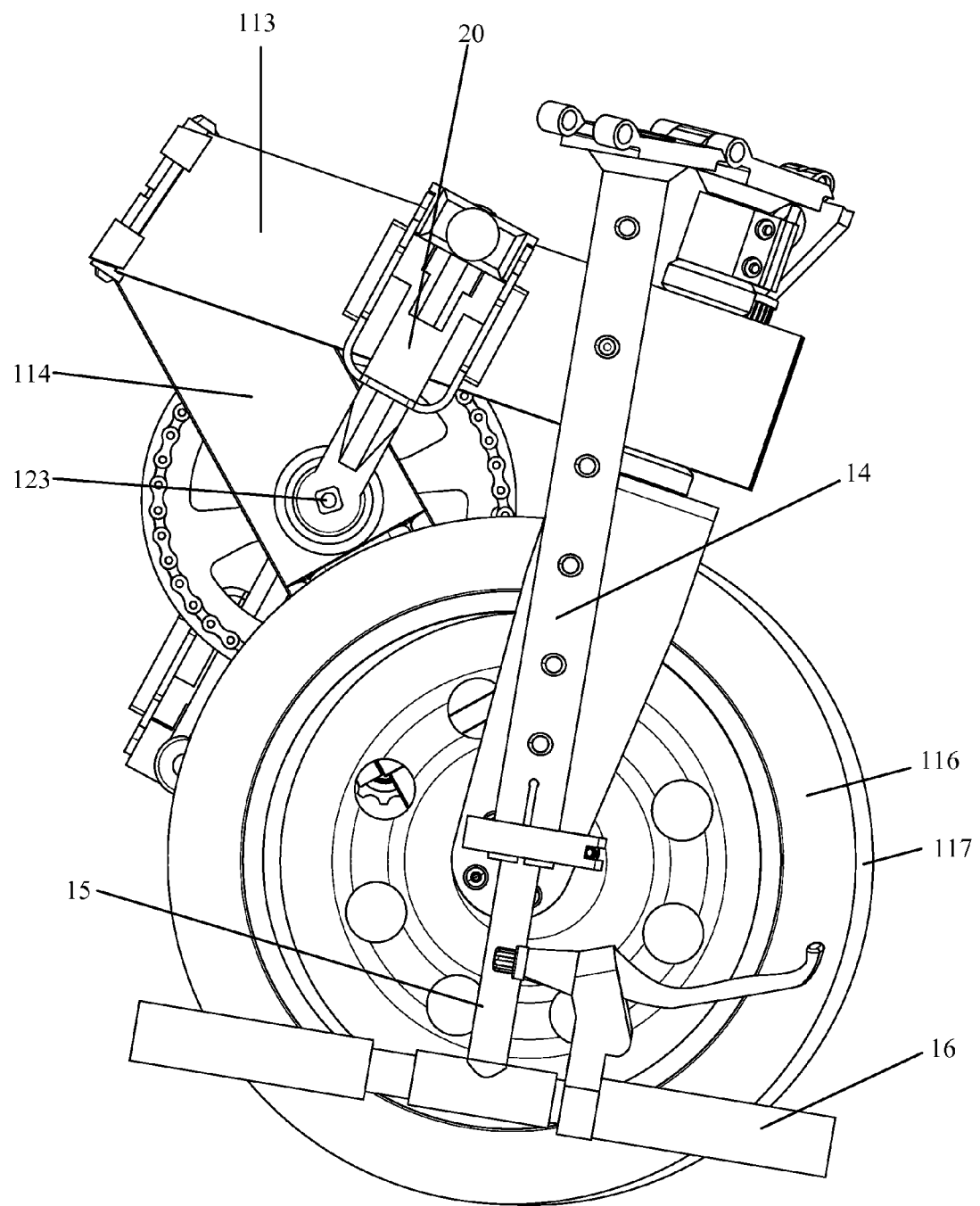
FIG. 37 shows the folded bicycle from FIG. 35 in the side view.
Figure 38:
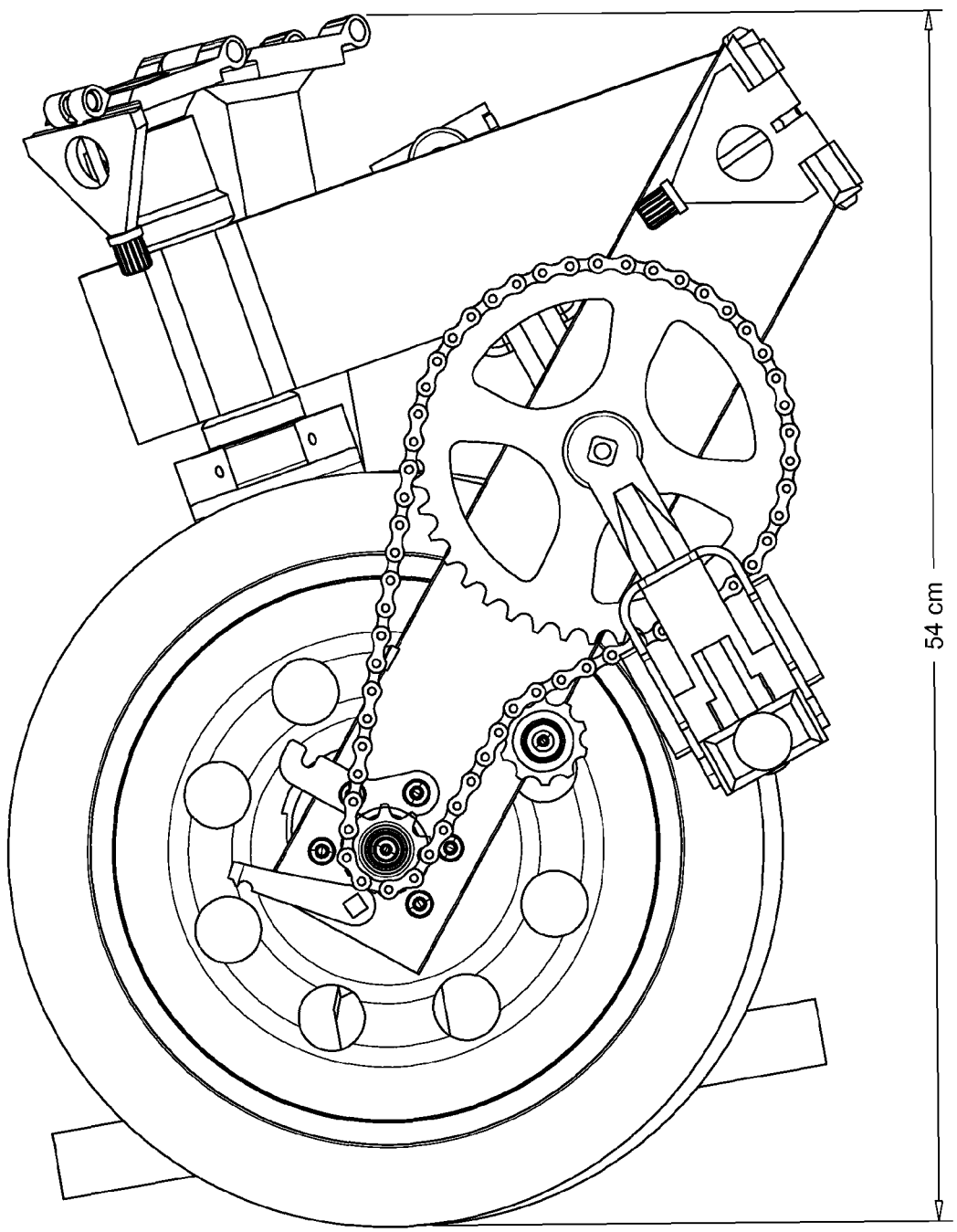
FIG. 38 shows the folded bicycle from FIG. 35 in the other side view.

FIG. 37 shows the folded bicycle from FIG. 35 in the side view. FIG. 38 shows the folded bicycle from FIG. 35 in the other side view.

According to a feature of the invention, this exemplary embodiment having 14-inch wheels as noted in FIG. 37 with a longest folding length of 54 cm complies well with the conventional carry-on luggage sizes of the airlines.

Figure 39:
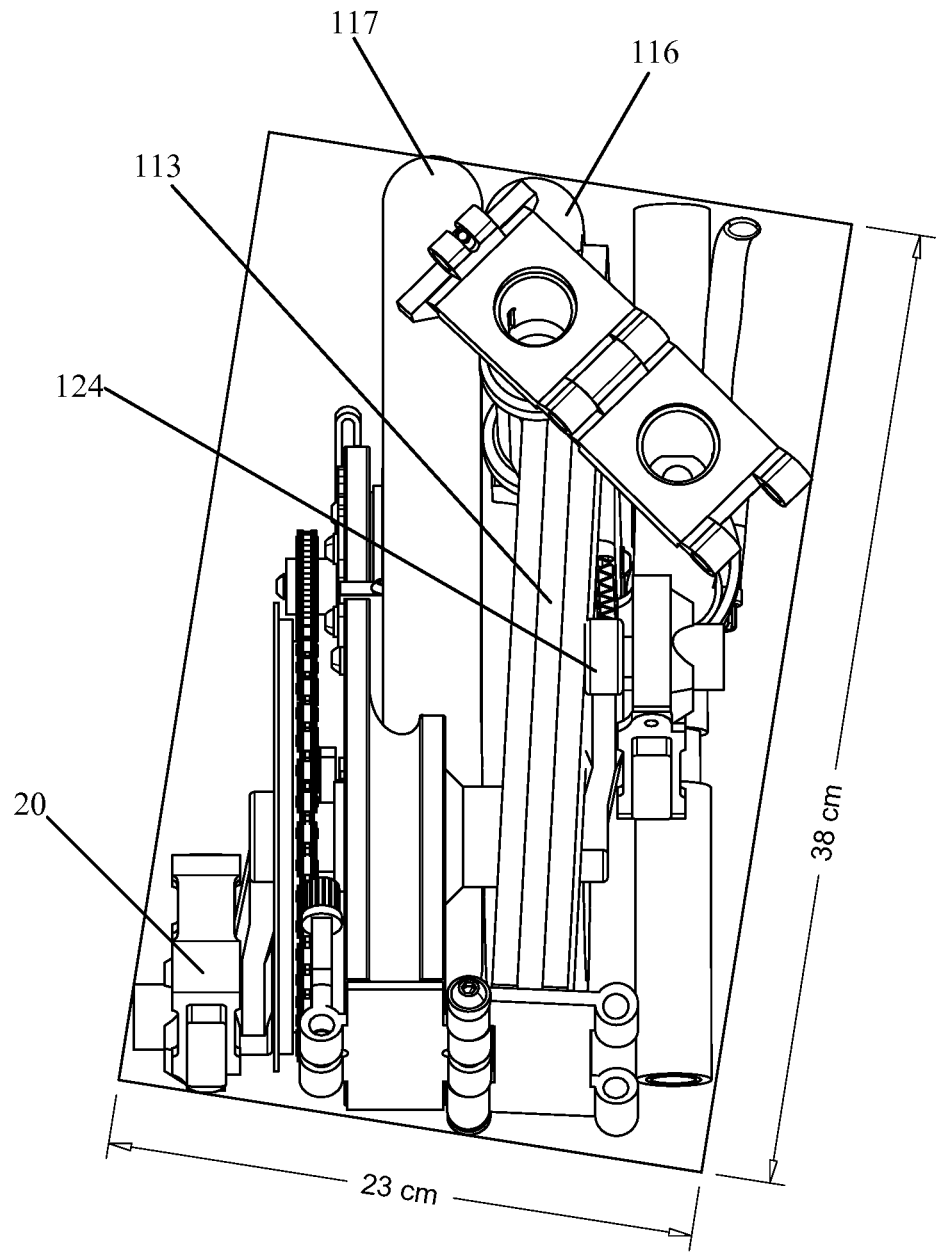
FIG. 39 shows the folded bicycle from FIG. 35 in a view from above to illustrate the folding sizes.

FIG. 39 shows the folded bicycle from FIG. 35 in a view from above, to illustrate the folding sizes.

According to a further feature of the invention, the folding sizes of the bicycle amount to 54 cm+38 cm+23 cm=115 cm, and thus complies well with the usual carry-on luggage sizes of the airlines of L+H+D=115 cmis. In this exemplary embodiment, too, the commercially available foldable pedal 20 is used. It is directly evident from FIG. 39, that available folding pedals that achieve even smaller folding width, would reduce the folding size of the bicycle even further.

According to a feature of the invention, a left crank 124 serves to brace the front frame part 113 and thus the front wheel 116 against the rear wheel 117, it again being possible to achieve a smaller folding size. For this purpose, in the folded state the crank 124 is rotated toward the front wheel 116, whereby the crank 124 can exert the corresponding force on the front frame part 113 via the inclined plane offered by the front frame part 113.

Figure 40:
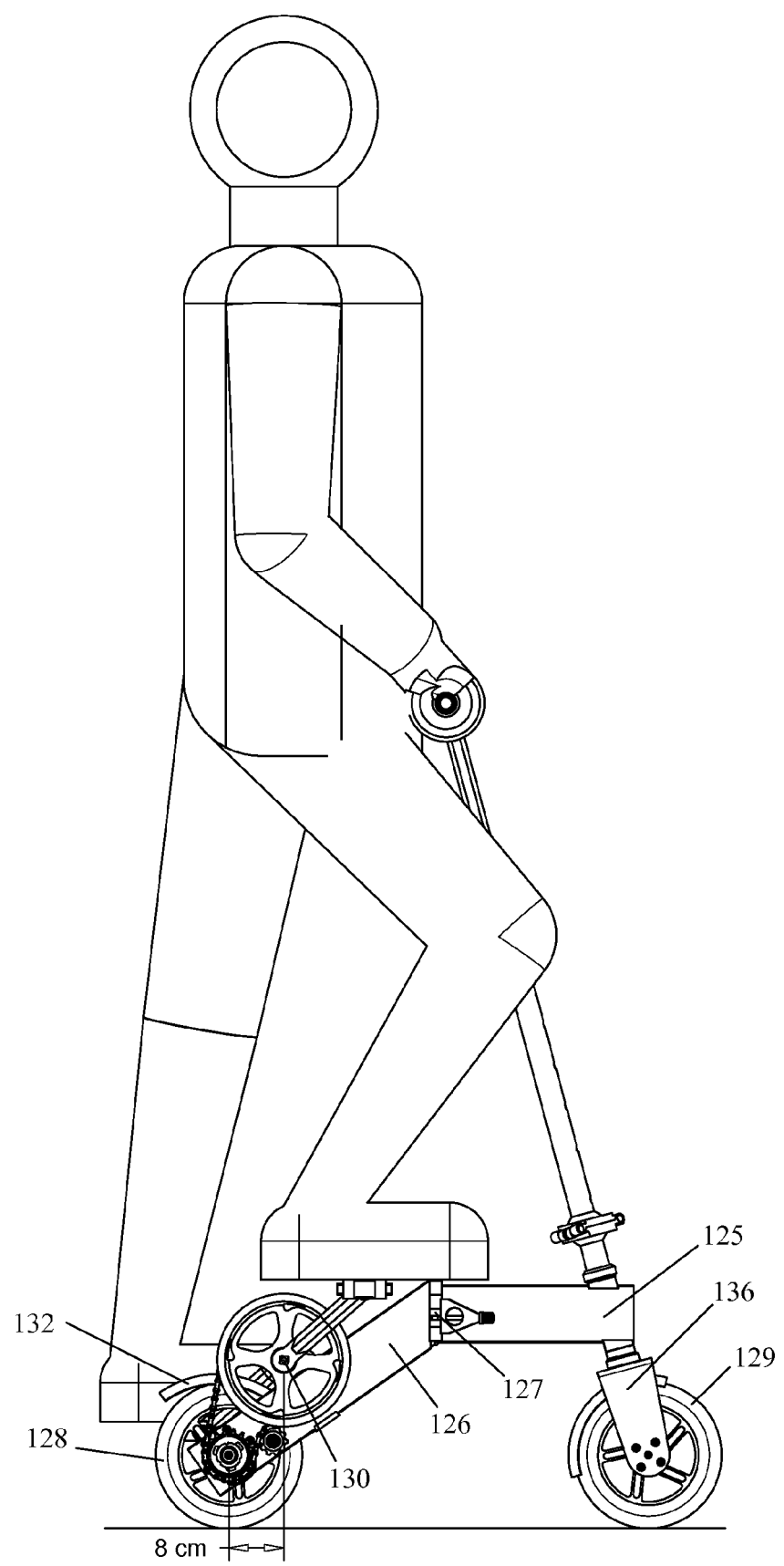
FIG. 40 shows the side view of a fifth preferred embodiment with 8-inch solid-plastic wheels and a transmission unit, connected to the rear wheel, having a planetary gear.

FIG. 40 shows the side view of a fifth preferred embodiment having 8-inch solid-plastic wheels and a transmission unit connected to the rear wheel with a planetary gear. A front frame part 125 is again connected to a rear frame part 126 by means of a folding hinge 127. This embodiment comprises an 8-inch rear wheel 128 and an 8-inch front wheel 129.

To achieve the required bottom-bracket height despite this small wheels, according to a feature of the invention a bottom bracket 130 is arranged, seen laterally, above the upper edge of the rear frame part 126 via a bottom-bracket housing 131 connected to the rear frame part 126. This achieves a very short chainstay length of 8 cm. A two-stage bicycle drive is again realized, the first stage being a chain drive and the second stage a transmission unit having a planetary gear with a stationary ring gear and a driven sun gear, for example a transmission unit according to DE 10 2011 050 447 B4. With the short chainstay lengths and the bicycle drive, according to a feature of the invention the 8-inch rear wheel 128 used here achieves a good grip of the rear wheel 128 even on inferior ground.

To decelerate the bicycle in this exemplary embodiment, according to a feature of the invention only the deceleration already described in FIG. 17 by means of a wheel guard 132 of the rear wheel 128 is provided, thus further attachments on the handlebar, in particular brake levers, can be spared for achieving a low weight and a very compact folding size.

Due to the low chainstay length and the short frame parts 127 and 128 it seems also possible to imagine the use of frame parts made from hardwood for this embodiment. The invention also comprises embodiments having frame parts from wood or other suitable materials. In this case, the folding hinge would have to be slightly modified for connecting the frame parts.

FIG. 41 shows the folded bicycle from FIG. 40 in the side view.

According to a feature of the invention, this exemplary embodiment with 8-inch wheels as noted in FIG. 41 with a longest folding length of 47 cm safely complies with the conventional carry-on luggage sizes of the airlines.

In this embodiment, an idler roller 133 is fastened linearly displaceably on the rear frame part 126 by means of a clamping rail 134 fastened on the rear frame part 126 and a clamping screw 135 supporting the idler roller 133.

Figure 42:
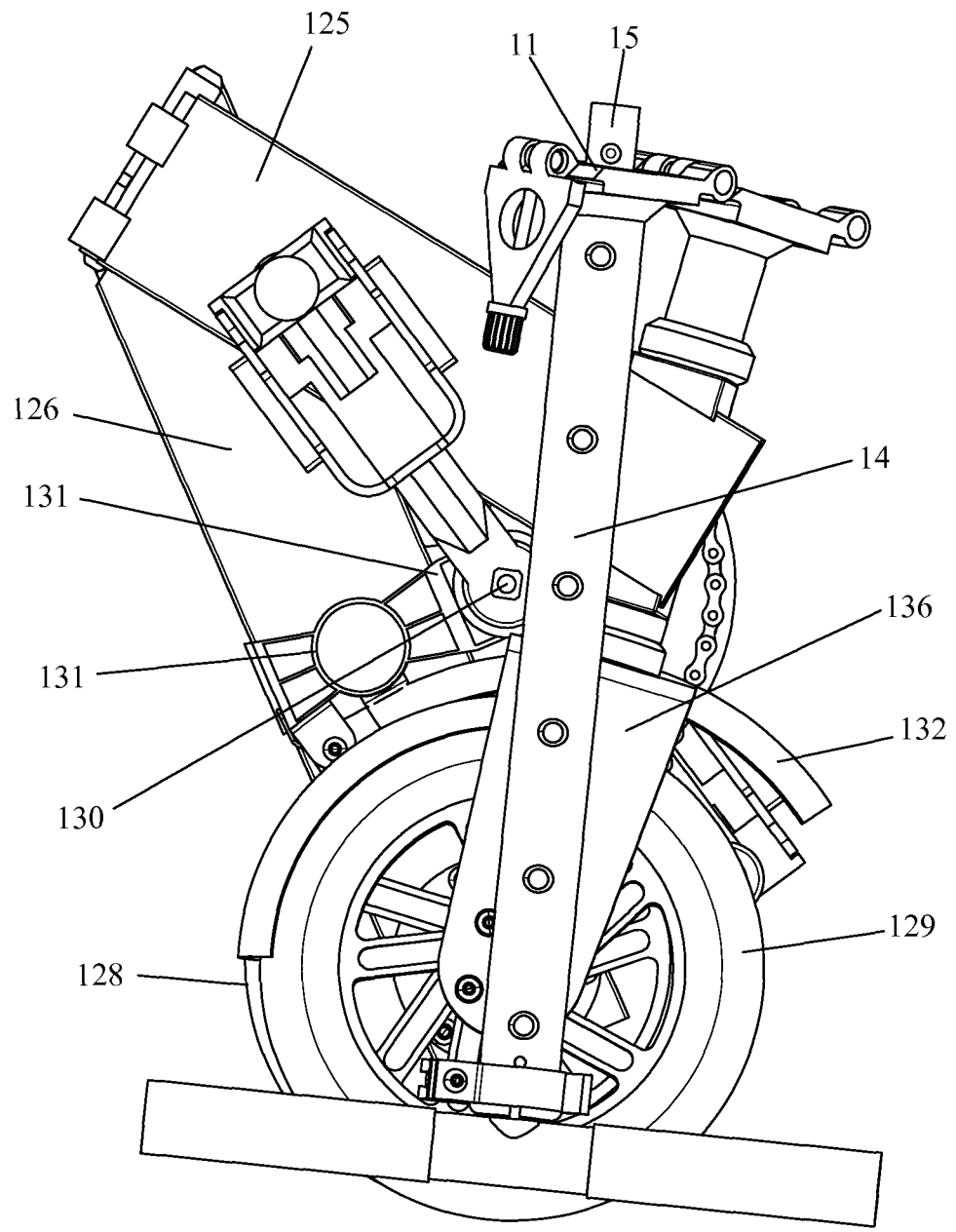
FIG. 42 shows the folded bicycle from FIG. 40 in the other side view.

FIG. 42 shows the folded bicycle from FIG. 40 in the side view opposite to that of FIG. 41.

According to a feature of the invention, in the folded state of the bicycle the bottom bracket 130 is arranged in the triangle formed by the front frame part 125, the rear frame part 126 and a front-wheel fork 136.

The handlebar 16 and the steering tube 15 are further pushed into the steering tube 14 to such an extent that the steering tube 15 can be pushed out at the other end of the steering tube 14.

Using the arrangement of the bottom bracket 130 and the steering tube 15 that has been pushed in far, according to a feature of the invention a very compact folding size is finally achieved.

Figure 43:
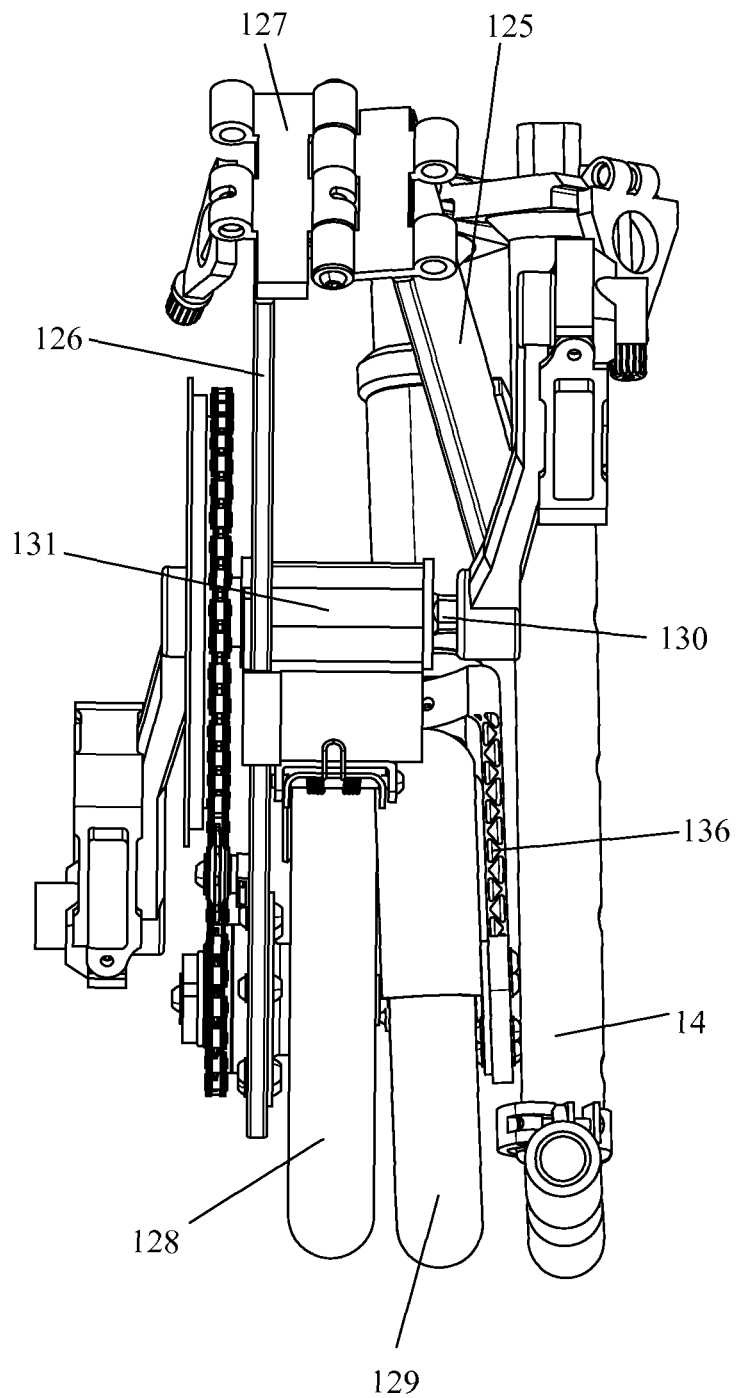
FIG. 43 shows the folded bicycle from FIG. 40 in the front view.

FIG. 43 shows the folded bicycle from FIG. 40 in the front view. From FIG. 43 it is obvious that in the folded state enough space is available between the front frame part 125 and the rear frame part 126 to insert frame parts according to FIG. 25 and/or according to FIG. 35 and still to comply with the compact folding size.

Figure 44:
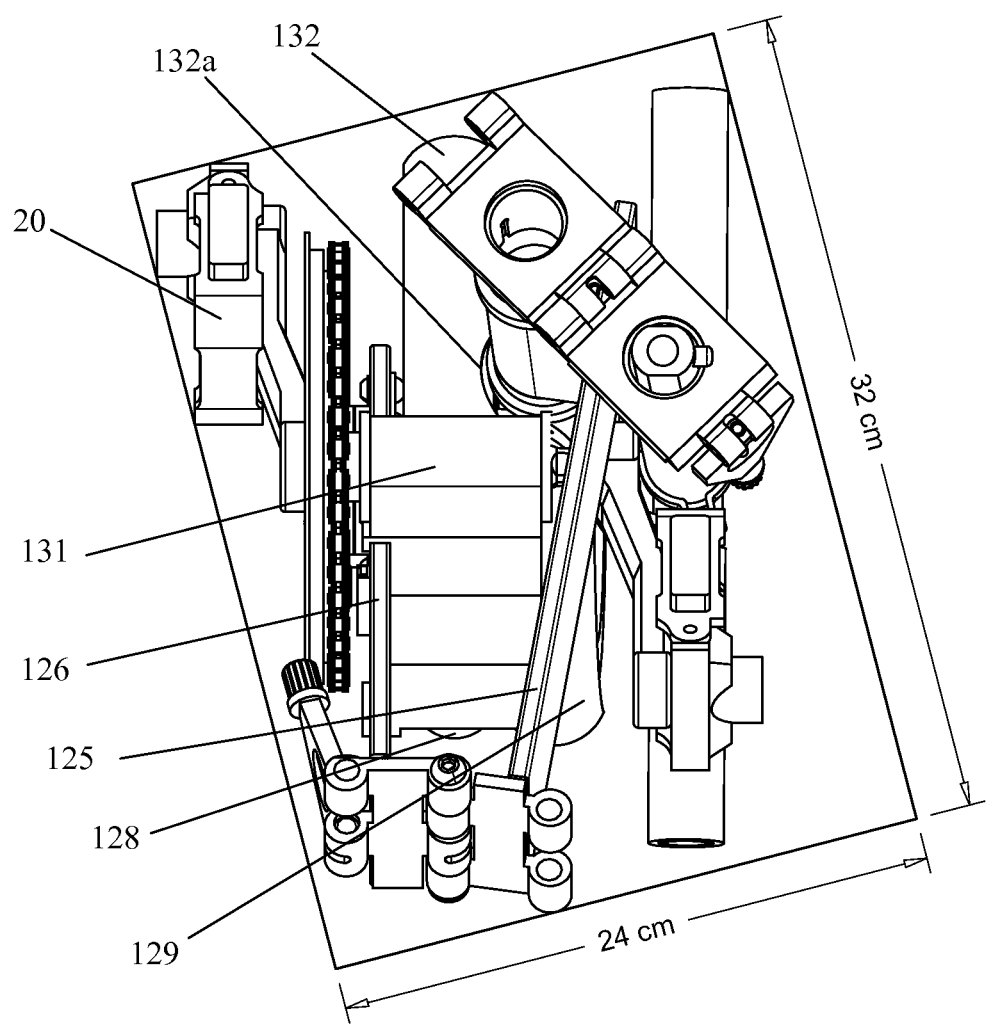

FIG. 44 shows the folded bicycle from FIG. 40 in a view from above, to clarify the folding sizes.

To achieve a very compact folding size, the wheel protection 132 exhibits a recess 132a so that the front wheel 129 and the rear wheel 128, in the folded state of the bicycle, come to rest as closely as possible next to each other.

According to a feature of the invention, the folding sizes of the bicycle amount to 47 cm+32 cm+24 cm=102 cm and thus complies well with the usual carry-on luggage size of L+H+D=115 cm.

Concerning the description of the further features of this embodiment, reference is made here to the embodiments already described.

The following table shows the determination of the previously defined rated value $$\text{rated value} = 1 \geq TKL/AA + HBL/AA + TKL*F*\ddot{U}/Da$$

as characterizing feature of the invention and of the illustrated preferred embodiments with the factors F=5.4 and F=5.8. All embodiments shown result in a value $\leq 1$, an essential feature of the invention being verified.

TABLE A

Determination of the rated value for the illustrated embodiments

|  |  | FIG. 1 | FIG. 17 | FIG. 25 | FIG. 35 | FIG. 40 | FIG. 45 |
| --- | --- | --- | --- | --- | --- | --- | --- |
| running-wheel size | inch | 14 | 10 | 12 | 14 | 8 | 16 |
| Da = running-wheel diameter | mm | 341 | 254 | 305 | 341 | 203 | 391 |
| TKL = crank length | mm | 150 | 130 | 130 | 150 | 130 | 150 |
| HBL = horizontal part of the chain stay length | mm | 220 | 140 | 170 | 180 | 80 | 230 |

TABLE A-continued

Determination of the rated value for the illustrated embodiments

|  |  | FIG. 1 | FIG. 17 | FIG. 25 | FIG. 35 | FIG. 40 | FIG. 45 |
|---|---|---|---|---|---|---|---|
| AA = distance FW-RW = horizontal distance frontwheel axle-rear wheel axle | mm | 710 | 630 | 660 | 690 | 570 | 710 |
| 1st transmission step |  |  |  |  |  |  |  |
| tooth count driving sprocket | teeth | 42 | 36 | 36 | 42 | 42 | 42 |
| tooth count output sprocket | teeth | 18 | 17 | 18 | 9 | 17 | 9 |
| 1/Ü of 1st transmission step |  | 2.33 | 2.12 | 2.00 | 4.67 | 2.47 | 4.67 |
| 2nd transmission step |  |  |  |  |  |  |  |
| tooth count ring gear |  |  | 67 | 57 | 57 |  | 57 |
| tooth count planet gear |  |  | 19 | 15 | 15 |  | 15 |
| tooth count sun gear |  |  | 29 | 27 | 27 |  | 27 |
| 1/Ü of 2nd transmission step |  |  | 3.31 | 3.11 | 3.11 |  | 3.11 |
| 1/Ü |  |  | 7.72 | 6.59 | 6.22 | 4.67 | 7.69 | 4.67 |
| development hardest gear | m/rev | 8.27 | 5.26 | 5.96 | 5.00 | 4.91 | 5.74 |
| rated value 1≥ | F = 5.4 | 0.83 | 0.85 | 0.82 | 0.99 | 0.82 | 0.98 |
| rated value 1≥ | F = 5.8 | 0.85 | 0.88 | 0.85 | 1.02 | 0.85 | 1.01 |

In the following table, values for further embodiments are listed, a discrimination being made between the single-speed variants having a crank length of 130 mm that achieve a development of about 5.3 m (4.6 m for an 8-inch wheel) for each crank revolution, and the multi-speed variants having a crank length of 150 mm that achieve a development of approximately 7.4 m (6.2 m for a 10-inch wheel) in the hardest gear for each crank revolution.

TABLE B

Determination of the rated value for further embodiments

|  |  | single-speed variants | | | | multi-speed variants | | | |
|---|---|---|---|---|---|---|---|---|---|
| running-wheel size | inch | 8 | 10 | 12 | 14 | 10 | 12 | 14 | 16 |
| Da = running-wheel diameter | mm | 203 | 254 | 305 | 341 | 254 | 305 | 341 | 391 |
| TKL = crank length | mm | 130 | 130 | 130 | 130 | 150 | 150 | 150 | 150 |
| HBL = horizontal part of the chainstay length | mm | 200 | 250 | 250 | 250 | 250 | 250 | 250 | 250 |
| AA = FW-RW | mm | 690 | 740 | 740 | 740 | 740 | 740 | 740 | 730 |
| FW-BB = horizontal distance front wheel axle-bottom bracket axle | mm | 490 | 490 | 490 | 490 | 490 | 490 | 490 | 480 |
| 1st transmission step |  |  |  |  |  |  |  |  |  |
| tooth count driving sprocket | teeth | 42 | 36 | 36 | 36 | 42 | 42 | 42 | 42 |
| tooth count output sprocket | teeth | 18 | 17 | 20 | 22 | 18 | 18 | 20 | 23 |
| 1/Ü of 1. transmission step |  | 2.33 | 2.12 | 1.80 | 1.64 | 2.33 | 2.33 | 2.10 | 1.83 |
| 2nd transmission step |  |  |  |  |  |  |  |  |  |
| tooth count ring gear |  | 57 | 57 | 57 | 57 | 67 | 67 | 67 | 67 |
| tooth count planet gear |  | 15 | 15 | 15 | 15 | 19 | 19 | 19 | 19 |
| tooth count sun gear |  | 27 | 27 | 27 | 27 | 29 | 29 | 29 | 29 |
| 1/Ü of 2nd transmission step |  | 3.11 | 3.11 | 3.11 | 3.11 | 3.31 | 3.31 | 3.31 | 3.31 |
| 1/Ü |  | 7.26 | 6.59 | 5.60 | 5.09 | 7.72 | 7.72 | 6.95 | 6.04 |
| development hardest gear | m/rev | 4.63 | 5.26 | 5.37 | 5.45 | 6.16 | 7.40 | 7.44 | 7.43 |
| rated value 1≥ | F = 5.4 | 0.95 | 0.93 | 0.92 | 0.92 | 0.95 | 0.88 | 0.88 | 0.89 |
| rated value 1≥ | F = 5.8 | 0.99 | 0.96 | 0.95 | 0.95 | 0.98 | 0.91 | 0.91 | 0.92 |

The table shows that the rated value can still be safely complied with a horizontal part of the chainstay lengths of 25 cm. All single-speed and multi-speed variants even comply with a rated value of 1.0 if the factor is set to F=5.8.

In the following patent claims, the tooth counts, that have been mentioned, of the output sprocket 22, 102, 119 refer to the chain pitch of 12.7 mm that is usual for bicycle chains.

The invention claimed is:
1. A compact, foldable bicycle, comprising:
a head tube (6, 77);
a fork stem mounted rotatably to the head tube (6, 77);
a handlebar (16);
a steering tube (14, 15) that is connected to the handlebar (16);
a first folding hinge (11) connecting the steering tube to the fork stem;
a bicycle frame comprising
  a front frame part (1, 65, 91, 113, 125),
  a rear frame part (2, 66, 92, 114, 126) and a second folding hinge (3, 67, 93, 115) rotatably connecting the front frame part (1, 65, 91, 113, 125) to the rear frame part (2, 66, 92, 114, 126);
a front wheel (10, 80, 88, 116, 129);

a rear wheel (24, 75, 97, 117, 128) having a rear wheel axle;
a bicycle drive for driving the rear wheel (24, 75, 97, 117, 128), comprising
  a bottom bracket (17, 68, 94, 112, 123, 130) having a bottom bracket axle,
  cranks (19, 85, 111, 124) with pedals (20), that are connected only to the cranks (19, 85, 111, 124) and that can be rotated by 360° around a pedal axle,
  a driving wheel (69) driven by the cranks (19, 85, 111, 124) and
an output wheel (71) coaxial to the rear wheel axle, the output wheel (71) being driven by the driving wheel (69) either by means of a continuous traction element or by means of an intermediate gear,
wherein the distance from the bottom bracket axle to the rear wheel axle is larger than half the outer diameter of the rear wheel (24, 75, 97, 117, 128); and
a front-wheel fork (78, 87, 136) that is connected to the fork stem,
  wherein, in a folded state of the bicycle, the front wheel (10, 80, 88, 116, 129) is arranged laterally largely congruently behind the rear wheel (24, 75, 97, 117, 128),
  wherein, in the folded state of the bicycle, the rear frame part (2, 66, 92, 114, 126), the front frame part (1, 65, 91, 113, 125) and the front-wheel fork (78, 87, 136) form sides of a triangle,
  wherein the bicycle does not comprise a seat,
  wherein, the output wheel (71) of the bicycle drive is arranged on the same side of the bicycle frame as the driving wheel (69) of the bicycle drive, and
wherein the steering tube exhibits a lower steering tube (14) and an upper steering tube (15), that can be displaced linearly relative to each other and that in the folded state of the bicycle are folded-in laterally beside the front wheel (10, 80, 88, 116, 129).

2. The bicycle as in claim 1,
wherein the average of the outer diameters of the rear wheel (24, 75, 97, 117, 128) and the front wheel (10, 80, 88, 116, 129) amounts to at most 380 mm,
wherein the driving wheel (69) of the bicycle drive is arranged together with one of the cranks (19, 85, 111, 124) on the same side of the bottom bracket (17, 68, 94, 112, 123, 130) and
wherein
  (Crank length divided by the wheel base of the bicycle)
  plus (horizontal component of the chainstay length divided by the wheel base of the bicycle)
  plus (crank length multiplied by 5.4 divided by the outer diameter of the rear wheel, multiplied by the transmission ratio of the bicycle drive, the transmission ratio being the number of revolutions of the crank divided by the number of revolutions of the rear wheel and wherein in the case of multi-speed bicycle drives the transmission ratio for the hardest speed is to be inserted)
  amounts to at most 1.00.

3. The bicycle as in claim 1, wherein the rear wheel (24, 75, 97, 128) exhibits an outer diameter of less than 425 mm and there is connected downstream from the output wheel (71) of the upstream bicycle drive a planetary gear (46).

4. The bicycle as in claim 3, wherein the planetary gear (46, 86, 104), seen axially, is arranged on the same side of the bicycle frame as the output wheel (71) of the bicycle drive.

5. The bicycle as in claim 1,
wherein the rear wheel (117) has an outer diameter of less than 425 mm
and wherein the bicycle drive is a chain drive,
and wherein the driving wheel is a driving sprocket,
and wherein the output wheel is an output sprocket (119) having less than 13 teeth,
and wherein the rear wheel axle is a rear-wheel shaft (118) that is supported in the bicycle frame and on which the rear wheel (117) is arranged,
further comprising a freewheel clutch arranged between the output sprocket (119) and the rear-wheel shaft (118).

6. The bicycle as in claim 1, wherein the horizontal distance between the handlebar center and the bottom-bracket axle is at most 280 mm.

7. The bicycle as in claim 1, wherein the height of the handlebar (16) can be adjusted.

8. The bicycle as in claim 1, further comprising a setting device (33) for adjusting a head angle of the head tube in a range between 65° and 75°.

9. The bicycle as in claim 1, wherein the output wheel (71) of the bicycle drive is arranged on the side of the bicycle frame opposite the rear wheel (24, 75, 97, 117, 128).

10. The bicycle as in claim 1,
wherein the second folding hinge (67, 127) is situated above a straight line from the bottom bracket-axle to the center of the head tube (6)
and wherein the front frame part (65, 125) is arranged parallel to the ground plane.

11. The bicycle as in claim 1,
wherein the rear wheel (75, 97, 117, 128) and the front wheel (80, 88, 116, 129) are single-arm suspended
and wherein in the folded state of the bicycle no intermediate frame parts are between the rear wheel (75, 97, 117, 128) and the front wheel (80, 88, 116, 129).

12. The bicycle as in claim 1,
wherein in the folded state of the bicycle the front frame part (65, 91, 113, 125) is situated between the rear frame part (66, 92, 114, 126) and the crank (85, 111, 124) that is arranged on the side of the bicycle frame opposite the driving wheel (69) of the bicycle drive.

13. The bicycle as in claim 1,
wherein in the folded state of the bicycle the bottom bracket (130) is situated within the triangle formed by the front frame part (125), the rear frame part (126) and the front-wheel fork (136).

14. A compact, foldable bicycle, comprising:
a bicycle frame;
a head tube;
a fork stem mounted rotatably to the head tube;
a handlebar;
a steering tube connected to the handlebar and to the fork stem;
a front wheel;
a rear wheel having a rear wheel axle; and
a bicycle drive for driving the rear wheel, comprising
  a bottom bracket having a bottom bracket axle,
  cranks with pedals,
  a driving wheel driven by the cranks, and
  an output wheel coaxial to the rear wheel axle, the output wheel being driven by the driving wheel either by means of a continuous traction element or by means of an intermediate gear,
wherein the distance from the bottom bracket axle to the rear wheel axle is larger than half the outer diameter of the rear wheel, and
wherein the average of the outer diameters of the rear wheel and the front wheel amounts to at most 380 mm, and wherein the driving wheel of the bicycle drive is arranged together with a crank on the same side of the bottom bracket, and wherein (Crank length divided by the wheel base of the bicycle) plus (horizontal component of the chainstay length divided by the wheel base of the bicycle) plus (crank length multiplied by 5.4 divided by the outer diameter of the rear wheel, multiplied by the transmission ratio of the bicycle drive, the transmission ratio being the number of revolutions of the crank divided by the number of revolutions of the rear wheel and wherein in the case of multi-speed bicycle drives the transmission ratio for the hardest speed is to be inserted) amounts to at most 1.00.

15. The compact, foldable bicycle as in claim 14, wherein the output wheel of the bicycle drive is arranged on the same side of the bicycle frame as the driving wheel of the bicycle drive.

16. The compact, foldable bicycle as in claim 14, wherein a first folding hinge connects the steering tube to the fork stem.

17. The compact, foldable bicycle as in claim 16, wherein the bicycle frame comprises a front frame part, a rear frame part and a second folding hinge rotatably connecting the front frame part to the rear frame part.

18. The compact, foldable bicycle as in claim 17, wherein in a folded state of the bicycle the front wheel is arranged laterally largely congruently behind the rear wheel and wherein, in the folded state of the bicycle, the rear frame part, the front frame part, and the front-wheel fork form sides of a triangle.

19. The compact, foldable bicycle as in claim 14, wherein the bicycle does not comprise a seat.

20. The compact, foldable bicycle as in claim 14, wherein the steering tube comprises a lower steering tube and an upper steering tube that can be displaced linearly relative to each other.

21. The compact, foldable bicycle as in claim 14,
wherein the bicycle frame comprises a front frame part rotatably connected to a rear frame part by a folding hinge, and
wherein the rear frame part is centrally arranged between the output wheel and the rear wheel.

22. The compact, foldable bicycle as in claim 14, wherein the rear wheel has an outer diameter of less than 425 mm.

23. The compact, foldable bicycle as in claim 14, further comprising a planetary gear downstream from the output wheel of the upstream bicycle drive.

24. The compact, foldable bicycle as in claim 23, wherein the planetary gear is arranged on the same side of the bicycle frame as the output wheel.

* * * * *